(12) United States Patent
Akimoto et al.

(10) Patent No.: US 8,850,862 B2
(45) Date of Patent: Oct. 7, 2014

(54) METHOD AND APPARATUS FOR ROLLING ELECTRIC WIRE FOR STATOR COIL OF ELECTRIC ROTATING MACHINE

(75) Inventors: Akito Akimoto, Kariya (JP); Noboru Taniguchi, Kariya (JP); Atsuo Ishizuka, Nagoya (JP); Seiji Tachibana, Toyoake (JP); Masaomi Dobashi, Kariya (JP); Mitsuyuki Hayashi, Nishio (JP); Takeshi Kurosawa, Aichi-ken (JP)

(73) Assignee: Denso Corporation, Kariya (JP)

( * ) Notice: Subject to any disclaimer, the term of this patent is extended or adjusted under 35 U.S.C. 154(b) by 819 days.

(21) Appl. No.: 13/006,688

(22) Filed: Jan. 14, 2011

(65) Prior Publication Data

US 2011/0174038 A1    Jul. 21, 2011

(30) Foreign Application Priority Data

Jan. 15, 2010 (JP) ................................. 2010-007241
Nov. 19, 2010 (JP) ................................. 2010-259357

(51) Int. Cl.
B21B 3/00     (2006.01)
B21C 47/00    (2006.01)
H02K 15/04    (2006.01)
H02K 3/28     (2006.01)

(52) U.S. Cl.
CPC ............. *H02K 3/28* (2013.01); *H02K 15/0421* (2013.01)
USPC ................... 72/127; 72/133; 72/142; 72/146; 72/371; 140/92.2; 29/605

(58) Field of Classification Search
USPC ........... 72/127, 133, 135, 137, 142, 371, 146, 72/148; 470/92.2, 102; 29/596, 605, 606
See application file for complete search history.

(56) References Cited

U.S. PATENT DOCUMENTS 6,949,857 B2 *  9/2005  Neet et al. ...................... 310/214
7,386,931 B2 *  6/2008  Neet et al. ....................... 29/596

(Continued)

FOREIGN PATENT DOCUMENTS

JP    2004-254368    9/2004
JP    3894004        12/2006

(Continued)

OTHER PUBLICATIONS

Office Action (1 page) dated Jun. 25, 2013, issued in corresponding Japanese Application No. 2010-259357 and English translation (1 page).

*Primary Examiner* — Edward Tolan
(74) *Attorney, Agent, or Firm* — Nixon & Vanderhye, P.C.

(57) ABSTRACT

Disclosed is an apparatus for rolling a substantially planar electric wire by more than one turn into a spiral shape. The apparatus includes an inner pressing member having an outer surface, an intermediate pressing member having radially inner and outer surfaces, and an outer pressing member having an inner surface. The inner and intermediate pressing members together press a first part of the electric wire between the outer surface of the inner pressing member and the inner surface of the intermediate pressing member, thereby plastically deforming the first part to extend along the outer surface of the inner pressing member. The intermediate and outer pressing members together press a second part of the electric wire between the outer surface of the intermediate pressing member and the inner surface of the outer pressing member, thereby plastically deforming the second part to extend along the outer surface of the intermediate pressing member.

31 Claims, 54 Drawing Sheets

(56) References Cited

U.S. PATENT DOCUMENTS

| | | |
|---|---|---|
| 8,008,830 B2 | 8/2011 | Kouda |
| 8,096,046 B2 * | 1/2012 | Shives et al. .................. 29/732 |
| 8,253,296 B2 | 8/2012 | Kouda |
| 2009/0315232 A1 | 12/2009 | Kim et al. |
| 2010/0141078 A1 | 6/2010 | Kouda |
| 2010/0231082 A1 * | 9/2010 | Bodin et al. .................. 310/195 |
| 2012/0007462 A1 | 1/2012 | Kouda |

FOREIGN PATENT DOCUMENTS

| | | |
|---|---|---|
| JP | 2009-112186 | 5/2009 |
| JP | 2009-247199 | 10/2009 |
| JP | 2009-268157 | 11/2009 |
| JP | 2010-7183 | 1/2010 |
| JP | 2010-7241 | 1/2010 |

* cited by examiner

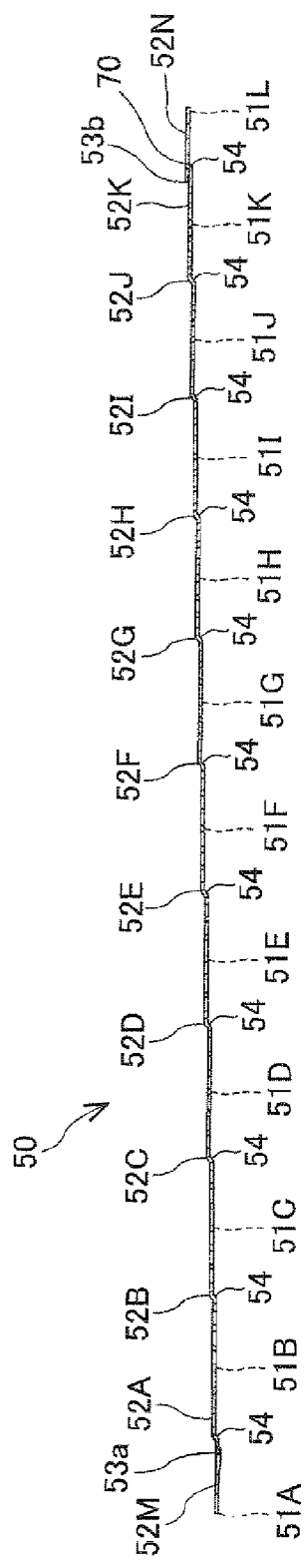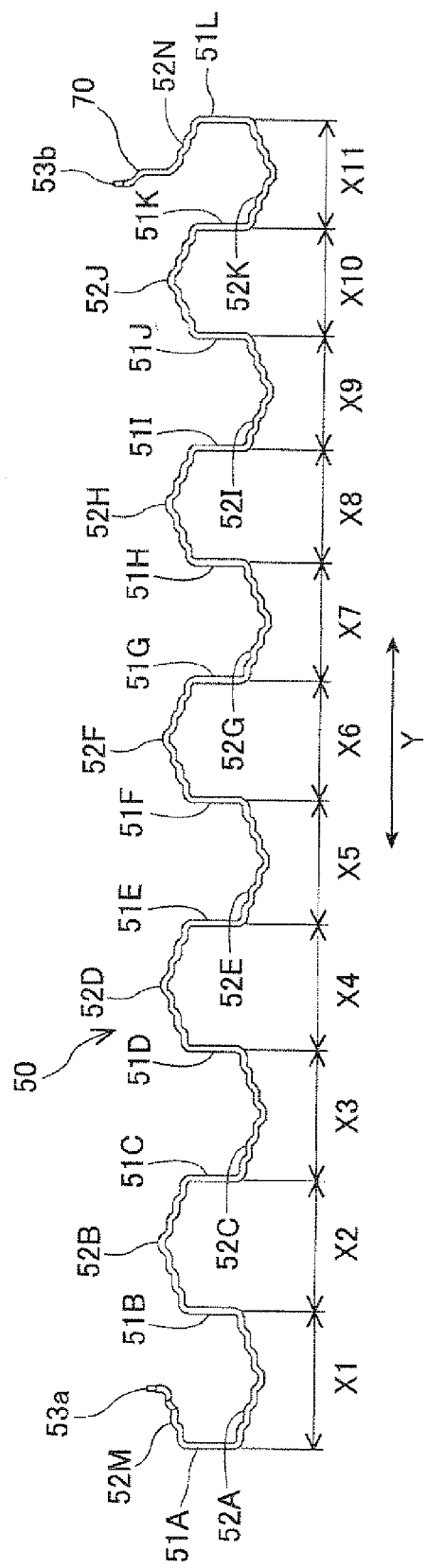
FIG. 12A
FIG. 12B

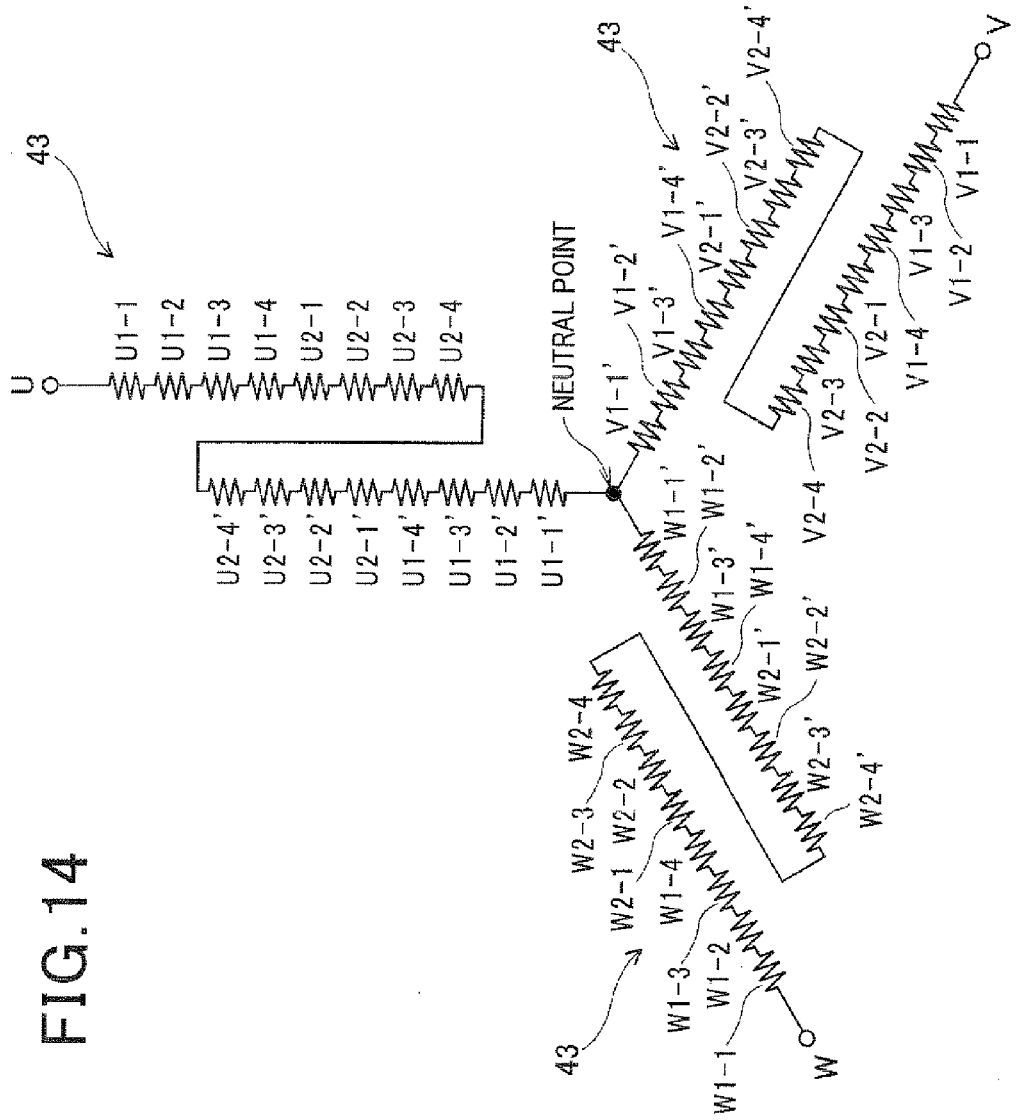

FIG. 17

| SLOT NUMBER | OUTERMOST LAYER | INNERMOST LAYER |
|---|---|---|
| 1 | U1-1 | U1-3' |
| 2 | U2-1 | U2-3' |
| 3 | W1-1' | W1-3 |
| 4 | W2-1' | W2-3 |
| 5 | V1-1 | V1-3' |
| 6 | V2-1 | V2-3' |
| 7 | U1-1' | U1-4 |
| 8 | U2-1' | U2-4 |
| 9 | W1-1 | W1-4' |
| 10 | W2-1 | W2-4' |
| 11 | V1-1' | V1-4 |
| 12 | V2-1' | V2-4 |
| 13 | U1-2 | U1-4' |
| 14 | U2-2 | U2-4' |
| 15 | W1-2' | W1-4 |
| 16 | W2-2' | W2-4 |
| 17 | V1-2 | V1-4' |
| 18 | V2-2 | V2-4' |
| 19 | U1-2' | U1-1 |
| 20 | U2-2' | U2-1 |
| 21 | W1-2 | W1-1' |
| 22 | W2-2 | W2-1' |
| 23 | V1-2' | V1-1 |
| 24 | V2-2' | V2-1 |

| SLOT NUMBER | OUTERMOST LAYER | INNERMOST LAYER |
|---|---|---|
| 25 | U1-3 | U1-1' |
| 26 | U2-3 | U2-1' |
| 27 | W1-3' | W1-1 |
| 28 | W2-3' | W2-1 |
| 29 | V1-3 | V1-1' |
| 30 | V2-3 | V2-1' |
| 31 | U1-3' | U1-2 |
| 32 | U2-3' | U2-2 |
| 33 | W1-3 | W1-2' |
| 34 | W2-3 | W2-2' |
| 35 | V1-3' | V1-2 |
| 36 | V2-3' | V2-2 |
| 37 | U1-4 | U1-2' |
| 38 | U2-4 | U2-2' |
| 39 | W1-4' | W1-2 |
| 40 | W2-4' | W2-2 |
| 41 | V1-4 | V1-2' |
| 42 | V2-4 | V2-2' |
| 43 | U1-4' | U1-3 |
| 44 | U2-4' | U2-3 |
| 45 | W1-4 | W1-3' |
| 46 | W2-4 | W2-3' |
| 47 | V1-4' | V1-3 |
| 48 | V2-4' | V2-3 |

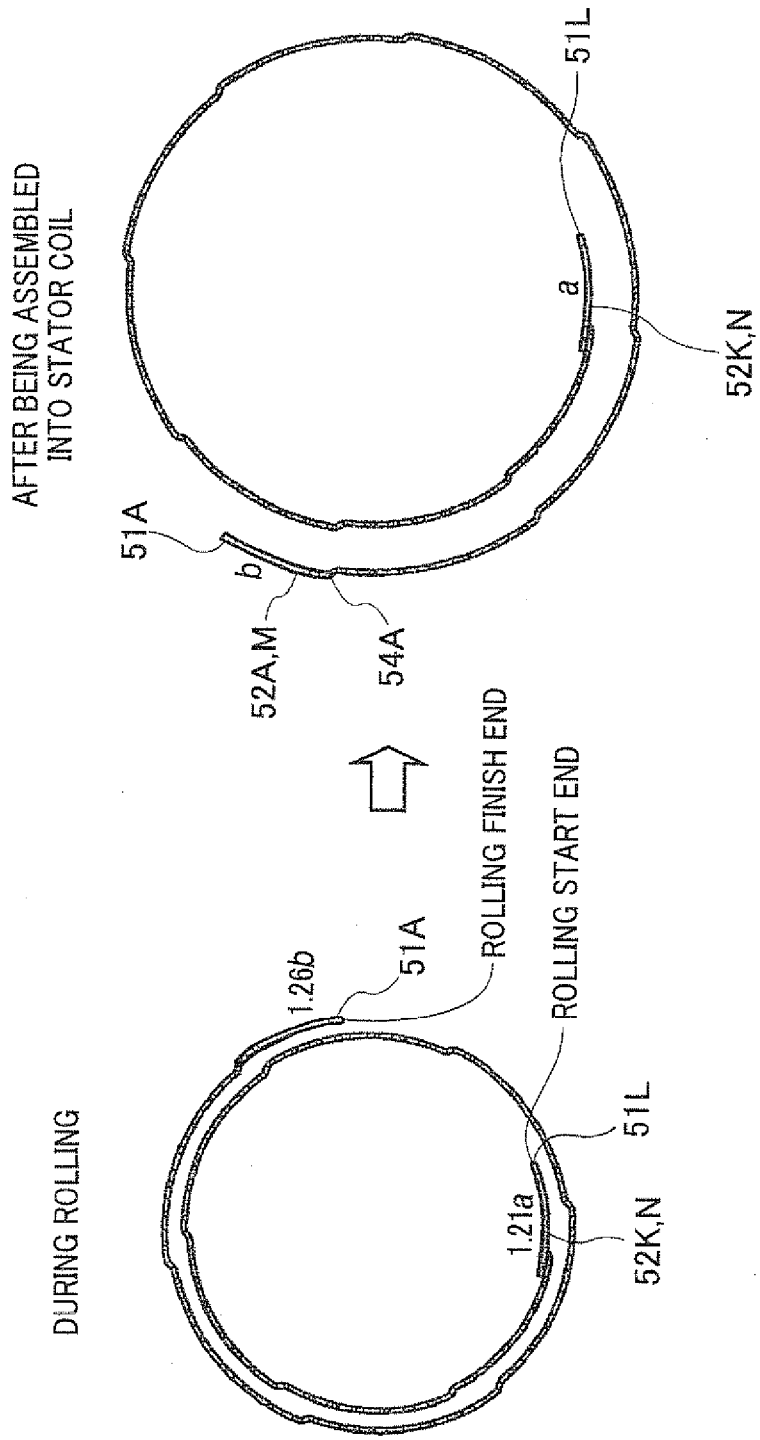

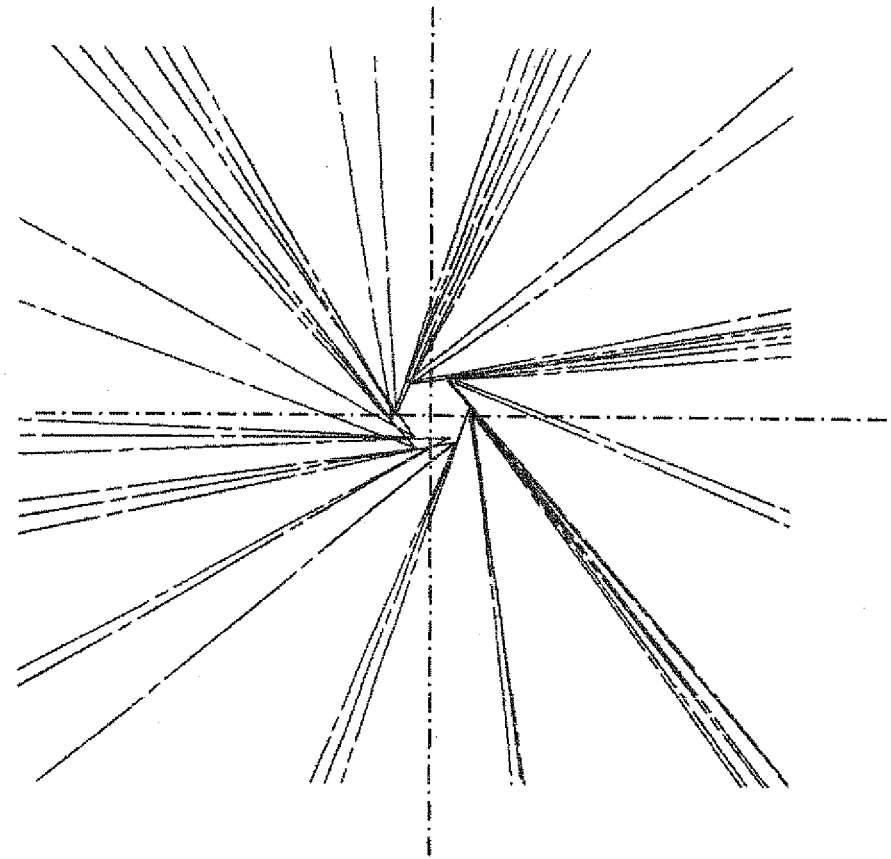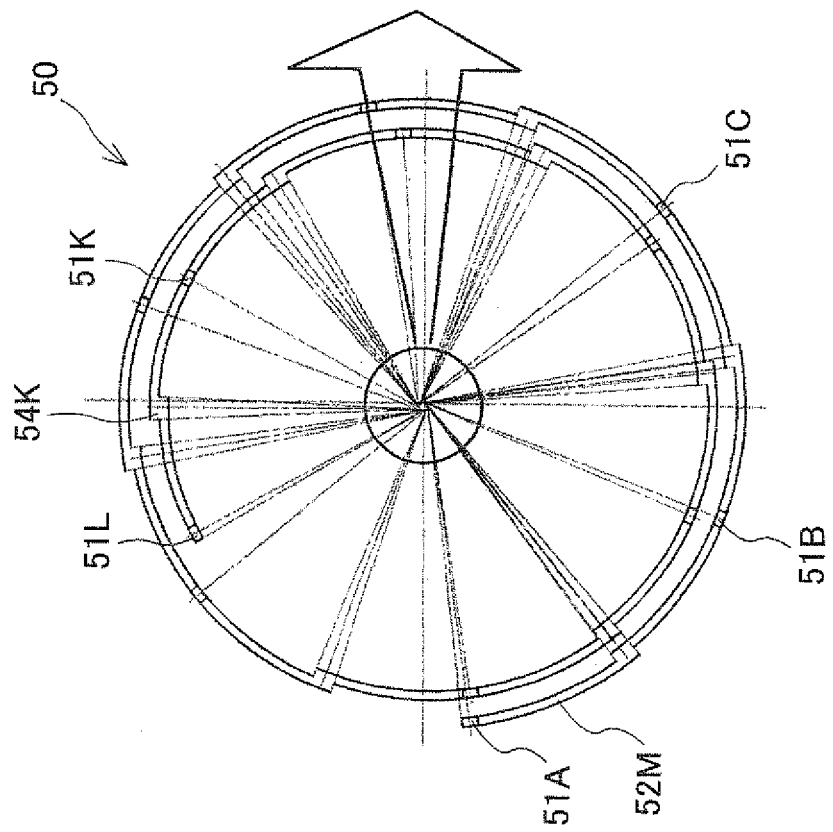

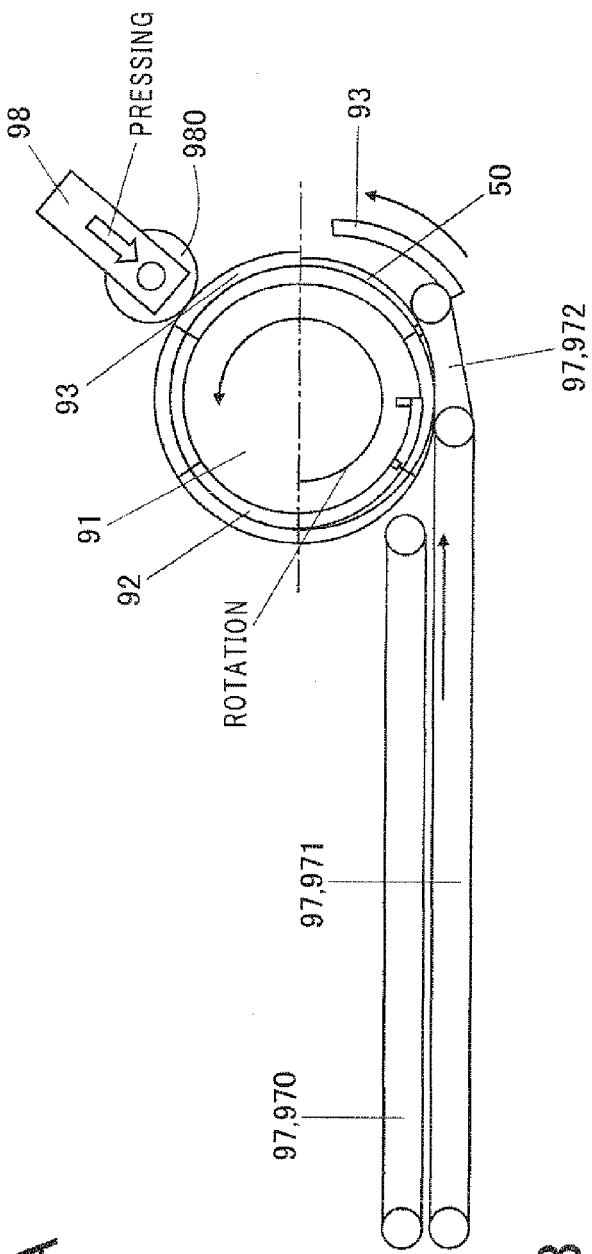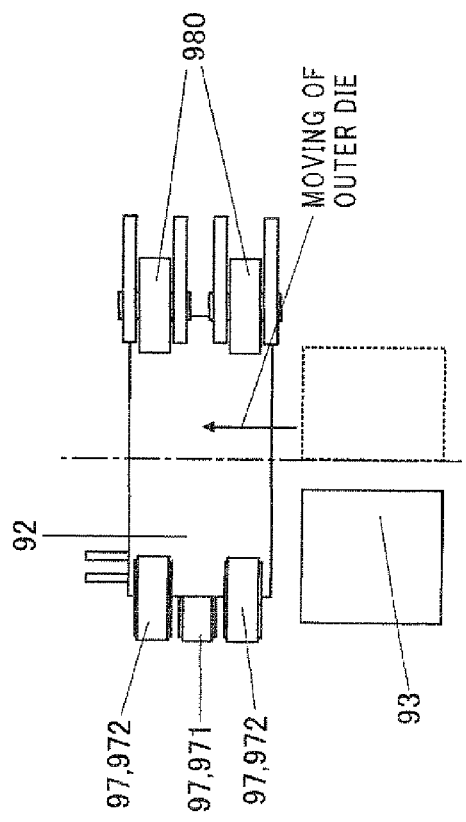
FIG.44A
FIG.44B

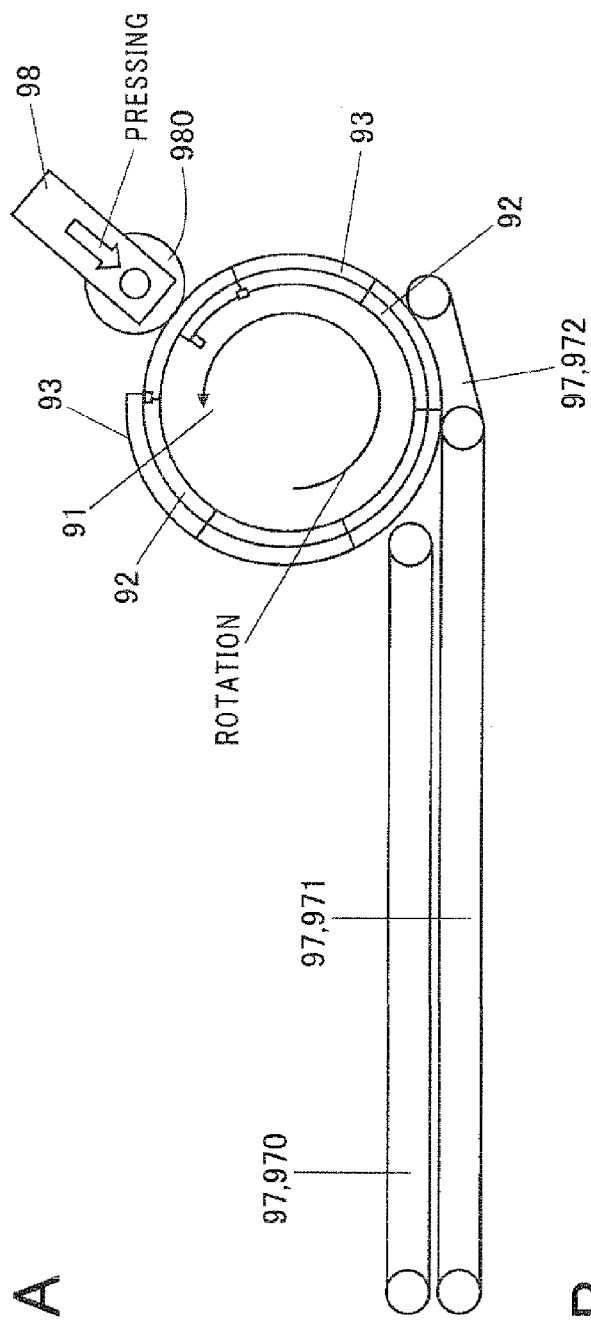
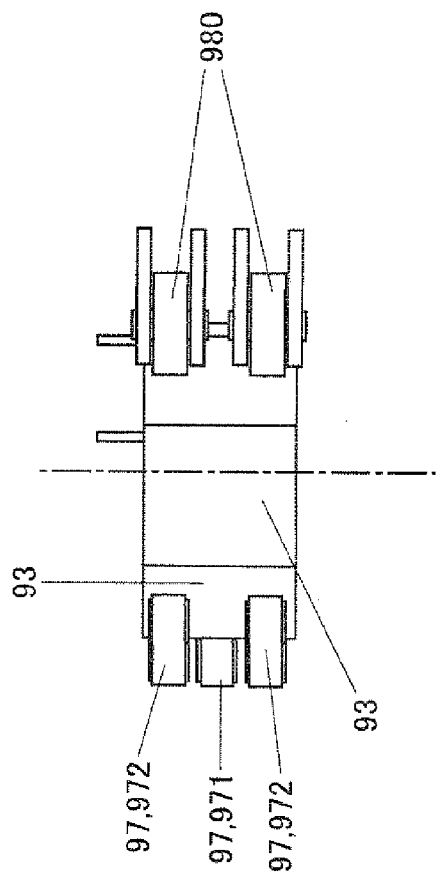
FIG. 45A
FIG. 45B

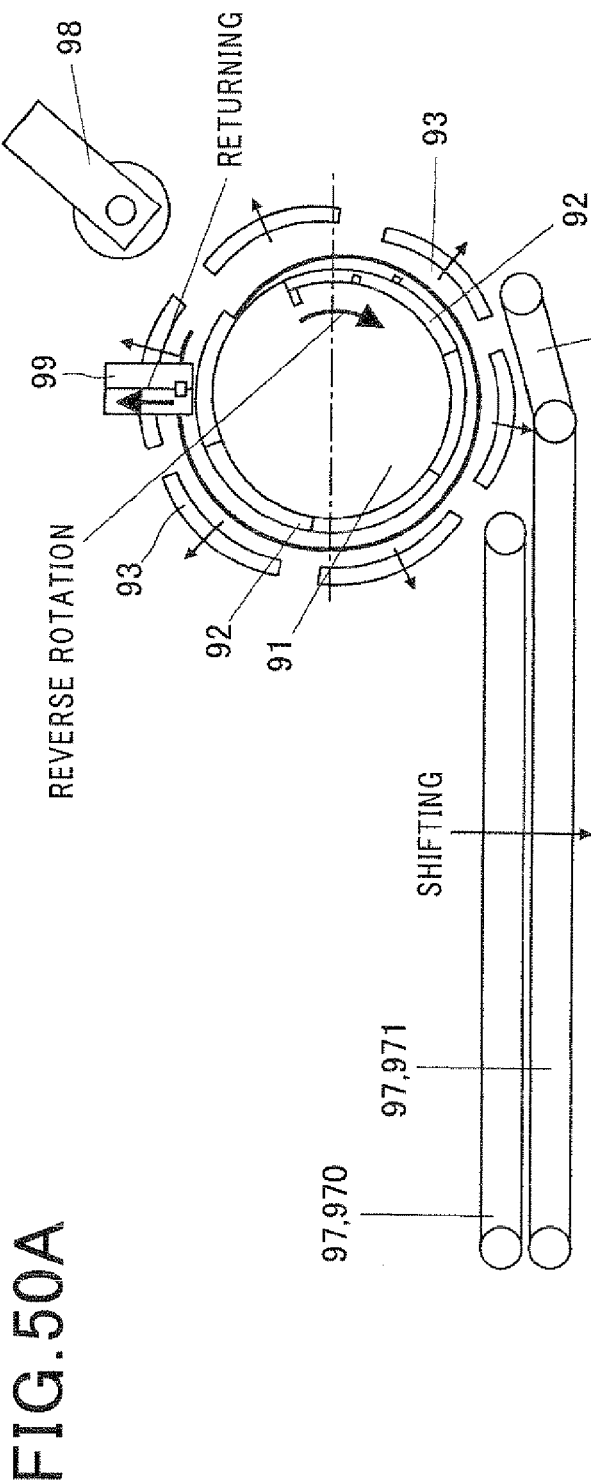
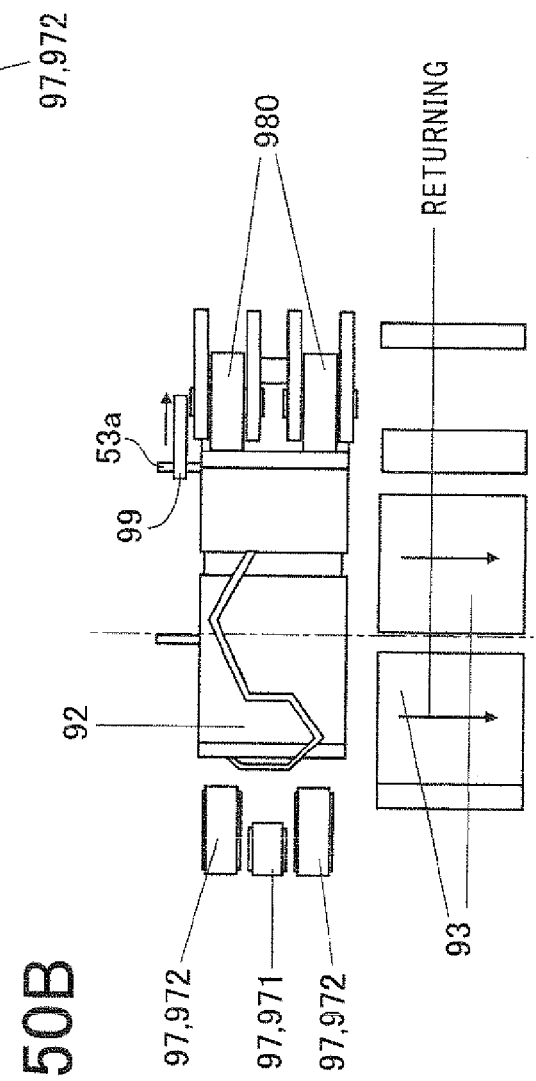
FIG.50A
FIG.50B

METHOD AND APPARATUS FOR ROLLING ELECTRIC WIRE FOR STATOR COIL OF ELECTRIC ROTATING MACHINE

CROSS-REFERENCE TO RELATED APPLICATIONS

This application is based on and claims priority from Japanese Patent Applications No. 2010-7241 filed on Jan. 15, 2010 and No. 2010-259357 filed on Nov. 19, 2010, the contents of which are hereby incorporated by reference in their entireties into this application.

BACKGROUND OF THE INVENTION

1. Technical Field of the Invention

The present invention relates to methods and apparatuses for rolling electric wires for stator coils of electric rotating machines that are used in, for example, motor vehicles as electric motors and electric generators.

2. Description of the Related Art

Conventionally, there are known stators for electric rotating machines which include a hollow cylindrical stator core and a stator coil.

The stator core has a plurality of slots that are formed in the radially inner surface of the stator core and spaced in the circumferential direction of the stator core. The stator coil is comprised of a plurality of electric wires mounted on the stator core. Each of the electric wires includes a plurality of in-slot portions, each of which is received in a corresponding one of the slots of the stator core, and a plurality of turn portions each of which connects an adjacent pair of the in-slot portions and is located outside the slots of the stator core.

Moreover, as disclosed, for example, in Japanese Patent Application Publication No. 2009-247199, the stator coil may be formed by: (1) assembling the electric wires to form a planar electric wire assembly; and (2) rolling the planar electric wire assembly by a predetermined number of turns into a hollow cylindrical shape.

For the thus-formed stator coil, it is necessary for corresponding in-slot portions of the electric wires which are to be received in the same slot of the stator core to be aligned in a radial direction of the stator coil. However, due to springback of the electric wires, it may be easy for misalignment between the is corresponding in-slot portions of the electric wires to occur during the rolling step.

The misalignment may make it difficult to accurately assemble the stator coil with the stator core. Further, the misalignment may also decrease the space factor of the corresponding in-slot portions of the electric wires in the slot of the stator core and deteriorate the magnetic characteristics of the stator.

Specifically, as shown in FIG. 56, the corresponding in-slot portions of the electric wires may be deviated from each other in the circumferential direction of the stator coil (or in the circumferential direction of the stator core), resulting in the misalignment between the corresponding in-slot portions in the radial direction of the stator coil (or in the radial direction of the stator core).

Moreover, as shown in FIG. 57, the corresponding in-slot portions of the electric wires may be twisted to become nonparallel to each other. In this case, a corner portion of one of the corresponding in-slot portions may come into contact with a radial end face of another one of the same, thereby damaging an insulating coat formed at the radial end face.

SUMMARY OF THE INVENTION

According to one aspect of the present invention, there is provided a method of rolling a substantially planar electric wire, which is for use in forming a stator coil of a stator of an electric rotating machine, by more than one turn into a spiral shape. The stator includes a hollow cylindrical stator core having a plurality of slots that are formed in a radially inner surface of the stator core and spaced in a circumferential direction of the stator core. The planar electric wire includes a plurality of in-slot portions, each of which is to be received in a corresponding one of the slots of the stator core, and a plurality of turn portions each of which connects an adjacent pair of the in-slot portions and is to be located outside the slots of the stator core. The method comprises the steps of: (1) preparing a radially inner pressing member having an outer surface, a radially intermediate pressing member having radially inner and outer surfaces, and a radially outer pressing member having an inner surface; (2) pressing a first part of the electric wire between the outer surface of the inner pressing member and the inner surface of the intermediate pressing member, thereby plastically deforming the first part to extend along the outer surface of the inner pressing member; and (3) pressing a second part of the electric wire between the outer surface of the intermediate pressing member and the inner surface of the outer pressing member, thereby plastically deforming the second part to extend along the outer surface of the intermediate pressing member.

According to another aspect of the present invention, there is provided an apparatus for rolling a substantially planar electric wire, which is for use in forming a stator coil of a stator of an electric rotating machine, by more than one turn into a spiral shape. The stator includes a hollow cylindrical stator core having a plurality of slots that are formed in a radially inner surface of the stator core and spaced in a circumferential direction of the stator core. The planar electric wire includes a plurality of in-slot portions, each of which is to be received in a corresponding one of the slots of the stator core, and a plurality of turn portions each of which connects an adjacent pair of the in-slot portions and is to be located outside the slots of the stator core. The apparatus includes a radially inner pressing member having an outer surface, a radially intermediate pressing member having radially inner and outer surfaces, and a radially outer pressing member having an inner surface. The inner and intermediate pressing members together press a first part of the electric wire between the outer surface of the inner pressing member and the inner surface of the intermediate pressing member, thereby plastically deforming the first part to extend along the outer surface of the inner pressing member. The intermediate and outer pressing members together press a second part of the electric wire between the outer surface of the intermediate pressing member and the inner surface of the outer pressing member, thereby plastically deforming the second part to extend along the outer surface of the intermediate pressing member.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 12A is a top view of one of the electric wires;
FIG. 12B is a front view of the one of the electric wires;
FIG. 14 is a circuit diagram of the stator coil;
FIG. 17 is a tabular representation showing the correspondence between slot number and the labels of radially innermost and outermost electric wires for each slot of the stator core;
FIG. 22 is a schematic view illustrating one of the electric wires during the rolling of the electric wire in an electric wire rolling step and after being assembled into the stator coil in a stator coil forming step of the method;
FIG. 25A is a schematic view illustrating the centers of curvature of all the circumferentially-extending sections of the turn portions and half-turn portions of one of the electric wires when the electric wire is pressed by pressing members of the rolling apparatus;
FIG. 25B is an enlarged view of the circled part of FIG. 25A;
FIGS. 44A and 44B are respectively schematic top and side views illustrating the shaping of a second part (i.e., the remaining less than one turn) of the electric wire;
FIGS. 45A and 45B are respectively schematic top and side views also illustrating the shaping of the second part of the electric wire.

FIGS. 50A and 50B are respectively schematic top and side views illustrating the returning of the outer dies 93 to their respective initial positions;

DESCRIPTION OF PREFERRED EMBODIMENTS

Figure 1:
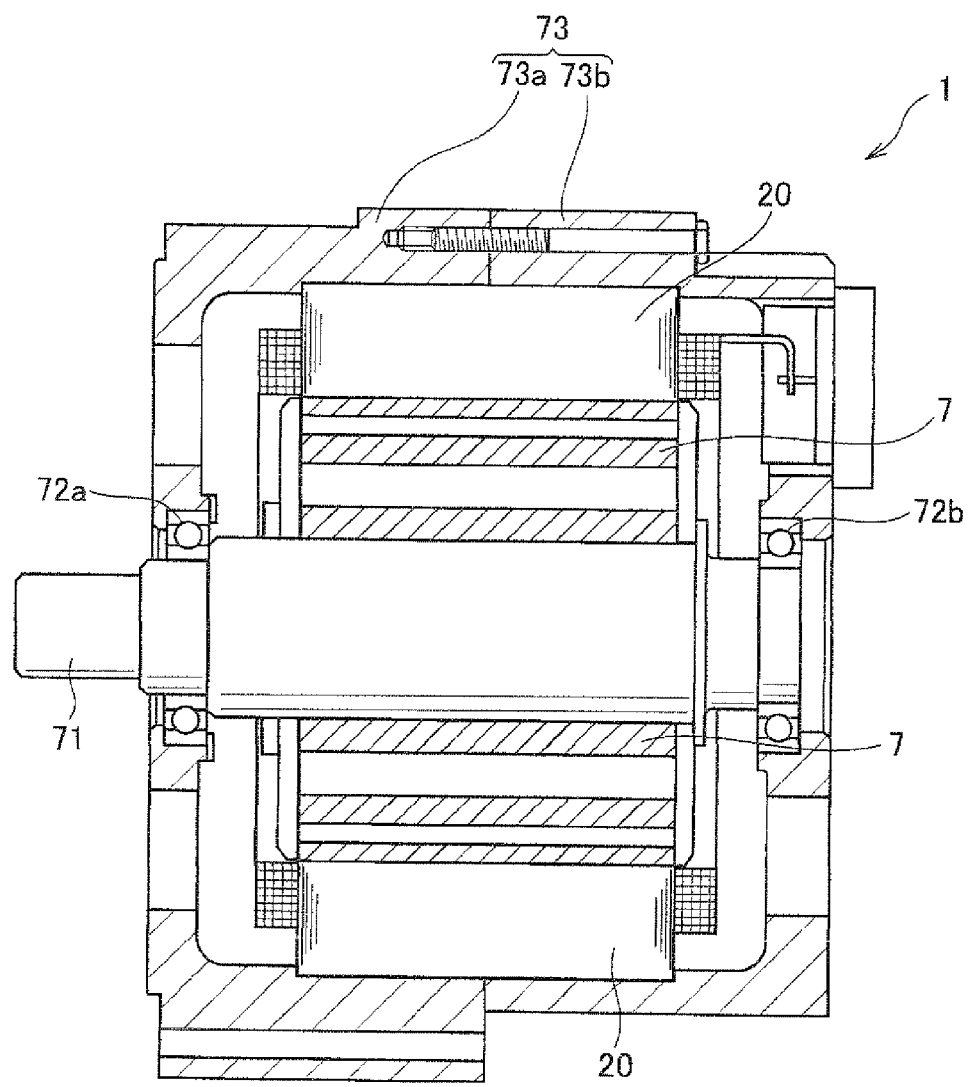
FIG. 1 is a schematic cross-sectional view illustrating the overall configuration of an electric rotating machine which includes a stator manufactured by using a rolling apparatus according to the first embodiment of the invention.

Preferred embodiments of the present invention will be described hereinafter with reference to FIGS. 1-55. It should be noted that, for the sake of clarity and understanding, identical components having identical functions in different embodiments of the invention have been marked, where possible, with the same reference numerals in each of the figures.

[First Embodiment]

FIG. 1 shows the overall configuration of an electric rotating machine 1 which includes a stator 20 manufactured by using a rolling apparatus according to the first embodiment of the invention.

The electric rotating machine 1 is configured to function both as an electric motor and as an electric generator in a motor vehicle.

As shown in FIG. 1, the electric rotating machine 1 includes, in addition to the stator 20, a rotor 7 and a housing 73. The housing 73 is composed of a pair of cup-shaped housing pieces 73a and 73b which are jointed together at the open ends thereof. The housing 73 has a pair of bearings 72a and 72b mounted therein, via which a rotating shaft 71 is rotatably supported by the housing 73. The rotor 7 is received in the housing 73 and fixed on the rotating shaft 71. The stator 20 is fixed in the housing 73 so as to surround the radially outer periphery of the rotor 7.

The rotor 7 includes a plurality of permanent magnets that form a plurality of magnetic poles on the radially outer periphery of the rotor 7 to face the radially inner periphery of the stator 20. The polarities of the magnetic poles alternate between north and south in the circumferential direction of the rotor 7. In addition, in the present embodiment, the number of the magnetic poles formed in the rotor 7 is equal to eight (i.e., four north poles and four south poles).

Figure 2:
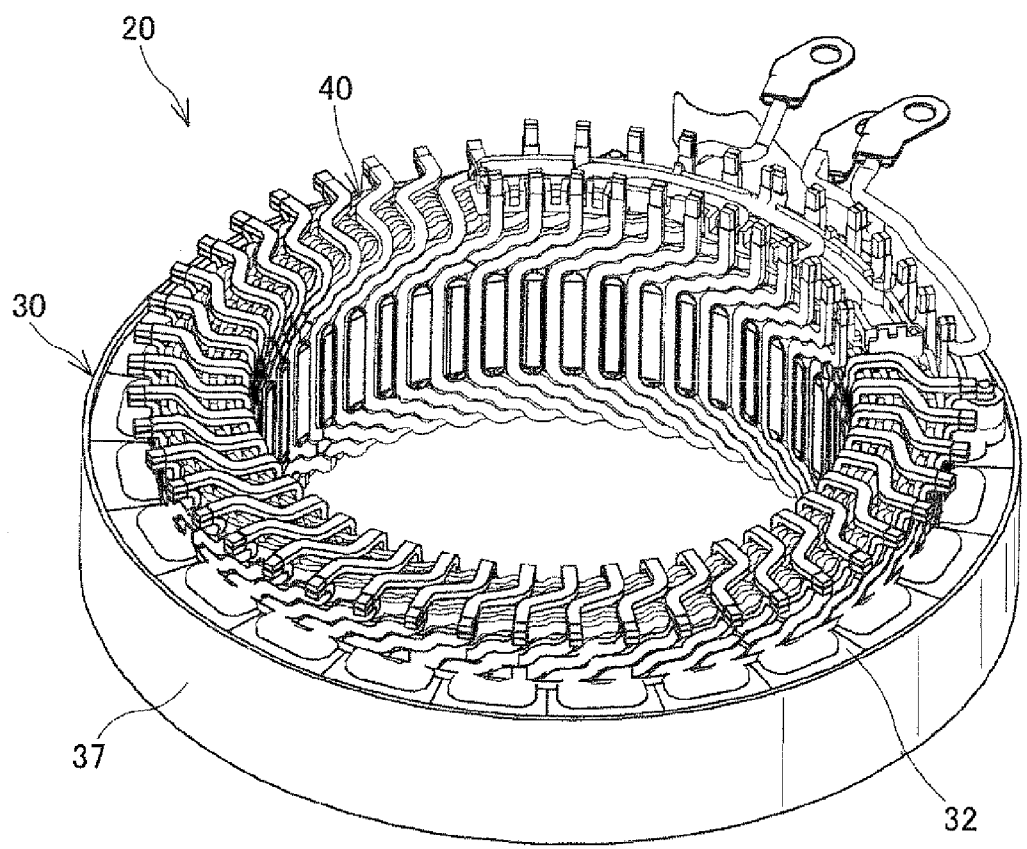
FIG. 2 is a perspective view of the stator.
Figure 3:
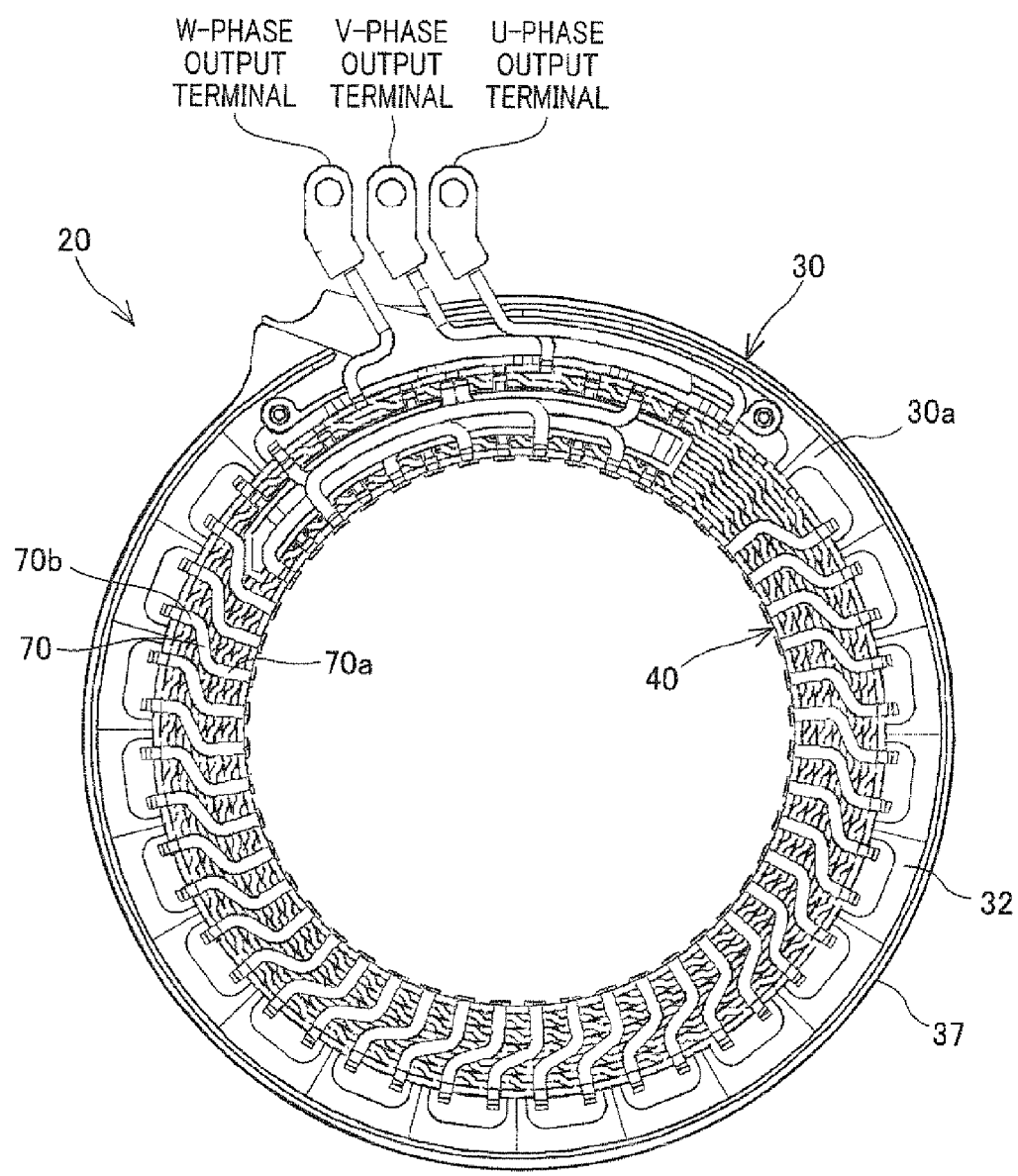
FIG. 3 is a top view of the stator.
Figure 4:
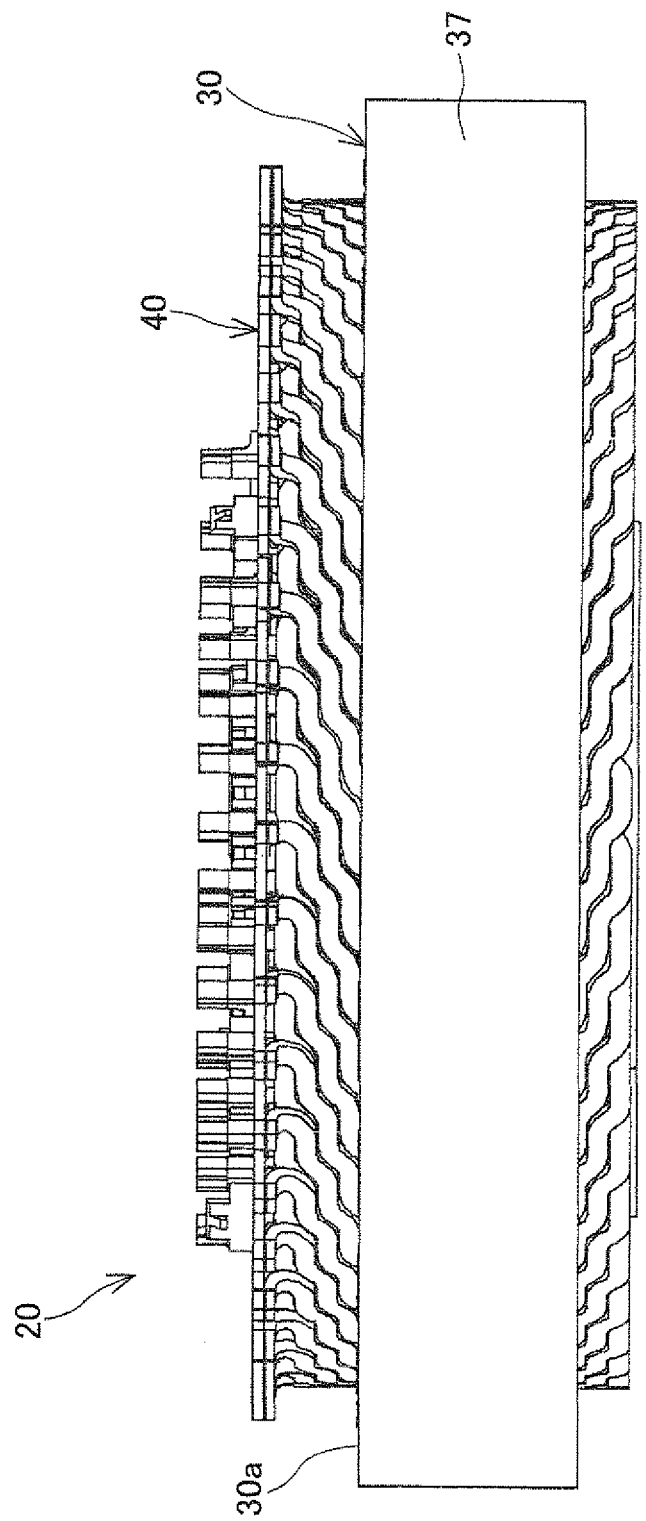
FIG. 4 is a side view of the stator.

Referring now to FIGS. 2-4, the stator 20 includes a hollow cylindrical stator core 30 and a three-phase stator coil 40 that is comprised of a plurality of (e.g., 48 in the present embodiment) electric wires 50 mounted on the stator core 30. In addition, the stator 20 may further include insulating paper interposed between the stator core 30 and the stator coil 40.

Figure 5:
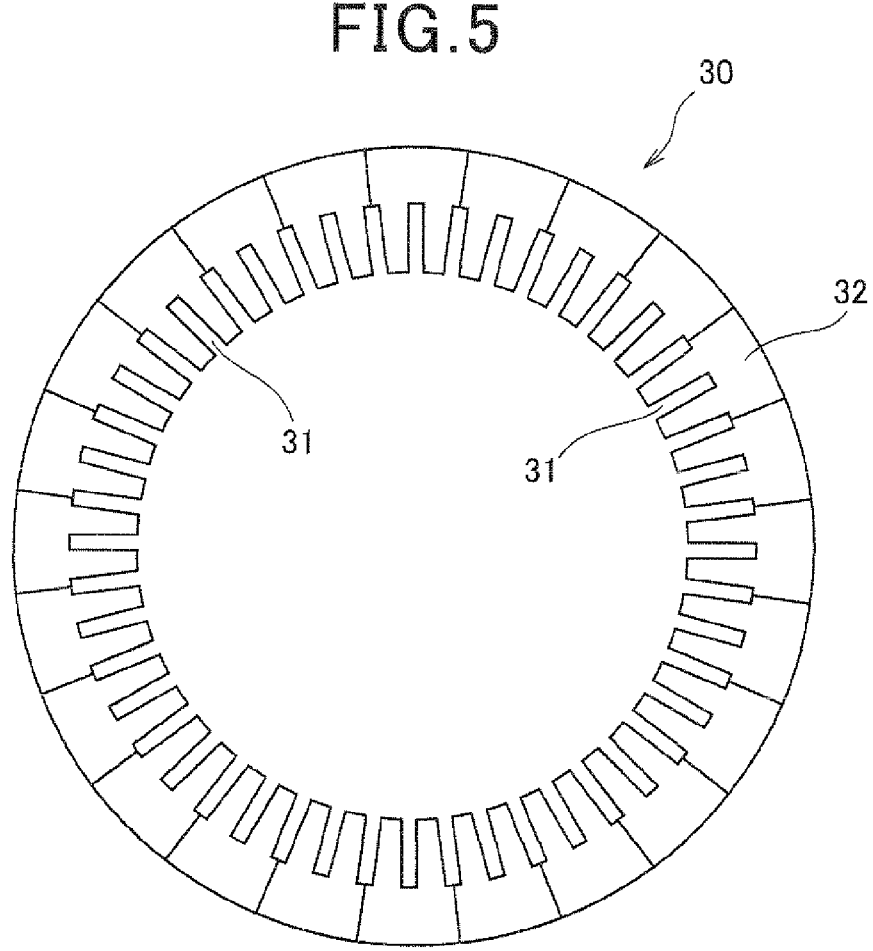
FIG. 5 is a top view of a stator core of the stator.

The stator core 30 has, as shown in FIG. 5, a plurality of slots 31 that are formed in the radially inner surface of the stator core 30 and spaced in the circumferential direction of the stator core 30 at a predetermined pitch. For each of the slots 31, the depth-wise direction of the slot 31 is coincident with a radial direction of the stator core 30. In the present embodiment, there are provided two slots 31 per magnetic pole of the rotor 7 that has the eight magnetic poles and per phase of the three-phase stator coil 40. Accordingly, the total number of the slots 31 provided in the stator core 30 is equal to 48 (i.e., 2×8×3).

Figure 6:
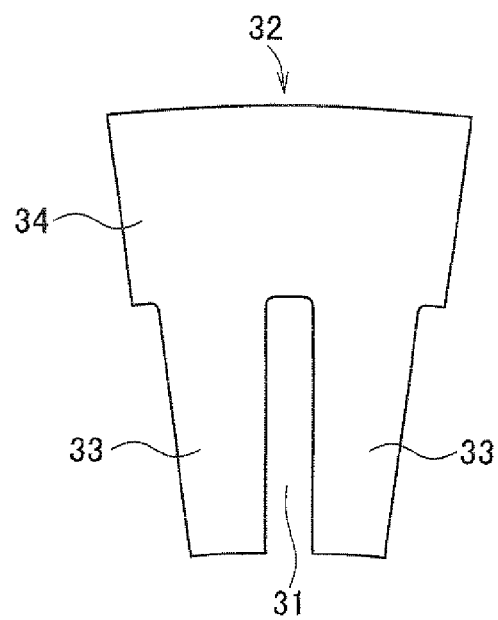
FIG. 6 is a top view of one of stator core segments which together make up the stator core.

Moreover, in the present embodiment, the stator core 30 is composed of, for example, 24 stator core segments 32 as shown in FIG. 6. The stator core segments 32 are joined together so as to adjoin one another in the circumferential direction of the stator core 30. Each of the stator core segments 32 defines therein one of the slots 31. Further, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is located radially outward of the tooth portions 33 to connect them. In addition, on the radially outer surfaces of the stator core segments 32, there is fitted a cylindrical outer rim 37 (see FIGS. 2-4).

In the present embodiment, each of the stator core segments 32 is formed by laminating a plurality of magnetic steel sheets with insulating films interposed therebetween. It should be noted that other conventional metal sheets may also be used instead of the magnetic steel sheets.

FIGS. 7-10 together show the configuration of the stator coil 40, which is formed with the electric wires 50 into a hollow cylindrical shape.

As shown in FIGS. 7-10, the stator coil 40 has, as a whole, a straight part 41 to be received in the slots 31 of the stator core 30, and a pair of coil end parts 42 that are respectively formed on opposite axial sides of the straight part 41 and to be located outside the slots 31. Moreover, on one axial side of the straight part 41, U-phase, V-phase, and W-phase output terminals and U-phase, V-phase, and W-phase neutral terminals of the stator coil 40 protrude from the annular axial end face of the coil end part 42, and a plurality of crossover parts 70 of the electric wires 50 cross over the axial end face from the radially inner side to the radially outer side of the axial end face to connect corresponding pairs of the electric wires 50.

Figure 11A:
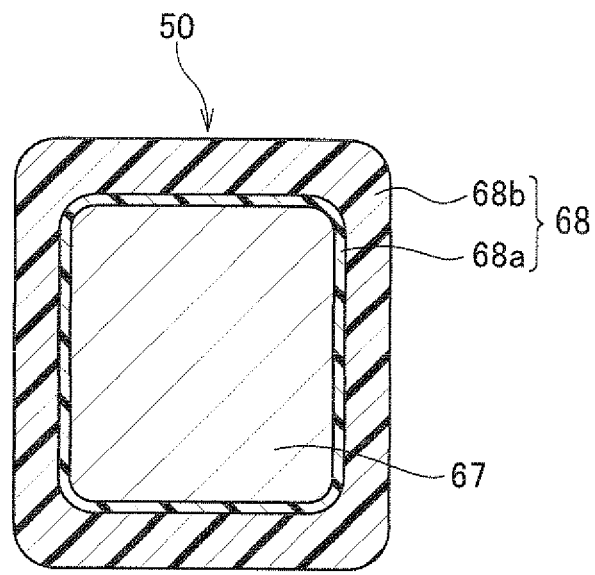
FIG. 11A is a cross-sectional view illustrating the configuration of electric wires forming the stator coil.

Each of the electric wires 50 for forming the stator coil 40 is configured with, as shown in FIG. 11A, an electric conductor 67 and an insulating coat 68 that covers the outer surface of the electric conductor 67. In the present embodiment, the electric conductor 67 is made of copper and has a substantially rectangular cross section. The insulating coat 68 is two-layer structured to include an inner layer 68a and an outer layer 68b. The thickness of the insulating coat 68 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper therebetween. However, it is also possible to interpose insulating paper between the electric wires 50 so as to further enhance the electrical insulation therebetween.

Further, the outer layer 68b is made of an insulating material such as nylon. The inner layer 68a is made of a thermoplastic resin having a higher glass transition temperature than the outer layer 68b or an insulating material having no glass transition temperature such as a polyamide-imide resin. Consequently, the outer layers 68*b* of the electric wires 50 will be solidified by the heat generated by operation of the electric rotating machine 1 earlier than the inner layers 68*a*. As a result, the surface hardness of the outer layers 68*b* will be increased, thereby enhancing the electrical insulation between the electric wires 50.

Figure 11B:
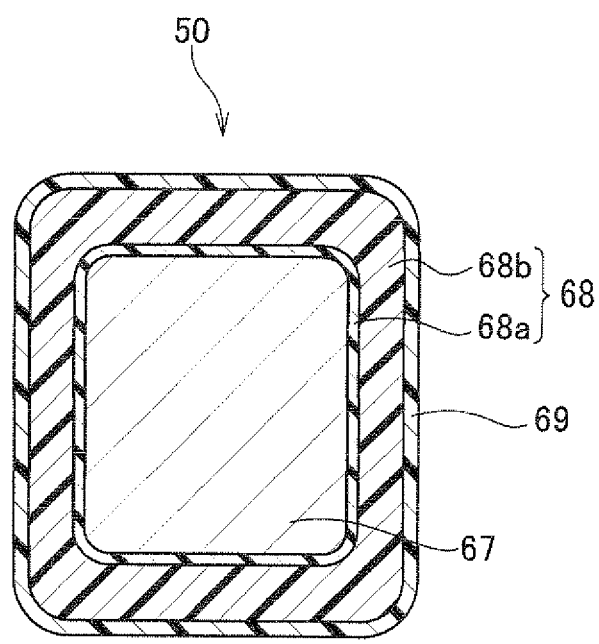
FIG. 11B is a cross-sectional view illustrating a modification of the configuration of the electric wires shown in FIG. 10A.

Furthermore, as shown in FIG. 11B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine 1 earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 68*b* of the insulating coats 68 of the electric wires 50 may also be made of PPS (polyphenylene sulfide).

FIGS. 12A-12B together show the shape of each of the electric wires 50 before the electric wires 50 are rolled into a spiral shape as to be described later.

As shown in FIGS. 12A-12B, each of the electric wires 50 is substantially planar and wave-shaped to include a plurality of in-slot portions 51 and a plurality of turn portions 52. The in-slot portions 51 are spaced in the longitudinal direction Y of the electric wire 50 at predetermined pitches and extend perpendicular to the longitudinal direction Y. Each of the in-slot portions 51 is to be received in a corresponding one of the slots 31 of the stator core 30. Each of the turn portions 52 extends to connect a corresponding adjacent pair of the in-slot portions 51 and is to be located outside the slots 31 of the stator core 30.

Specifically, the plurality of in-slot portions 51 include, at least, a first in-slot portion 51A, a second in-slot portion 51B, and a third in-slot portion 51C. The first, second and third in-slot portions 51A, 51B, and 51C are to be respectively received in three different slots 31 of the stator core 30; the three slots 31 are circumferentially spaced at a pitch of six slots 31. On the other hand, the plurality of turn portions 52 include, at least, a first turn portion 52A and a second turn portion 52B. The first turn portion 52A connects the first and second in-slot portions 51A and 51B and is to be located on one axial side of the stator core 30 outside the slots 31. The second turn portion 52B connects the second and third in-slot portions 51B and 51C and is to be located on the other axial side of the stator core 30 outside the slots 31.

More specifically, in the present embodiment, as shown in FIGS. 12A-12B, the plurality of in-slot portions 51 include first to twelfth in-slot portions 51A-51L which are to be sequentially received in eight slots 31 that are circumferentially spaced at a pitch of six slots 31. In other words, the number of the in-slot portions 51 in each of the electric wires 50 is equal to 12. On the other hand, the plurality of turn portions 52 include first to eleventh turn portions 52A-52K which each connect a corresponding adjacent pair of the in-slot portions 51A-51L and are to be alternately located on the opposite axial sides of the stator core 30 outside the slots 31. In other words, the number of the turn portions 52 in each of the electric wires 50 is equal to 11.

Moreover, the predetermined pitches X between the in-slot portions 51A-51L in the longitudinal direction Y of the electric wire 50 gradually decrease in a direction from the first in-slot portion 51A to the twelfth in-slot portion 51L. That is, X1>X2>X3>X4>X5>X6>X7>X8>X9>X10>X11. In addition, the predetermined pitches X1-X11 are set based on the circumferential distances between the eight slots 31 of the stator core 30 in which the in-slot portions 51A-51L are to be received.

Each of the electric wires 50 further includes a pair of lead portions 53*a* and 53*b* that are respectively formed at opposite ends of the electric wire 50 for connecting the electric wire 50 with other electric wires 50. The lead portion 53*a* is connected to the first in-slot portion 51A via a half-turn portion 52M that extends from the first in-slot portion 51A to return inward (i.e., rightward in FIG. 12B) in the longitudinal direction Y of the electric wire 50. The length of the half-turn portion 52M is substantially half the length of the first turn portion 52A. Consequently, the lead portion 53*a* is offset inward (i.e., rightward in FIG. 12B) in the longitudinal direction Y from the first in-slot portion 51A by the length of the half-turn portion 52M. On the other hand, the lead portion 53*b* is connected to the twelfth in-slot portion 51L via a half-turn portion 52N that extends from the twelfth in-slot portion 51L to return inward (i.e., leftward in FIG. 12B) in the longitudinal direction Y of the electric wire 50. The length of the half-turn portion 52N is substantially half the length of the eleventh turn portion 52K. Consequently, the lead portion 53*b* is offset inward (i.e., leftward in FIG. 12B) in the longitudinal direction Y from the twelfth in-slot portion 51L by the length of the half-turn portion 52N. Further, the lead portion 53*b* is formed to include therein one of the crossover parts 70 described previously.

Furthermore, as shown in FIG. 12A, each of the turn portions 52 includes, substantially at the center thereof, a crank-shaped part 54 that is bent to offset the turn portion 52 in a direction perpendicular to both the longitudinal direction Y of the electric wire 50 and the extending direction of the in-slot portions 51. Consequently, with the crank-shaped parts 54, the electric wire 50 is stepped to successively offset the in-slot portions 51 in the direction perpendicular to both the longitudinal direction Y and the extending direction of the in-slot portions 51. It should be noted that the term "crank-shaped" is used here only for the purpose of describing the overall shape of the parts 54 and does not restrict the internal angles between adjacent sections of the parts 54 to 90°.

Figure 13A:
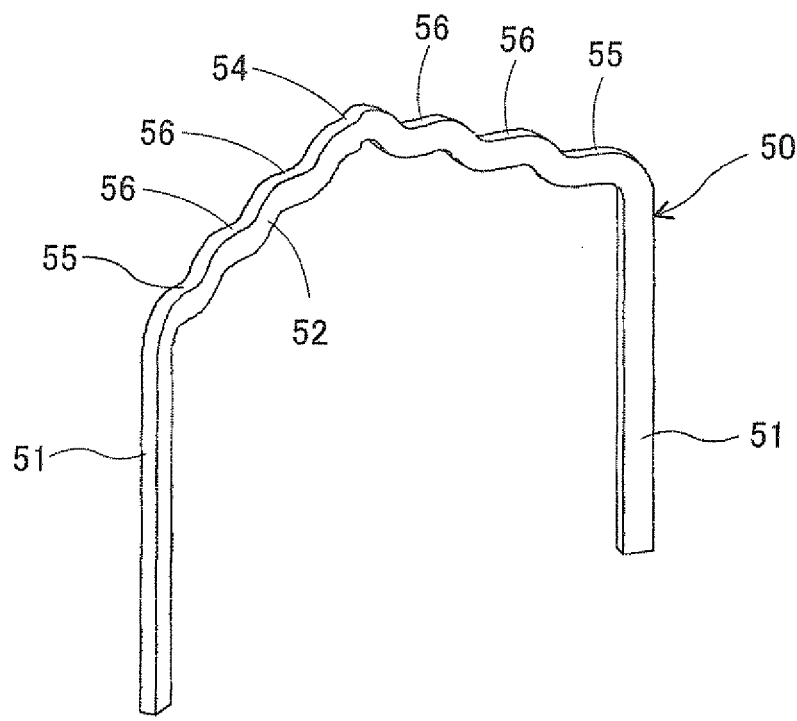
FIG. 13A is a perspective view illustrating a turn portion of one of the electric wires.
Figure 13B:
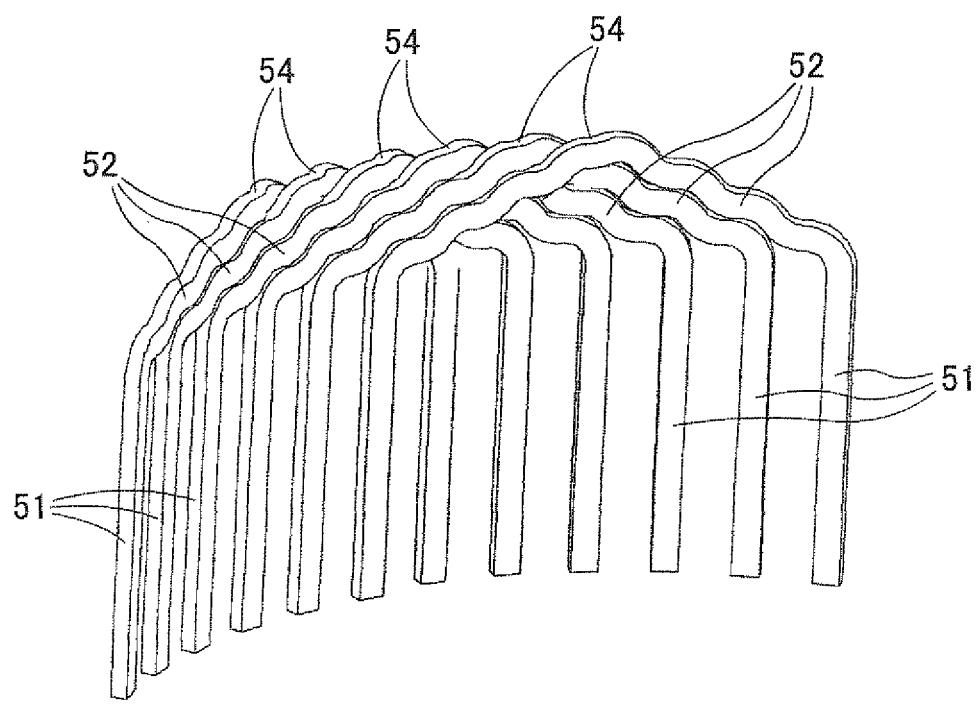
FIG. 13B is a perspective view illustrating a plurality of turn portions of the electric wires which are adjacent to one another.

Referring now to FIGS. 13A-13B, after forming the stator coil 40 with the electric wires 50 and assembling the stator core 30 to the stator coil 40, each of the turn portions 52 (i.e., 52A-52K) of the electric wires 50 is offset by the crank-shaped part 54 formed therein in a radial direction of the stator core 30. In addition, though not shown in FIGS. 13A-13B, each of the crank-shaped parts 54 formed in the turn portions 52 of the electric wires 50 extends parallel to a corresponding axial end face 30*a* of the stator core 30.

Further, in the present embodiment, the amount of radial offset made by each of the crank-shaped parts 54 is set to be equal to the radial thickness of the in-slot portions 51 of the electric wires 50. Here, the amount of radial offset made by each of the crank-shaped parts 54 is defined as the difference in radial position between the opposite ends of the crank-shaped part 54. Accordingly, for each of the electric wires 50, the difference in radial position between each adjacent pair of the in-slot portions 51, which are connected by a corresponding one of the turn portions 52, is equal to the radial thickness (i.e., thickness in the radial direction of the stator core 30) of the in-slot portions 51.

Setting the amount of radial offset as above, it is possible to arrange each adjacent pair of the turn portions 52 of the electric wires 50 in intimate contact with each other, as shown in FIG. 13B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

Moreover, as shown in FIGS. 13A-13B, each of the turn portions 52 of the electric wires 50 includes a pair of shoulder parts 55 which respectively adjoin the pair of the in-slot portions 51 connected by the turn portion 52 and both extend substantially perpendicular to the pair of the in-slot portions 51 (or substantially parallel to the corresponding axial end face 30a of the stator core 30). Consequently, with the shoulder parts 55, the protruding height of each of the turn portions 52 from the corresponding axial end face 30a of the stator core 30 can be reduced. As a result, the axial length of the coil end parts 42 of the stator coil 40 can be reduced. In addition, the coil end parts 42 of the stator coil 40 are each comprised of those of the turn portions 52 of the electric wires 50 which are located on the same axial side of the stator core 30.

Furthermore, in the present embodiment, there is specified the following dimensional relationship: d1≤d2, where d1 is the length of each of the shoulder parts 55 of the electric wires 50 in the circumferential direction of the stator core 30 and d2 is the distance between each circumferentially-adjacent pair of the slots 31 of the stator core 30.

Specifying the above relationship, it is possible to prevent interference between each pair of the turn portions 52 of the electric wires 50 which respectively protrude from one circumferentially-adjacent pair of the slots 31 of the stator core 30. Consequently, it is possible to prevent both the axial length and radial thickness of the coil end parts 42 of the stator coil 40 from being increased for preventing the above-described interference.

Moreover, as shown in FIGS. 13A-13B, each of the turn portions 52 of the electric wires 50 further includes two shoulder parts 56 between the crank-shaped part 54 and each of the shoulder parts 55. Accordingly, each of the turn portions 52 of the electric wires 50 includes one crank-shaped part 54, two shoulder parts 55, and four shoulder parts 56. Each of the shoulder parts 56 extends, like the shoulder parts 55, substantially perpendicular to the in-slot portions 51 (or substantially parallel to the corresponding axial end face 30a of the stator core 30). Consequently, with the shoulder parts 56, the protruding height of each of the turn portions 52 from the corresponding axial end face 30a of the stator core 30 can be further reduced. As a result, the axial length of the coil end parts 42 of the stator coil 40 can be further reduced. In addition, each of the turn portions 52 of the electric wires 50 can be seen as being stepped on both sides of the crank-shaped part 54 to reduce its protruding height from the corresponding axial end face 30a of the stator core 30.

In the present embodiment, the stator coil 40 is formed with the 48 electric wires 50 as shown in FIGS. 12A-12B. It should be noted that the crossover parts 70 may be omitted from some of the electric wires 50 for facilitating the formation of the U-phase, V-phase, and W-phase output terminals and the U-phase, V-phase, and W-phase neutral terminals in the stator coil 40. However, in any case, it is preferable that all of the electric wires 50 have the same shape at least between the lead portions 53a and 53b.

Figure 7:
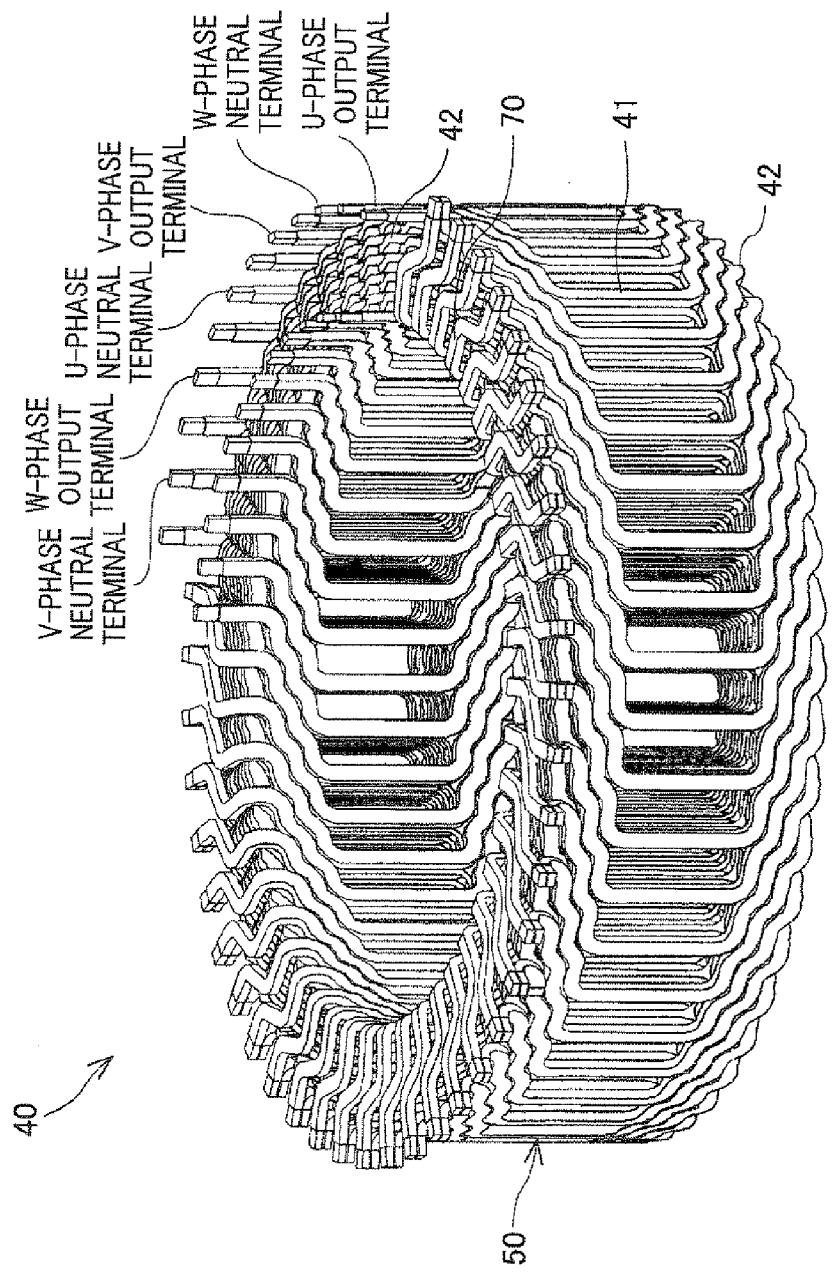
FIG. 7 is a perspective view of a stator coil of the stator.
Figure 8:
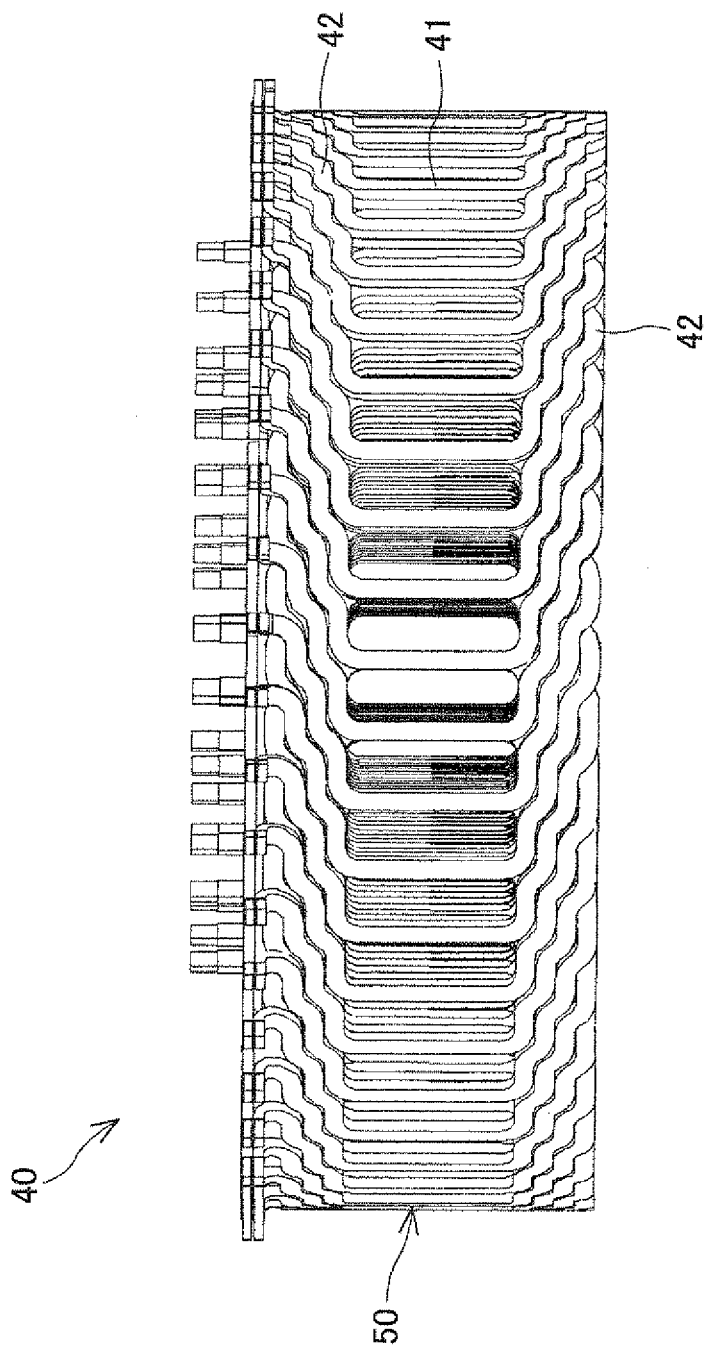
FIG. 8 is a side view of the stator coil.

As described previously, each of the turn portions 52 of the electric wires 50 includes, substantially at the center thereof, the crank-shaped part 54 by which the turn potion 52 is radially offset by the radial thickness of the in-slot portions 51. Accordingly, for each of the electric wires 50, the difference in radial position between each adjacent pair of the in-slot portions 51, which are connected by a corresponding one of the turn portions 52, is equal to the radial thickness of the in-slot portions 51. Moreover, for each of the electric wires 50, the first in-slot portion 51A is located most radially outward while the twelfth in-slot portion 51L is located most radially inward; the predetermined pitches X between the in-slot portions 51A-51L gradually decrease in a direction from the first in-slot portion 51A to the twelfth in-slot portion 51L (see FIG. 12B). Consequently, those of the in-slot portions 51 of the electric wires 50 which are stacked in a radial direction of the stator coil 40 (or a radial direction of the stator core 30) can be aligned straight in the radial direction, thereby allowing the stator coil 40 to have a substantially perfect hollow-cylindrical shape as shown in FIGS. 7 and 8.

Furthermore, all of the ith in-slot portions 51 of the 48 electric wires 50 are located respectively in the 48 slots 31 of the stator core 30 at the same radial position, where i=1, 2, . . . , 12. For example, all of the first in-slot portions 51A of the 48 electric wires 50 are located respectively in the 48 slots 31 and positioned most radially outward in the respective slots 31; all of the twelfth in-slot portions 51L of the 48 electric wires 50 are located respectively in the 48 slots 31 and positioned most radially inward in the respective slots 31. With the above location of the in-slot portions 51 of the electric wires 50, both the outside and inside diameters of the stator coil 40 can be made uniform in the circumferential direction of the stator core 30.

In the present embodiment, as shown in FIG. 14, the stator coil 40 is formed as a three-phase coil which is comprised of three phase windings (i.e., U-phase, V-phase, and W-phase windings) 43. Each of the U-phase, V-phase, and W-phase windings 43 is formed by serially connecting 16 electric wires 50. Further, the U-phase output and neutral terminals are respectively formed at the opposite ends of the U-phase winding 43; the V-phase output and neutral terminals are respectively formed at the opposite ends of the V-phase winding 43; and the W-phase output and neutral terminals are respectively formed at the opposite ends of the W-phase winding 43. Furthermore, the U-phase, V-phase, and W-phase windings 43 are Y-connected to define a neutral point therebetween. That is, the U-phase, V-phase, and W-phase neutral terminals of the U-phase, V-phase, and W-phase windings 43 are joined together at the neutral point. Consequently, three-phase AC power is input to or output from the stator coil 40 via the U-phase, V-phase, and W-phase output terminals.

Figure 15:
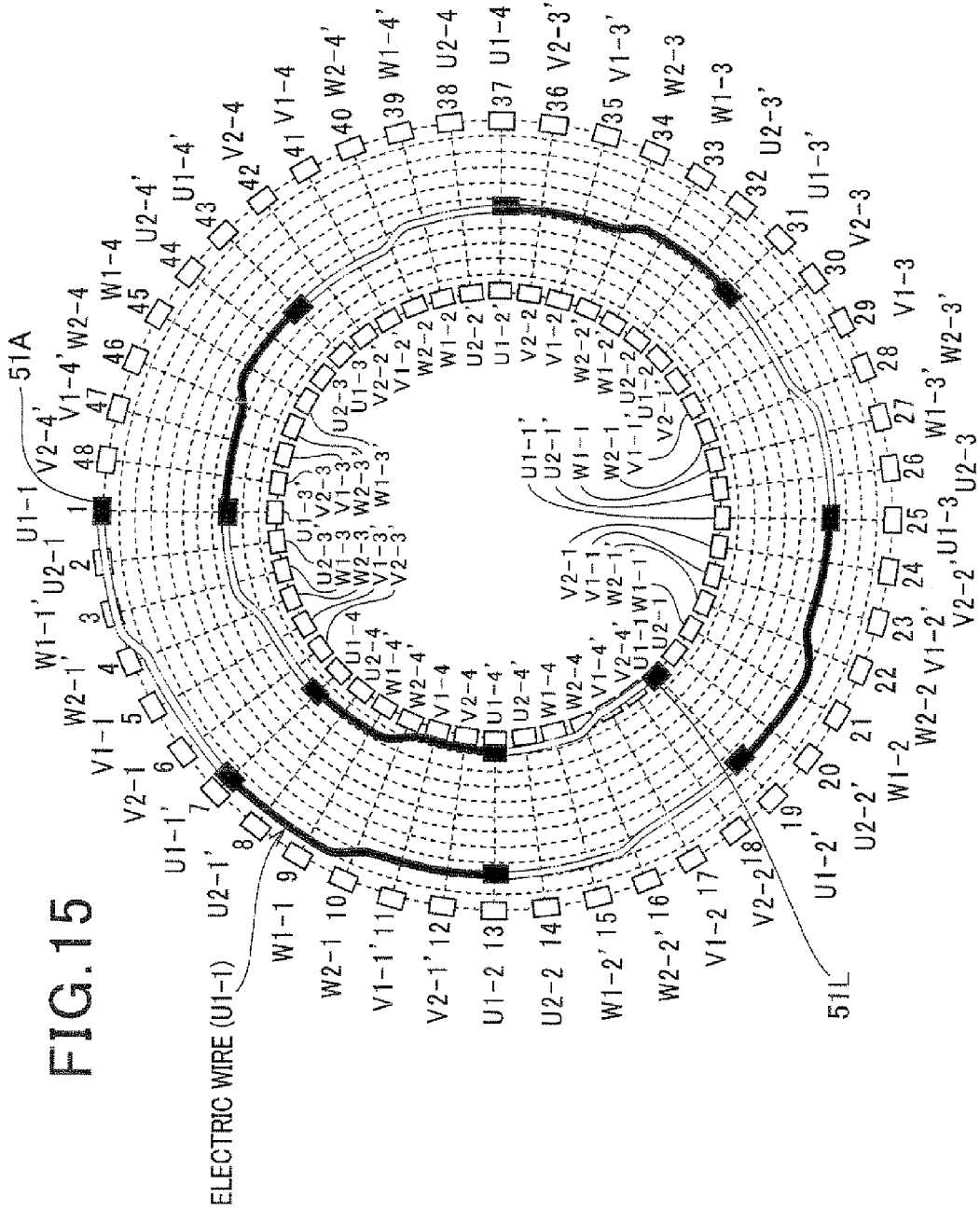
FIG. 15 is a schematic view illustrating the location of the radially outermost in-slot portion of each of the electric wires in the stator core.
Figure 16:
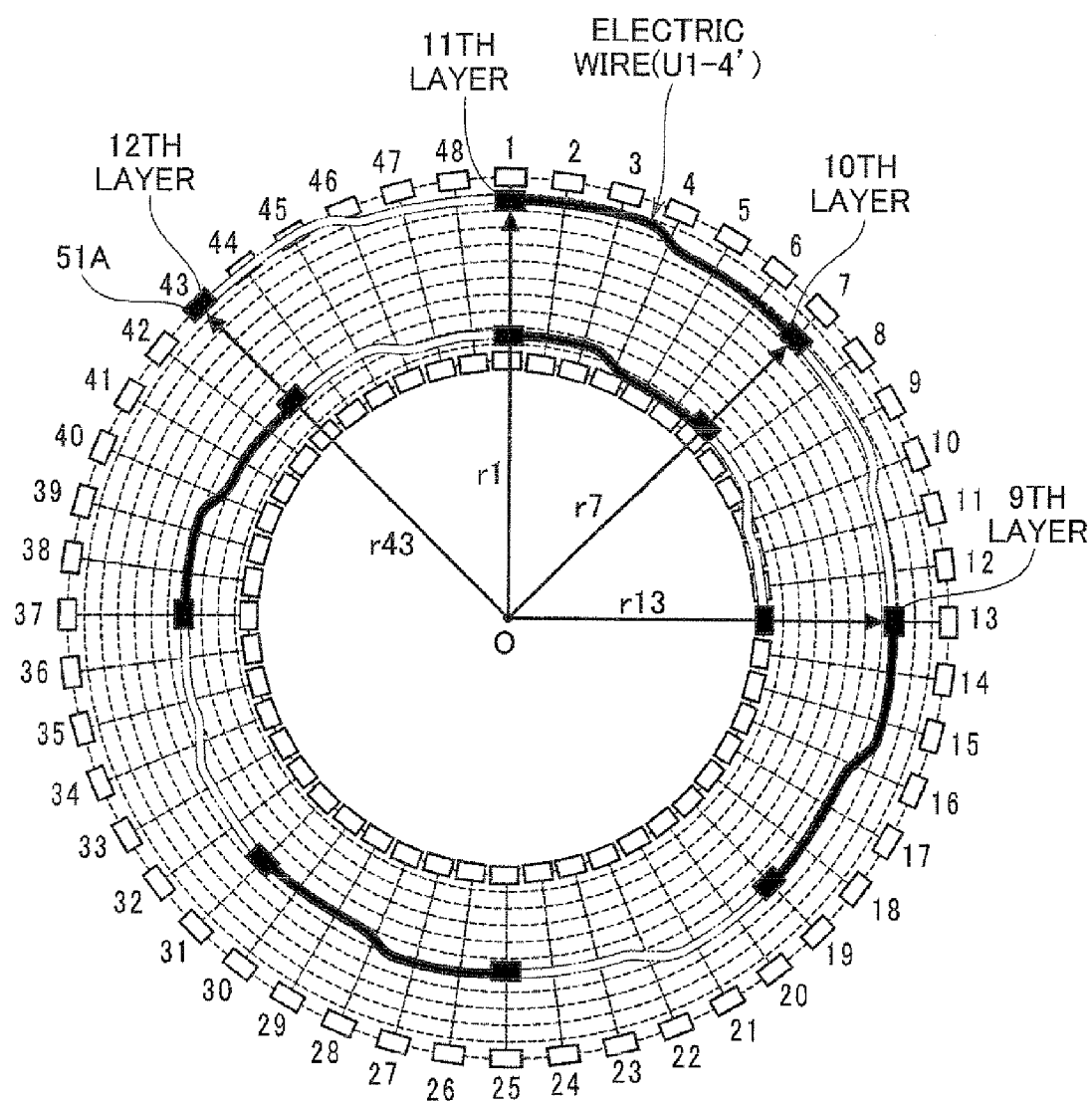
FIG. 16 is a schematic view illustrating the manner of extension of the electric wire labeled (U1-4') when viewed along the longitudinal axis O of the stator core.

In FIGS. 15 and 16, the intersections between 12 dashed-line circles and 48 radially-extending dashed lines represent the positions of the in-slot portions 51 of the electric wires 50. In addition, among the positions of the in-slot portions 51, only the radially outermost and radially-innermost ones are denoted by rectangles.

It can be seen from FIGS. 15 and 16 that in the present embodiment, in each of the slots 31 of the stator core 30, the in-slot portions 51 of the electric wires 50 are radially stacked in 12 layers.

Further, in FIGS. 15 and 16, the numbers 1-48 of the slots 31 of the stator core 30 are respectively shown radially outside the 48 radially-extending dashed lines. In addition, in FIG. 15, each of the 48 electric wires 50 is labeled radially outside the slot 31 in which the first in-slot portion 51A of the electric wire 50 is located most radially outward (i.e., located at the twelfth layer in the slot 31); each of the 48 electric wires 50 is also labeled radially inside the slot 31 in which the twelfth in-slot portion 51L of the electric wire 50 is located most radially inward (i.e., located at the first layer in the slot 31).

In the present embodiment, each of the U-phase, V—phase, and W-phase windings 43 of the stator coil 40 is formed with first and second electric wire groups each consisting of eight electric wires 50. The in-slot portions 51 of the electric wires 50 of the first group are received in eight common slots 31 of the stator core 30. Similarly, the in-slot portions 51 of the electric wires 50 of the second group are also received in another eight common slots 31 of the stator core 30. That is, the in-slot portions 51 of the electric wires 50 of the first group are received in different slots 31 from the in-slot portions 51 of the electric wires 50 of the second group.

For example, the U-phase winding 43 is formed with a first electric wire group, which consists of the electric wires 50 labeled (U1-1) to (U1-4) and (U1-1') to (U1-4'), and a second electric wire group that consists of the electric wires 50 labeled (U2-1) to (U2-4) and (U2-1') to (U2-4'). The in-slot portions 51 of the (U1-1) to (U1-4) and (U1-1') to (U1-4') electric wires 50 are received in the Nos. 1, 7, 13, 19, 25, 31, 37, and 43 slots 31 of the stator core 30. On the other hand, the in-slot portions 51 of the (U2-1) to (U2-4) and (U2-1') to (U2-4') electric wires 50 are received in the Nos. 2, 8, 14, 20, 26, 32, 38, and 44 slots 31 of the stator core 30.

FIG. 15 illustrates, from one axial side of the stator core 30, the arrangement of each of the 48 electric wires 50 by taking the (U1-1) electric wire 50 as an example. Specifically, in FIG. 15, the positions of the in-slot portions 51 of the (U1-1) electric wire 50 are denoted by black rectangles; those of the turn portions 52 of the (U1-1) electric wire 50 which are located on the one axial side of the stator core 30 (i.e., on the front side of the paper surface of FIG. 15) are denoted by circumferentially-extending heavy lines; and those of the turn portions 52 of the (U1-1) electric wire 50 which are located on the other axial side of the stator core 30 (i.e., on the rear side of the paper surface of FIG. 15) are denoted by circumferentially-extending two-dot dashed lines. As seen from FIG. 15, for the (U1-1) electric wire 50, the first in-slot portion 51A is located at the twelfth layer (i.e., the radially outermost layer) in the No. 1 slot 31; the twelfth in-slot portion 51L is located at the first layer (i.e., the radially-innermost layer) in the No. 19 slot 31; the first to the twelfth in-slot portions 51A-51L are circumferentially spaced at a six-slot pitch; and the radial positions of the in-slot portions 51A-51L are successively offset radially inward by one layer each time.

FIG. 16 illustrates, from the other axial side of the stator core 30, the arrangement of each of the 48 electric wires 50 by taking the (U1-4') electric wire 50 as an example. Specifically, in FIG. 16, the positions of the in-slot portions 51 of the (U1-4') electric wire 50 are denoted by black rectangles; those of the turn portions 52 of the (U1-4') electric wire 50 which are located on the other axial side of the stator core 30 (i.e., on the front side of the paper surface of FIG. 16) are denoted by circumferentially-extending heavy lines; and those of the turn portions 52 of the (U1-4') electric wire 50 which are located on the one axial side of the stator core 30 (i.e., on the rear side of the paper surface of FIG. 16) are denoted by circumferentially-extending two-dot dashed lines. As seen from FIG. 16, for the (U1-4') electric wire 50, the first in-slot portion 51A is located at the twelfth layer in the No. 43 slot 31; the twelfth in-slot portion 51L is located at the first layer in the No. 13 slot 31; the first to the twelfth in-slot portions 51A-51L are circumferentially spaced at a six-slot pitch; and the radial positions of the in-slot portions 51A-51L are successively offset by one layer each time.

As described previously, in the present embodiment, the stator core 30 has the 48 slots 31 formed therein, while the stator coil 40 is formed with the 48 electric wires 50. The electric wires 50 are mounted on the stator core 30 so that they are offset from one another in the circumferential direction of the stator core 30 by one slot pitch of the stator core 30. Consequently, the first in-slot portions 51A of the 48 electric wires 50 are respectively located at the radially outermost layers (i.e., the twelfth layers) in the 48 slots 31; the twelfth in-slot portions 51L of the 48 electric wires 50 are respectively located at the radially-innermost layers (i.e., the first layers) in the 48 slots 31.

FIG. 17 shows both the label of the electric wire 50 located at the radially outermost layer and the label of the electric wire 50 located at the radially-innermost layer in each of the slots 31 of the stator core 30.

In the present embodiment, for each of the 48 electric wires 50 forming the stator coil 40, the radial distances from the longitudinal axis O of the stator core 30 to the in-slot portions 51 of the electric wire 50 successively decrease in the sequence from the first in-slot portion 51A to the twelfth in-slot portion 51L. Moreover, for each of the 48 electric wires 50, the difference in radial distance from the axis O of the stator core 30 between each adjacent pair of the in-slot portions 51, which are connected by a corresponding one of the turn portions 52, is equal to the radial thickness of the in-slot portions 51.

For example, referring back to FIG. 16, for the (U1-4') electric wire 50, there is satisfied the following relationship: r43>r1>r7>r13. Here, r43 represents the radial distance from the axis O of the stator core 30 to the first in-slot portion 51A that is located at the twelfth layer in the No. 43 slot 31; r1 represents the radial distance from the axis O to the second in-slot portion 51B that is located at the eleventh layer in the No. 1 slot 31; r7 represents the radial distance from the axis O to the third in-slot portion 51C that is located at the tenth layer in the No. 7 slot 31; and r13 represents the radial distance from the axis O to the fourth in-slot portion 51D that is located at the ninth layer in the No. 13 slot 31. Further, the radial distances r43, r1, r7, and r13 successively decrease in decrements of the radial thickness of the in-slot portions 51.

Figure 18:
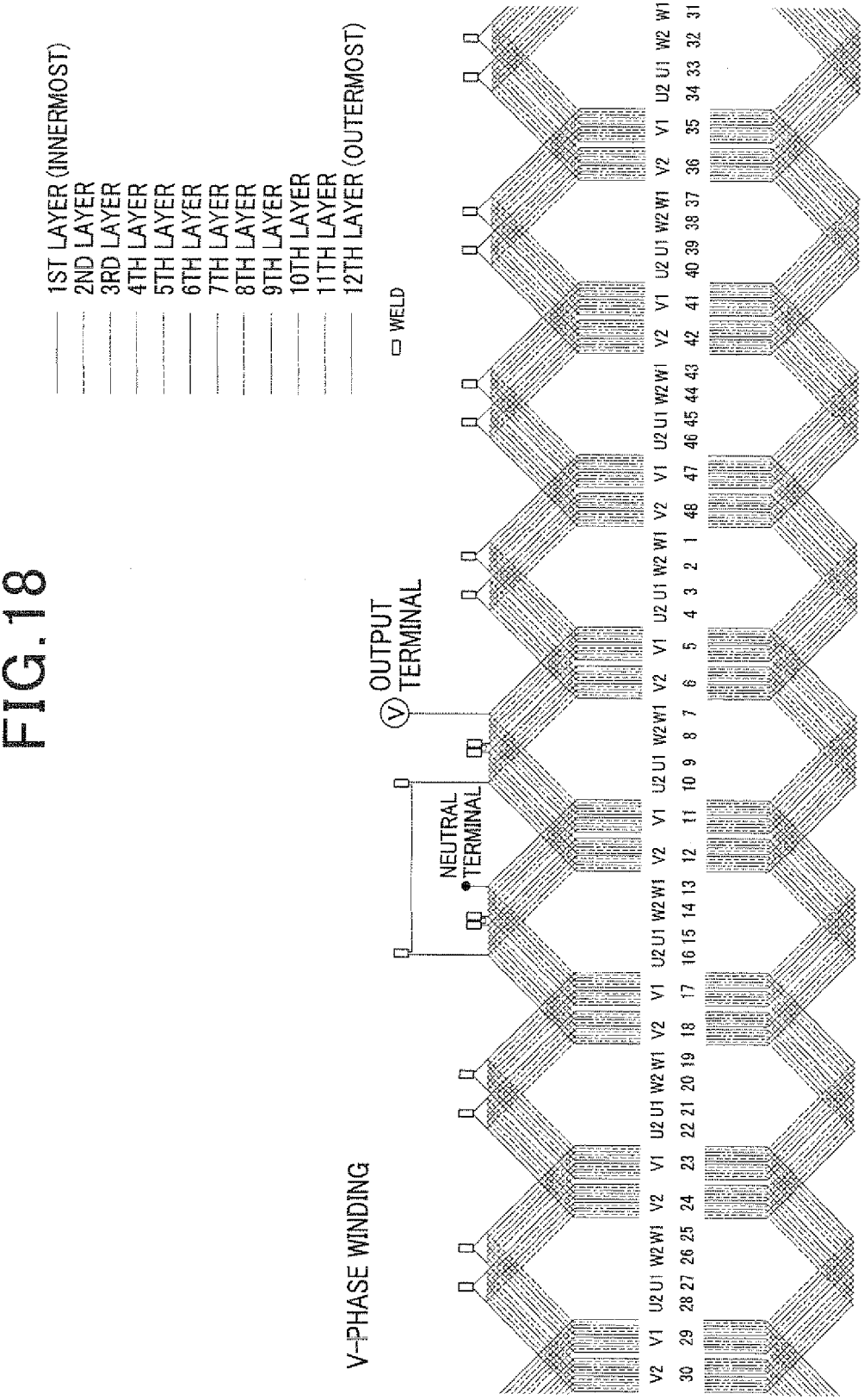
FIG. 18 is a schematic view illustrating the connection between those of the electric wires which together form a V-phase winding of the stator coil when viewed from the radially inner side of the stator core.

Next, with reference to FIGS. 14 and 17-18, the manner of serially connecting the 16 electric wires 50 for forming the V-phase winding 43 of the stator coil 40 will be described. In addition, it should be noted that the electric wires 50 for forming the U-phase and W-phase windings 43 of the stator coil 40 are also connected in the same manner as those for forming the V-phase winding 43.

As shown in FIG. 14, the V-phase winding 43 is formed by serially connecting the (V1-1) to (V1-4), (V1-1') to (V1-V4'), (V2-1) to (V2-4), and (V2-1') to (V2-4') electric wires 50.

Specifically, to the V-phase output terminal, there is connected the first in-slot portion 51A-side end of the (V1-1) electric wire 50. Moreover, as shown in FIGS. 17 and 18, for the (V1-1) electric wire 50, the first in-slot portion 51A is located at the radially outermost layer (i.e., the twelfth layer) in the No. 5 slot 31 of the stator core 30, while the twelfth in-slot portion 51L is located at the radially-innermost layer (i.e., the first layer) in the No. 23 slot 31.

To the twelfth in-slot portion 51L-side end of the (V1-1) electric wire 50, there is connected the first in-slot portion 51A-side end of the (V1-2) electric wire 50. Moreover, for the (V1-2) electric wire 50, the first in-slot portion 51A is located at the radially outermost layer in the No. 17 slot 31, while the twelfth in-slot portion 51L is located at the radially innermost layer in the No. 35 slot 31.

To the twelfth in-slot portion 51L-side end of the (V1-2) electric wire 50, there is connected the first in-slot portion 51A-side end of the (V1-3) electric wire 50. Moreover, for the (V1-3) electric wire 50, the first in-slot portion 51A is located at the radially outermost layer in the No. 29 slot 31, while the twelfth in-slot portion 51L is located at the radially innermost layer in the No. 47 slot 31.

To the twelfth in-slot portion 51L-side end of the (V1-3) electric wire 50, there is connected the first in-slot portion 51A-side end of the (V1-4) electric wire 50. Moreover, for the (V1-4) electric wire 50, the first in-slot portion 51A is located at the radially outermost layer in the No. 41 slot 31, while the twelfth in-slot portion 51L is located at the radially innermost layer in the No. 11 slot 31.

To the twelfth in-slot portion 51L-side end of the (V1-4) electric wire 50, there is connected the first in-slot portion 51A-side end of the (V2-1) electric wire 50. Moreover, for the (V2-1) electric wire 50, the first in-slot portion 51A is located at the radially outermost layer in the No. 6 slot 31, while the twelfth in-slot portion 51L is located at the radially innermost layer in the No. 24 slot 31.

To the twelfth in-slot portion 51L-side end of the (V2-1) electric wire 50, there is connected the first in-slot portion 51A-side end of the (V2-2) electric wire 50. Moreover, for the (V2-2) electric wire 50, the first in-slot portion 51A is located at the radially outermost layer in the No. 18 slot 31, while the twelfth in-slot portion 51L is located at the radially innermost layer in the No. 36 slot 31.

To the twelfth in-slot portion 51L-side end of the (V2-2) electric wire 50, there is connected the first in-slot portion 51A-side end of the (V2-3) electric wire 50. Moreover, for the (V2-3) electric wire 50, the first in-slot portion 51A is located at the radially outermost layer in the No. 30 slot 31, while the twelfth in-slot portion 51L is located at the radially innermost layer in the No. 48 slot 31.

To the twelfth in-slot portion 51L-side end of the (V2-3) electric wire 50, there is connected the first in-slot portion 51A-side end of the (V2-4) electric wire 50. Moreover, for the (V2-4) electric wire 50, the first in-slot portion 51A is located at the radially outermost layer in the No. 42 slot 31, while the twelfth in-slot portion 51L is located at the radially innermost layer in the No. 12 slot 31.

To the twelfth in-slot portion 51L-side end of the (V2-4) electric wire 50, there is connected the twelfth in-slot portion 31L-side end of the (V2-4') electric wire 50. Moreover, for the (V2-4') electric wire 50, the first in-slot portion 51A is located at the radially outermost layer in the No. 48 slot 31, while the twelfth in-slot portion 51L is located at the radially innermost layer in the No. 18 slot 31.

To the first in-slot portion 51A-side end of the (V2-4') electric wire 50, there is connected the twelfth in-slot portion 51L-side end of the (V2-3') electric wire 50. Moreover, for the (V2-3') electric wire 50, the first in-slot portion 51A is located at the radially outermost layer in the No. 36 slot 31, while the twelfth in-slot portion 51L is located at the radially innermost layer in the No. 6 slot 31.

To the first in-slot portion 51A-side end of the (V2-3') electric wire 50, there is connected the twelfth in-slot portion 51L-side end of the (V2-2') electric wire 50. Moreover, for the (V2-2') electric wire 50, the first in-slot portion 51A is located at the radially outermost layer in the No. 24 slot 31, while the twelfth in-slot portion 51L is located at the radially innermost layer in the No. 42 slot 31.

To the first in-slot portion 51A-side end of the (V2-2') electric wire 50, there is connected the twelfth in-slot portion 51L-side end of the (V2-1') electric wire 50. Moreover, for the (V2-1') electric wire 50, the first in-slot portion 51A is located at the radially outermost layer in the No. 12 slot 31, while the twelfth in-slot portion 51L is located at the radially innermost layer in the No. 30 slot 31.

To the first in-slot portion 51A-side end of the (V2-1') electric wire 50, there is connected the twelfth in-slot portion 51L-side end of the (V1-4') electric wire 50. Moreover, for the (V1-4') electric wire 50, the first in-slot portion 51A is located at the radially outermost layer in the No. 47 slot 31, while the twelfth in-slot portion 51L is located at the radially innermost layer in the No. 17 slot 31.

To the first in-slot portion 51A-side end of the (V1-4') electric wire 50, there is connected the twelfth in-slot portion 51L-side end of the (V1-3') electric wire 50. Moreover, for the (V1-3') electric wire 50, the first in-slot portion 51A is located at the radially outermost layer in the No. 35 slot 31, while the twelfth in-slot portion 51L is located at the radially innermost layer in the No. 5 slot 31.

To the first in-slot portion 51A-side end of the (V1-3') electric wire 50, there is connected the twelfth in-slot portion 51L-side end of the (V1-2') electric wire 50. Moreover, for the (V1-2') electric wire 50, the first in-slot portion 51A is located at the radially outermost layer in the No. 23 slot 31, while the twelfth in-slot portion 51L is located at the radially innermost layer in the No. 41 slot 31.

To the first in-slot portion 51A-side end of the (V1-2') electric wire 50, there is connected the twelfth in-slot portion 51L-side end of the (V1-1') electric wire 50. Moreover, for the (V1-1') electric wire 50, the first in-slot portion 51A is located at the radially outermost layer in the No. 11 slot 31, while the twelfth in-slot portion 51L is located at the radially innermost layer in the No. 29 slot 31. In addition, the first in-slot portion 51A-side end of the (V1-1') electric wire 50 is connected to the V-phase neutral terminal of the stator coil 40.

Further, as described previously, each of the electric wires 50 has the lead portion 53a formed at the first in-slot portion 51A-side end thereof and the lead portion 53b formed at the twelfth in-slot portion 51L-side end thereof (see FIGS. 12A-12B). The lead portion 53a is connected to the first in-slot portion 51A via the half-turn portion 52M, and the lead portion 53b is connected to the twelfth in-slot portion 51L via the half-turn portion 52N. The lead portion 53b also has the crossover part 70 formed therein. In the present embodiment, the connection between the electric wires 50 is made by welding corresponding pairs of the lead portions 53a and 53b of the electric wires 50.

For example, the (V1-1) electric wire 50 has the first in-slot portion 51A located at the radially outermost layer in the No. 5 slot 31 of the stator core 30 and the twelfth in-slot portion 51L located at the radially innermost layer in the No. 23 slot 31. The lead portion 53b of the (V1-1) electric wire 50 is offset, by the length of the half-turn portion 52N in the circumferential direction of the stator core 30, from the No. 23 slot 31 to the vicinity of the No. 20 slot 31. On the other hand, the (V1-2) electric wire 50 has the first in-slot portion 51A located at the radially outermost layer in the No. 17 slot 31 and the twelfth in-slot portion 51L located at the radially innermost layer in the No. 35 slot 31. The lead portion 53a of the (V1-2) electric wire 50 is offset, by the length of the half-turn portion 52M in the circumferential direction of the stator core 30, from the No. 17 slot 31 to the vicinity of the No. 20 slot 31. Further, as shown in FIGS. 7-10, the lead portion 53b of the (V1-1) electric wire 50 is bent radially outward at a substantially right angle to extend from the radially inner periphery of the stator coil 40 to the lead portion 53a of the (V1-2) electric wire 50 which is located on the radially outer periphery of the stator coil 40; then, the lead portion 53b of the (V1-1) electric wire 50 is welded to the lead portion 53a of the (V1-2) electric wire 50. In other words, the twelfth in-slot portion 51L-side end of the (V1-1) electric wire 50 is joined to the first in-slot portion 51A-side end of the (V1-2) electric wire 50 by welding.

Moreover, in the present embodiment, all of the corresponding pairs of the lead portions 53a and 53b of the electric wires 50 are welded radially outside the radially outermost turn portions 52 of the electric wires 50. To this end, each of the lead portions 53b of the electric wires 50 is configured to include the crossover part 70 that crosses over the annular axial end face of the stator coil 40 (more specifically, the annular axial end face of the coil end part 42 of the stator coil 40 which is comprised of the turn portions 52 of the electric wires 50) from the radially inside to the radially outside of the axial end face. Consequently, it is possible to reliably prevent the twelfth in-slot portions 51L of the electric wires 50, which are located most radially inward in the slots 31 of the stator core 30, from protruding radially inward. As a result, it is possible to reliably prevent the stator coil 40 from interfering with the rotor 7 of the electric rotating machine 1 which is located radially inside the stator 20.

Figure 9:
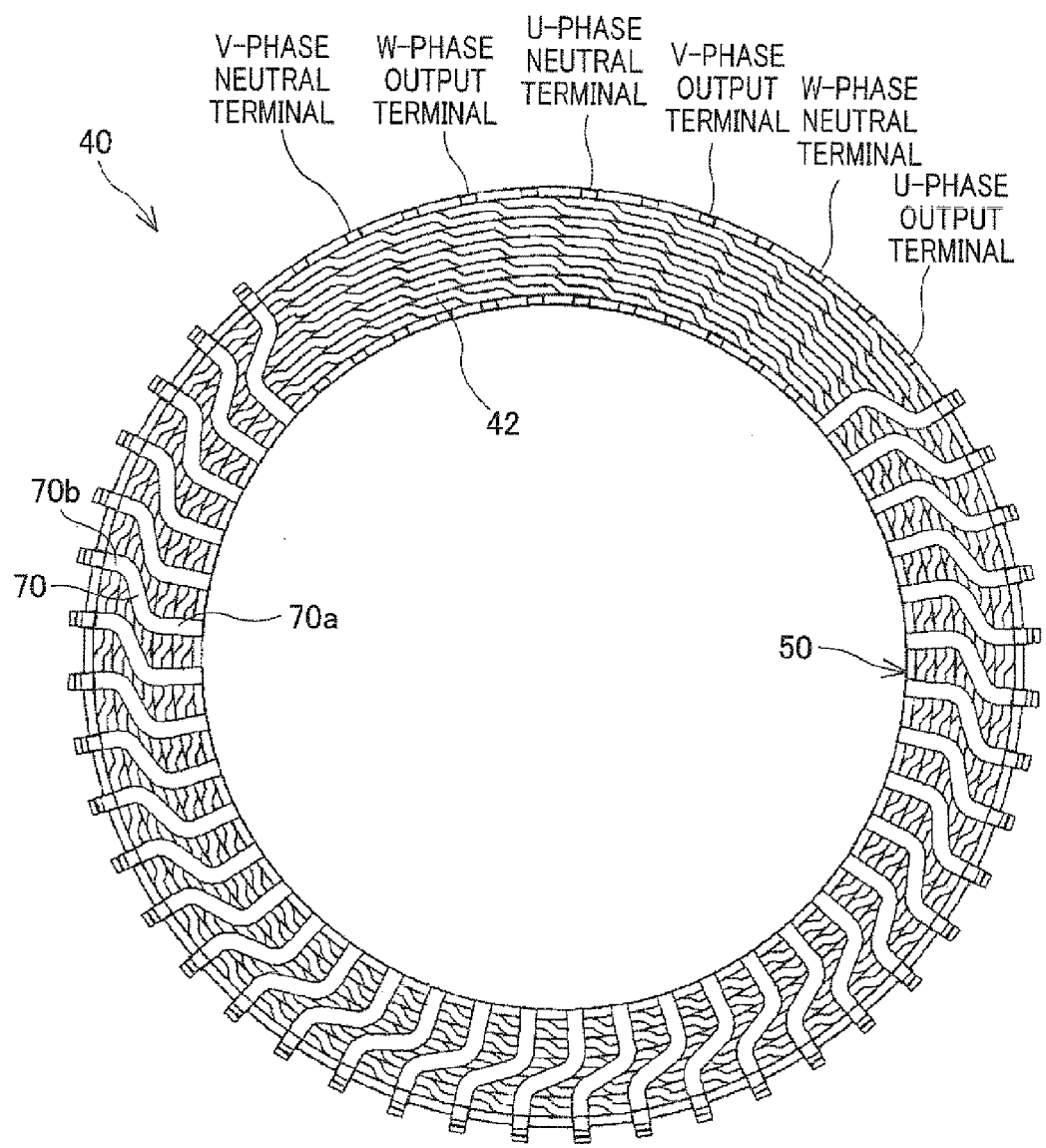
FIG. 9 is a top view of the stator coil.
Figure 10:
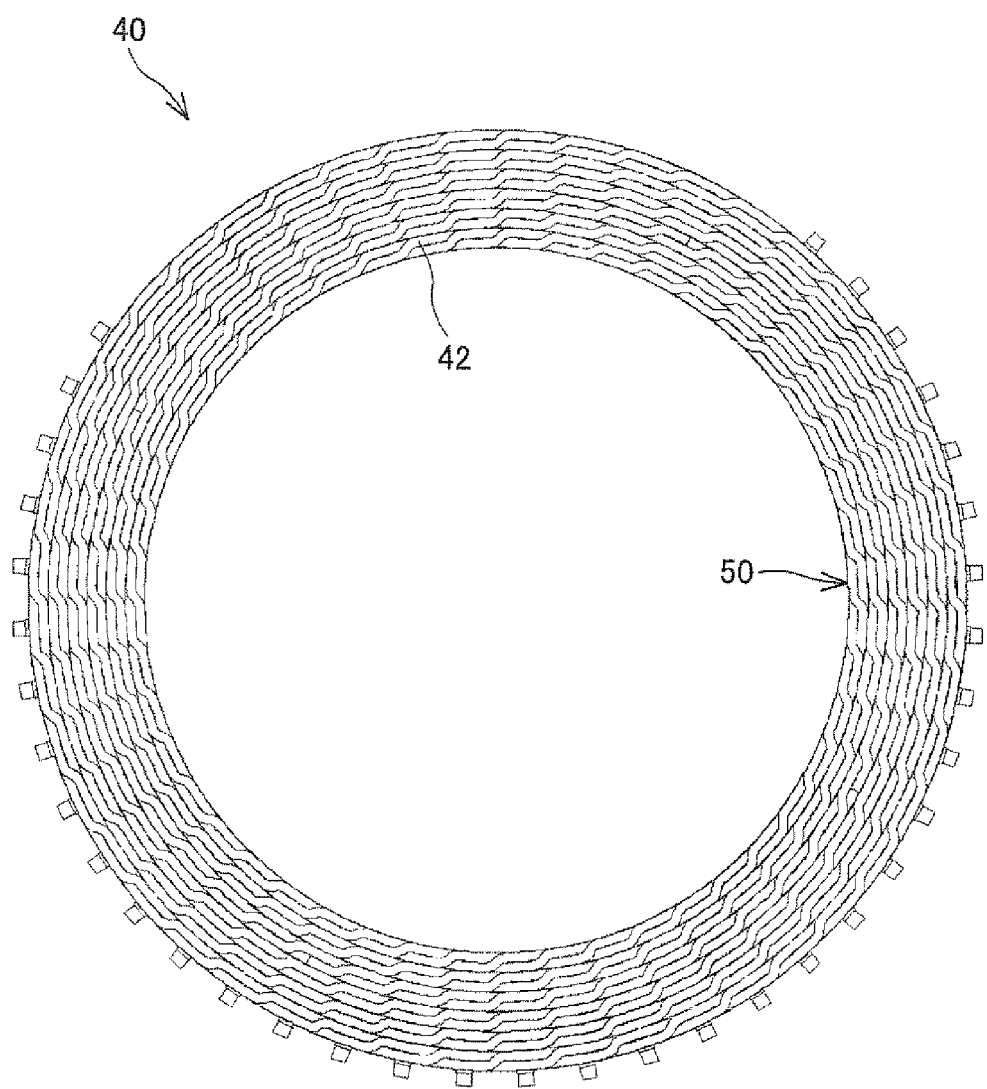
FIG. 10 is a bottom view of the stator coil.

Furthermore, in the present embodiment, as shown in FIG. 9, each of the crossover parts 70 of the electric wires 50 is crank-shaped to include a pair of radially-extending end sections 70a and 70b. With such a shape, it is possible to facilitate the bending of the lead portions 53b of the electric wires 50 for forming the crossover parts 70 and the welding of the corresponding pairs of the lead portions 53a and 53b of the electric wires 50.

In addition, as shown in FIGS. 7 and 9, on the annular axial end face of the stator coil 40, the crossover parts 70 occupy substantially ¾ of the full angular range of the axial end face; the full angular range is 360°. Further, within the remaining ¼ of the full angular range, there are sequentially arranged the V-phase neutral terminal, the W-phase output terminal, the U-phase neutral terminal, the V-phase output terminal, the W-phase neutral terminal, and the U-phase output terminal of the stator coil 40. That is, on the axial end face of the stator coil 40, the U-phase, V-phase, and W-phase output terminals are arranged in the same angular range as the U-phase, V-phase, and W-phase neutral terminals; the crossover parts 70 are arranged in a different angular range from the U-phase, V-phase, and W-phase output terminals and the U-phase, V-phase, and W-phase neutral terminals.

The stator core 30 is assembled to the above-described stator coil 40 by inserting the tooth portions 33 of the stator core segments 32 respectively into the spaces formed between the stacks of the in-slot portions 51 of the electric wires 50 from the radially outside of the stator coil 40. Consequently, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding pair of the in-slot portions 51, protrudes from a corresponding one of the axial end faces of the stator core 30.

After having described the configuration of the stator 20, the method of manufacturing the stator 20 according to the present embodiment will be described hereinafter.

Figure 19:
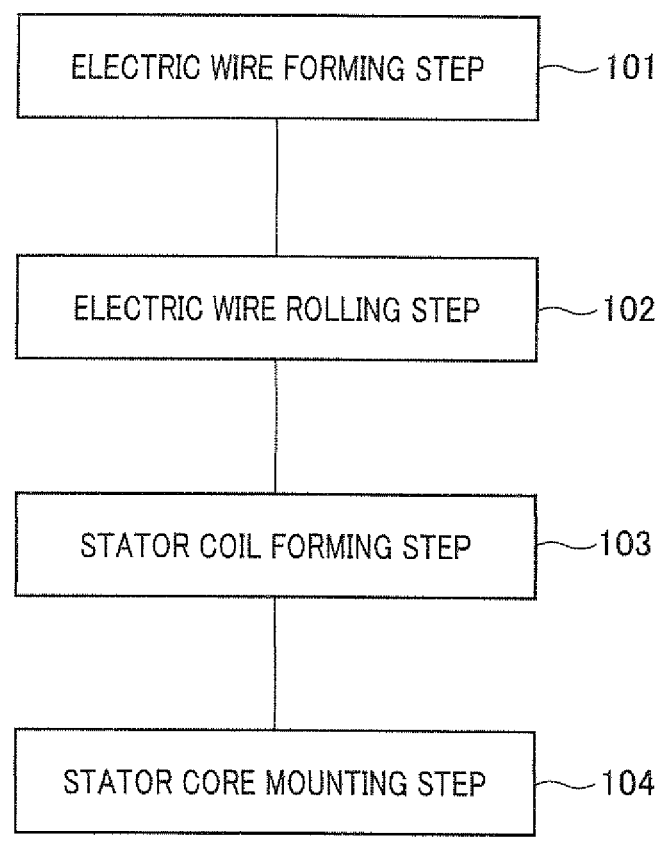
FIG. 19 is a flow chart illustrating a method of manufacturing the stator according to the first embodiment.

Referring to FIG. 19, in the present embodiment, the method of manufacturing the stator 20 includes an electric wire forming step 101, an electric wire rolling step 102, a stator coil forming step 103, and a stator core mounting step 104.

First, in the electric wire forming step 101, the substantially planar, wave-shaped electric wires 50 as shown in FIGS. 12A-12B are formed by shaping a plurality of (e.g., 48 in the present embodiment) electric wire materials 50a.

Figure 20:
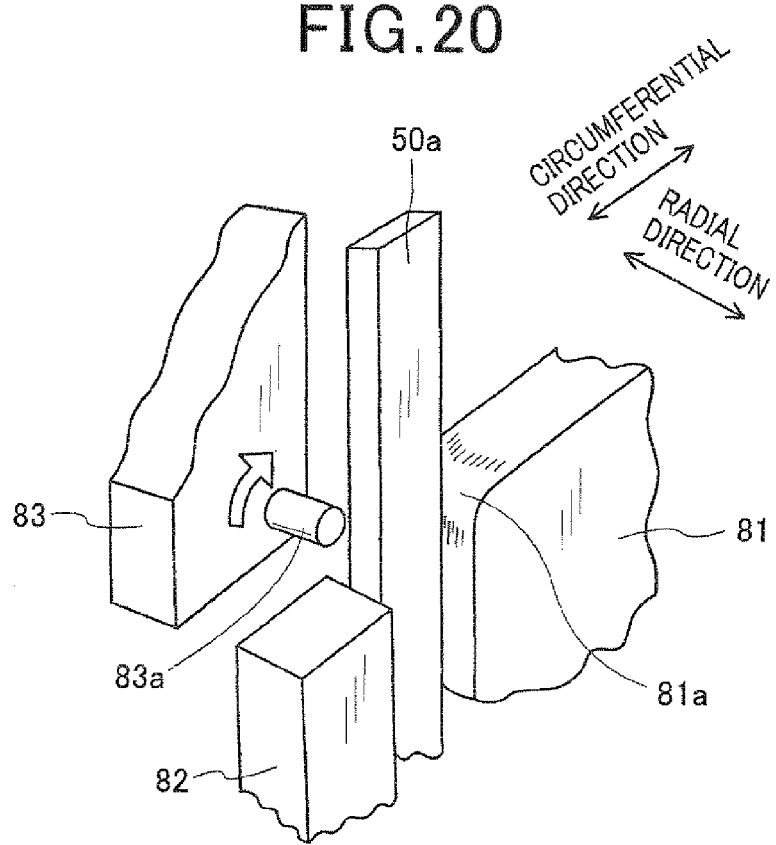
FIG. 20 is a perspective view illustrating an electric wire forming step of the method.
Figure 21A:
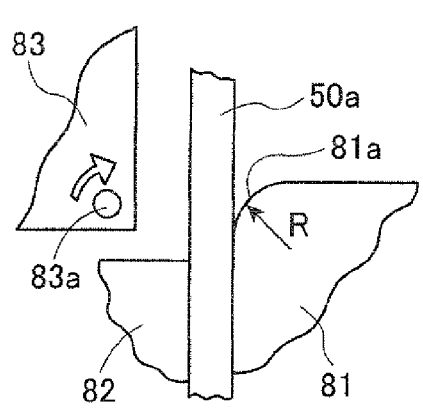
FIGS. 21A and 21B are schematic views respectively illustrating an electric wire material for forming one of the electric wires before and after being bent in the electric wire forming step.

Specifically, referring to FIGS. 20 and 21A-2113, each of the electric wire materials 50a is shaped to form one of the electric wires 50 using a pair of first and second fixed jigs 81 and 82 and a rotating jig 83. The first and second fixed jigs 81 and 82 are opposed to each other so as to hold the electric wire material 50a therebetween. The rotating jig 83 is rotatably mounted to a supporting shaft 83a, so as to bend the electric wire material 50a held between the first and second fixed jigs 81 and 82 toward the first fixed jig 81. The first fixed jig 81 has a substantially right-angled corner portion 81a which makes contact with, during the bending of the electric wire material 50a, the bent portion of the electric wire material 50a. In addition, the corner portion 81a is rounded with a constant radius of curvature R.

Figure 21B:
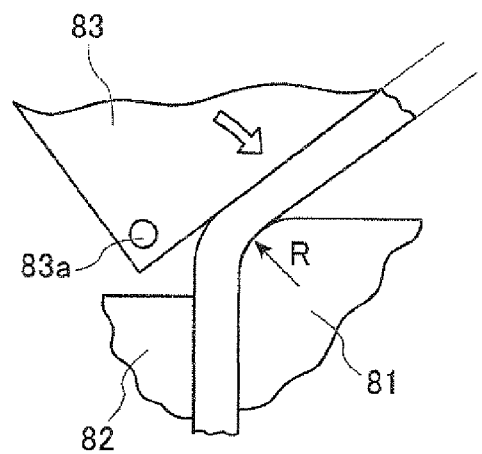

More specifically, in this step, as shown in FIG. 21A, a portion of the electric wire material 50a which makes up one of the in-slot portions 51 of the electric wire 50 is first held between the first and second fixed jigs 81 and 82. Then, as shown in FIG. 21B, the rotating jig 83 is rotated about the supporting axis 83a toward the first fixed jig 81, thereby pressing the electric wire material 50a against the corner portion 81a of the first fixed jig 81. Consequently, that portion of the electric wire material 50a which adjoins the portion held between the first and second fixed jigs 81 and 82 is bent along the surface of the corner portion 81a at a substantially right angle to the portion held between the jigs 81 and 82, thereby forming a shoulder part 55 of the electric wire 50.

Further, in this step, by repeatedly operating the jigs 81-83 in the same manner as described above for other portions of the electric wire material 50a, the electric wire 50 is obtained which has the shape as shown in FIGS. 12A-12B.

Furthermore, in this step, by repeatedly operating the jigs 81-83 in the same manner as described above for each of all the electric wire materials 50a, the plurality of (e.g., 48 in the present embodiment) electric wires 50 are obtained.

Figure 23:
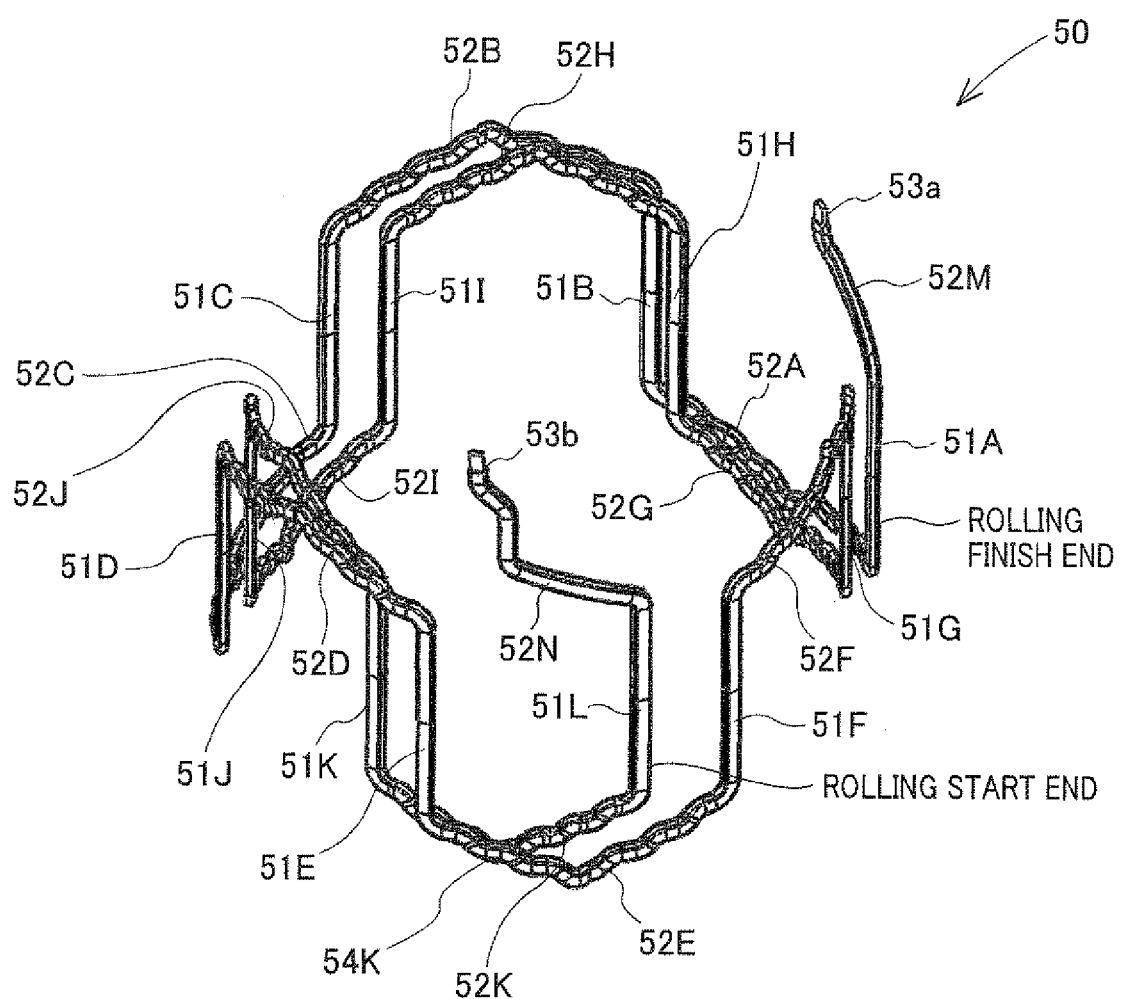
FIG. 23 is a perspective view of one of the electric wires after being rolled in the electric wire rolling step.

In the electric wire rolling step 102, each of the planar electric wires 50 formed in the electric wire forming step 101 is further rolled, through plastic deformation, by a predetermined number of turns (e.g., more than one but less than two turns in the present embodiment) into a spiral shape as shown in FIGS. 22 and 23.

Figure 24:
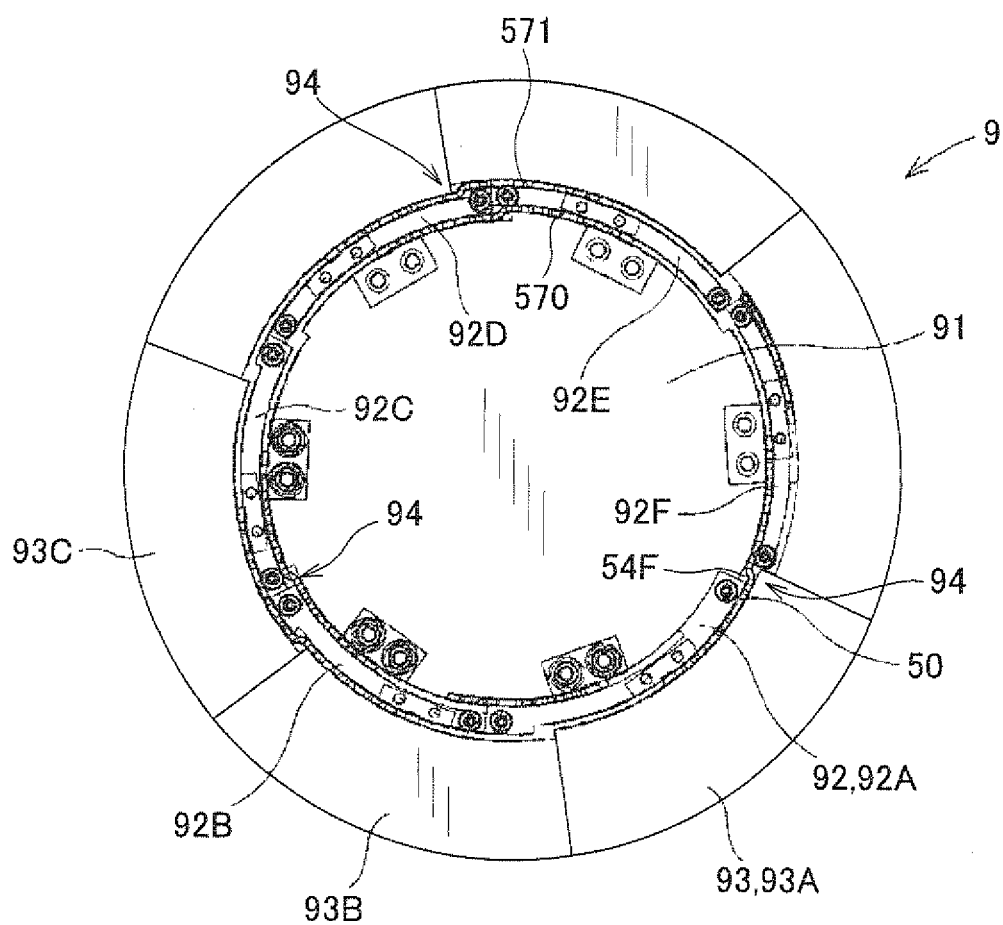
FIG. 24 is an end view illustrating the overall configuration of a rolling apparatus used in the electric wire rolling step.

Specifically, in the present embodiment, each of the planar electric wires 50 is rolled using the rolling apparatus 9 as shown in FIG. 24. The rolling apparatus 9 includes a radially inner pressing member 91, a radially intermediate pressing member 92, and a radially outer pressing member 93.

During the rolling of each of the electric wires 50, the inner pressing member 91 makes contact with and presses radially outward the radially inner surface of the first turn (i.e., the radially innermost turn) of the electric wire 50, thereby shaping the radially inner surface of the first turn.

Figure 27:
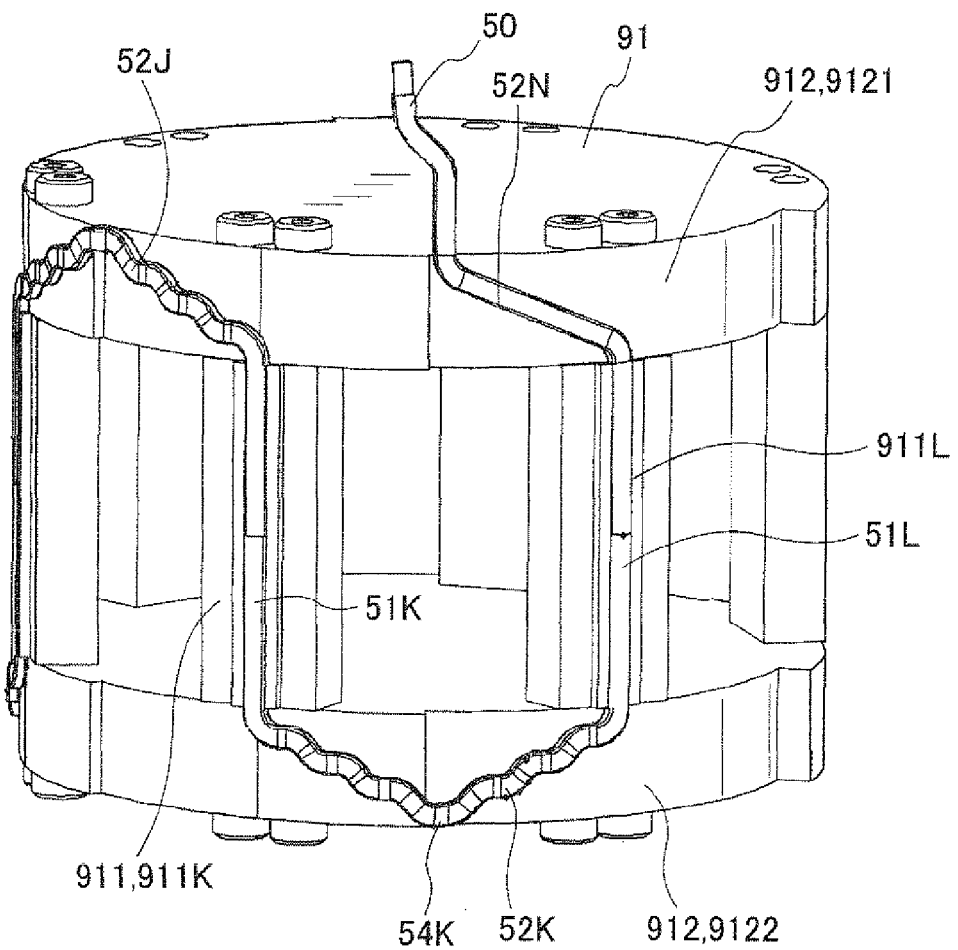
FIG. 27 is a perspective view illustrating the configuration of an inner pressing member of the rolling apparatus.

Referring to FIG. 27, the inner pressing member 91 includes a plurality of restricting portions 911 and a pair of deforming portions 912. Each of the restricting portions 911 receives therein a corresponding one of the in-slot portions 51 in the first turn of the electric wire 50, thereby restricting movement of the corresponding in-slot portion 51. The deforming portions 912 are provided to deform the half-turn portion 52N and turn portions 52 in the first turn of the electric wire 50, thereby shaping them to extend along the radially outer surfaces of the deforming portions 912. The deforming portions 912 include a first deforming portion 9121 for shaping the half-turn portion 52N and turn portions 52 on one axial side of the in-slot portions 51 and a second deforming portion 9122 for shaping the turn portions 52 on the other axial side. The first and second deforming portions 9121 and 9122 have the restricting portions 911 fixed therebetween.

Figure 26:
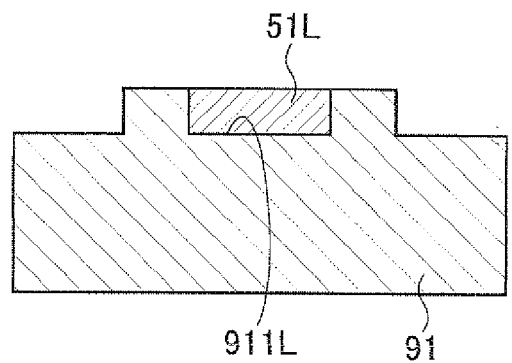
FIG. 26 is a cross-sectional view illustrating the configuration of a restricting portion of the rolling apparatus.

In the present embodiment, each of the restricting portions 911 is formed of a bar having a cross section as shown in FIG. 26. The bar extends parallel to the axial direction of the stator coil 40 and has a recess formed therein. The recess has a cross section that is conformed to the substantially rectangular cross section of the in-slot portions 51 of the electric wire 50. Consequently, the restricting portion 911 can have the corresponding in-slot portion 51 of the electric wire 50 fitted in the recess, thereby restricting movement of the corresponding in-slot portion 51 during the rolling of the electric wire 50.

In addition, it should be noted that in FIGS. 26 and 27, the restricting portions 911 of the inner pressing member 91 are suffixed with the same letters as the corresponding in-slot portions 51 of the electric wire 50.

Each of the deforming portions 9121 and 9122 is formed of a disc having a radially outer surface that is comprised of a plurality of sections having different centers of curvature and different radii of curvature. The deforming portion 9121 makes contact with and presses radially outward the half-turn portion 52N and turn portions 52 on one axial side of the in-slot portions 51 in the first turn of the electric wire 50, thereby deforming them to extend along the radially outer surface of the deforming portion 9121. On the other hand, the deforming portion 9122 makes contact with and presses radially outward the turn portions 52 on the other axial side of the in-slot portions 51 in the first turn of the electric wire 50, thereby deforming them to extend along the radially outer surface of the deforming portion 9122.

In addition, the centers of curvature and radii of curvature of the radially outer surfaces of the deforming portions 9121 and 9122 of the inner pressing member 91 are set based on the desired positions of the half-turn portion 52N and turn portions 52 in the first turn of the electric wire 50 in the finally obtained stator coil 40.

Figure 28:
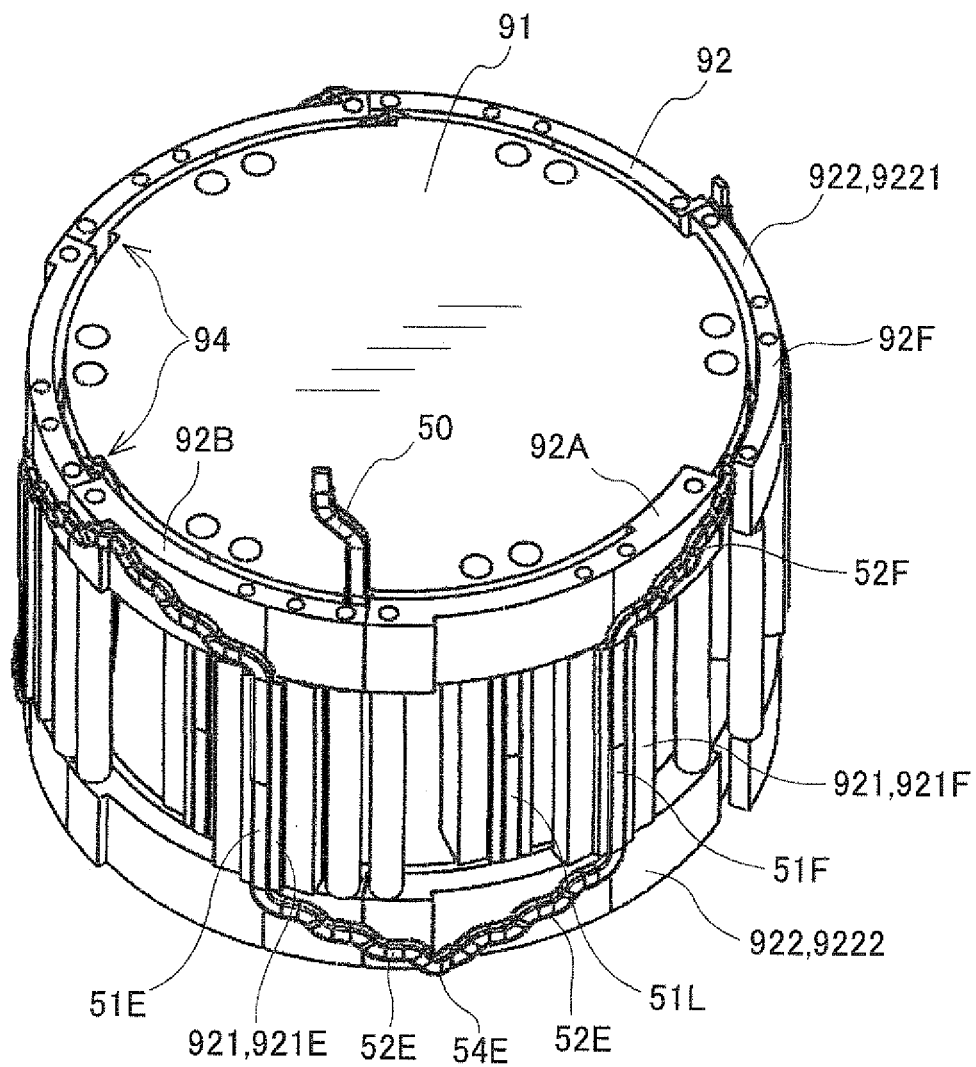
FIG. 28 is a perspective view illustrating the configuration of an intermediate pressing member of the rolling apparatus.

Referring to FIGS. 24 and 28, the intermediate pressing member 92 is arranged so as to have the first turn of the electric wire 50 radially interposed between the inner and intermediate pressing members 91 and 92. The intermediate portion 92 makes contact with and presses radially inward the radially outer surface of the first turn of the electric wire 50, thereby shaping the radially outer surface of the first turn.

In the present embodiment, the intermediate pressing member 92 is composed of, for example, six intermediate pressing member segments 92A-92F that are connected together so as to be pivotable with respect to one another. It should be noted that the intermediate pressing member segments 92A-92F can be mutually-pivotably connected in any suitable manner known in the art.

Each of the intermediate pressing member segments 92A-92F has two arc-shaped end portions and a straight portion that is fixed between the arc-shaped end portions and makes up a restricting portion 921 of the intermediate pressing member 92. The arc-shaped end portions of the intermediate pressing member segments 92A-92F are connected to make up a pair of deforming portions 922 of the intermediate pressing member 92.

The restricting portions 921 of the intermediate pressing member 92 have the same configuration as the restricting portions 911 of the inner pressing member 91. Each of the restricting portions 921 receives therein a corresponding one of the in-slot portions 51 in the remaining less than one turn of the electric wire 50, thereby restricting movement of the corresponding in-slot portion 51. More specifically, each of the restricting portions 921 has the corresponding in-slot portion 51 of the electric wire 50 fitted in the recess thereof, thereby restricting movement of the corresponding in-slot portion 51 during the rolling of the electric wire 50.

In addition, it should be noted that in FIG. 28, the restricting portions 921 of the intermediate pressing member 92 are suffixed with the same letters as the corresponding in-slot portions 51 of the electric wire 50.

The deforming portions 922 of the intermediate pressing member 92 include a first deforming portion 9221 and a second deforming portion 9222. The first deforming portion 9221 is formed by mutually-pivotably connecting the arc-shaped end portions of the intermediate pressing member segments 92A-92F on one axial side of the restricting portions 921. The second deforming portion 9222 is formed by mutually-pivotably connecting the arc-shaped end portions of the intermediate pressing member segments 92A-92F on the other axial side of the restricting portions 921.

Further, each of the first and second deforming portions 9221 and 9222 has a radially inner surface and a radially outer surface; each of the radially inner and outer surfaces is comprised of a plurality of sections having different centers of curvature and different radii of curvature.

The radially inner surface of the first deforming portion 9221 makes contact with the half-turn portion 52N and turn portions 52 on one axial side of the in-slot portions 51 in the first turn of the electric wire 50. During the rolling of the electric wire 50, the first deforming portion 9221 presses the half-turn portion 52N and turn portions 52 radially inward, thereby shaping them in cooperation with the first deforming portion 9121 of the inner pressing member 91.

The radially outer surface of the first deforming portion 9221 makes contact with the half-turn portion 52M and turn portions 52 on the one axial side of the in-slot portions 51 in the remaining less than one turn of the electric wire 50. During the rolling of the electric wire 50, the first deforming portion 9221 presses the half-turn portion 52M and turn portions 52 radially outward, thereby deforming them to extend along the radially outer surface of the first deforming portion 9221.

The radially inner surface of the second deforming portion 9222 makes contact with the turn portions 52 on the other axial side of the in-slot portions 51 in the first turn of the electric wire 50. During the rolling of the electric wire 50, the second deforming portion 9222 presses the turn portions 52 radially inward, thereby shaping them in cooperation with the second deforming portion 9122 of the inner pressing member 91.

The radially outer surface of the second deforming portion 9222 makes contact with the turn portions 52 on the other axial side of the in-slot portions 51 in the remaining less than one turn of the electric wire 50. During the rolling of the electric wire 50, the second deforming portion 9222 presses the turn portions 52 radially outward, thereby deforming them to extend along the radially outer surface of the second deforming portion 9222.

In addition, the centers of curvature and radii of curvature of the radially inner surfaces of the deforming portions 9221 and 9222 of the intermediate pressing member 922 are set based on the desired positions of the half-turn portion 52N and turn portions 52 in the first turn of the electric wire 50 in the finally obtained stator coil 40. On the other hand, the centers of curvature and radii of curvature of the radially outer surfaces of the deforming portions 9221 and 9222 are set based on the desired positions of the half-turn portion 52M and turn portions 52 in the remaining less than one turn of the electric wire 50 in the finally obtained stator coil 40.

Referring to FIGS. 24 and 29-31, the outer pressing member 93 is arranged so as to have the remaining less than one turn of the electric wire 50 radially interposed between the intermediate and outer pressing members 92 and 93. The outer pressing member 93 makes contact with and presses radially inward the radially outer surface of the remaining less than one turn of the electric wire 50, thereby shaping the radially outer surface.

In the present embodiment, the outer pressing member 93 has a hollow cylindrical shape and is composed of, for example, six arc-shaped outer pressing member segments 93A-93F.

The radially outer surfaces of the outer pressing member segments 93A-93F are identical to each other. In other words, the outer pressing member 93 has a uniform radially outer surface. However, the radially inner surfaces of the outer pressing member segments 93A-93F have different centers of curvature and different radii of curvature. In other words, the outer pressing member 93 has a radially inner surface that is comprised of a plurality of sections having different centers of curvature and different radii of curvature.

The radially inner surface of the outer pressing member 93 makes contact with the half-turn portion 52M and turn portions 52 in the remaining less than one turn of the electric wire 50. During the rolling of the electric wire 50, the outer pressing member 93 presses the half-turn portion 52M and turn portions 52 radially inward, thereby shaping them in cooperation with the deforming portions 922 of the intermediate pressing member 92.

In addition, the centers of curvature and radii of curvature of the radially inner surfaces of the outer pressing member segments 93A-93F are set based on the desired positions of the half-turn portion 52M and turn portions 52 in the remaining less than one turn of the electric wire 50 in the finally obtained stator coil 40.

Figure 29:
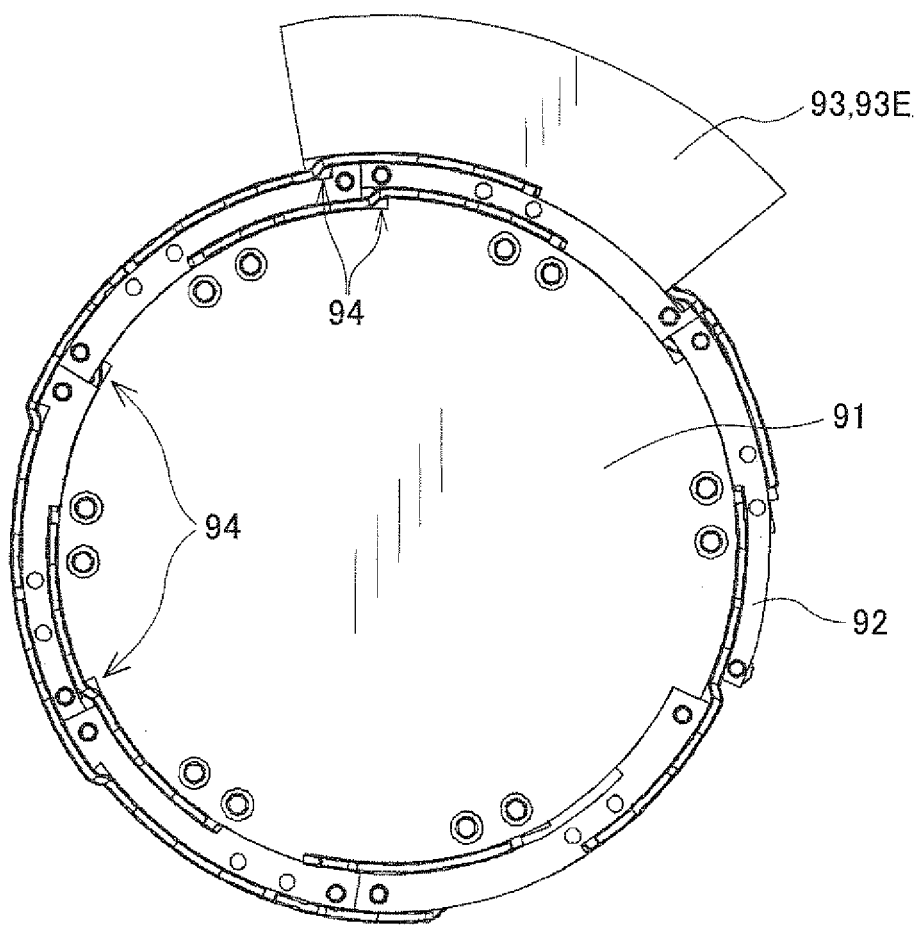
FIG. 29 is an end view illustrating an outer pressing member segment of the rolling apparatus which presses one of the electric wires radially inward against the intermediate pressing member.
Figure 30:
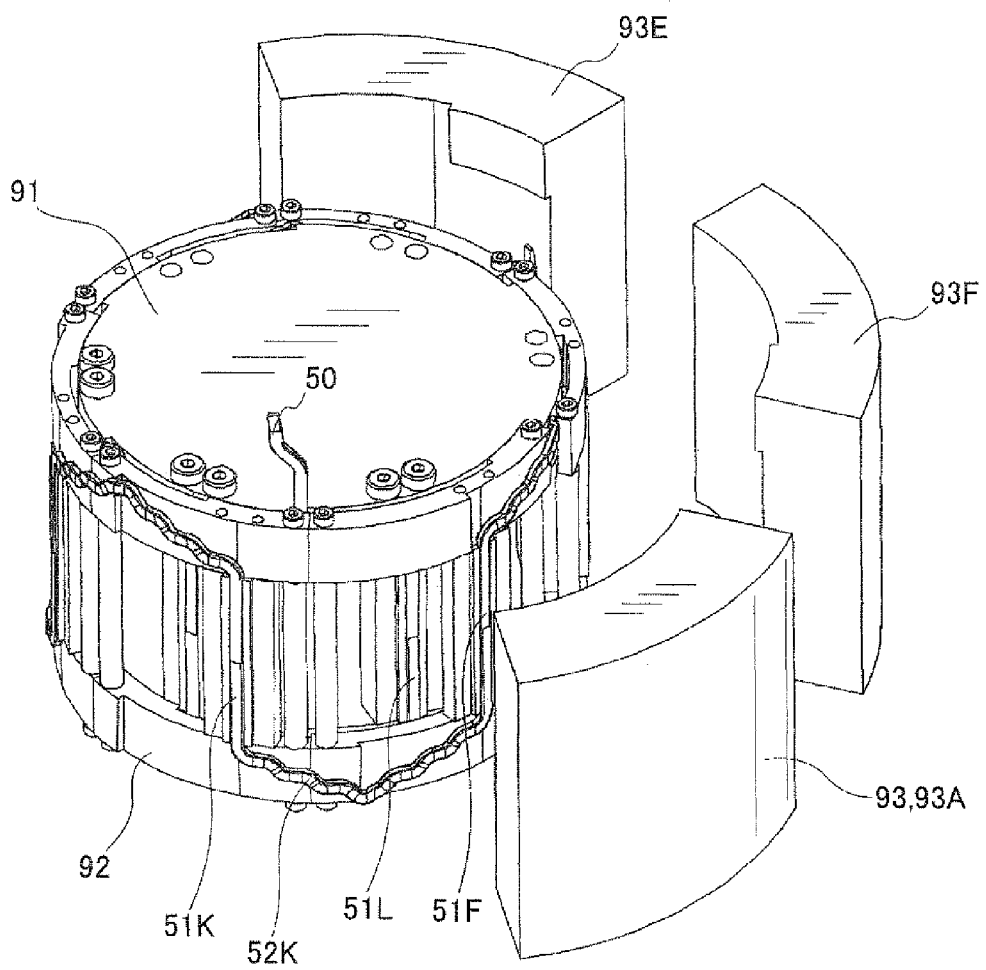
FIG. 30 is a perspective view illustrating a plurality of outer pressing member segments of the rolling apparatus which are placed radially outside the intermediate pressing member.

Referring to FIGS. 24 and 28-29, in the present embodiment, each of those pressing surfaces of the inner, intermediate, and outer pressing members 91-93 which press the electric wire 50 has a plurality of restricting portions 94 formed therein. Here, the pressing surfaces of the inner, intermediate, and outer pressing members 91-93 include the radially outer surfaces of the deforming portions 9121 and 9122 of the inner pressing member 91, the radially inner and outer surfaces of the deforming portions 9221 and 9222 of the intermediate pressing member 92, and the radially inner surface of the outer pressing member 93. Each of the restricting portions 94 is shaped (more specifically, stepped in the present embodiment) so as to restrict circumferential movement of a corresponding one of the crank-shaped parts 54 of the turn portions 52 of the electric wire 50 during the rolling of the electric wire 50. In addition, in the present embodiment, the restricting portions 94 are provided at the boundaries between circumferentially-adjacent pairs of the sections of the radially outer surfaces of the deforming portions 9121 and 9122 of the inner pressing member 91, the boundaries between circumferentially-adjacent pairs of the intermediate pressing member segments 92A-92F, and the boundaries between circumferentially-adjacent pairs of the outer pressing member segments 93A-93F.

Moreover, in the present embodiment, to bend each of the turn portions 52A-52K and half-turn portions 52M and 52N of the electric wire 50 to have predetermined curvatures, each of the pressing surfaces of the inner, intermediate, and outer pressing members 91-93 is comprised of the plurality of sections having the different centers of curvature and different radii of curvature. Consequently, after the rolling of the electric wire 50, each of the turn portions 52A-52K of the electric wire 50 has two different curvatures respectively on opposite sides of the crank-shaped part 54 thereof.

Specifically, for each of the turn portions 52A-52K of the electric wire 50, the radial positions of the two in-slot portions 51 which are connected by the turn portion are different from each other. Therefore, the curvature of that section of the turn portion which circumferentially extends between the crank-shaped part 54 of the turn portion and one of the two in-slot portions 51 is different from the curvature of that section of the turn portion which circumferentially extends between the crank-shaped part 54 and the other in-slot portion 51.

For example, referring to FIGS. 25A and 27, the turn portion 52K, which has the crank-shaped part 54K formed therein, connects the in-slot portions 51K and 51L. The difference in radial position between the in-slot portions 51k and 51L is equal to the radial thickness of the in-slot portions. Therefore, the curvature of that section of the turn portion 52K which circumferentially extends between the crank-shaped part 54K and the in-slot portion 51K is different from the curvature of that section of the turn portion 52K which circumferentially extends between the crank-shaped part 54K and the in-slot portion 51L.

FIGS. 25A-25B illustrates the centers of curvature of all the circumferentially-extending sections of the turn portions 52A-52K and half-turn portions 52M and 52N of the electric wire 50 when the electric wire 50 is being pressed by all the pressing members 91-93 of the rolling apparatus 9 as shown in FIG. 24.

It can be seen from FIGS. 25A-25B that when the electric wire 50 is being pressed by all the pressing members 91-93 of the rolling apparatus 9, the centers of curvature of all the circumferentially-extending sections of the turn portions 52A-52K and half-turn portions 52M and 52N of the electric wire 50 together form a substantially regular hexagonal shape.

Further, in the present embodiment, the curvature ratios of the circumferentially-extending sections of the turn portions 52A-52K and half-turn portions 52M and 52N of the electric wire 50 increase with the radial positions of the same. Here, the curvature ratio of a circumferentially-extending section of the electric wire 50 represents the ratio of the curvature of the section during the rolling of the electric wire 50 to the curvature of the section in the finally obtained stator coil 40 (i.e., after the electric wire 50 is assembled into the stator coil 40).

For example, among all the turn portions 52A-52K and half-turn portions 52M and 52N of the electric wire 50, the in-slot portion 51L-side half of the turn portion 52K and the half-turn portion 52N are positioned most radially inward, whereas the in-slot portion 51A-side half of the turn portion 52A and the half-turn portion 52M are positioned most radially outward. Therefore, the curvature ratio of the in-slot portion 51A-side half of the turn portion 52A and the half-turn portion 52M is greater than the curvature ratio of the in-slot portion 51L-side half of the turn portion 52K and the half-turn portion 52N.

More specifically, referring to FIG. 22, let the curvature of the in-slot portion 51L-side half of the turn portion 52K and the half-turn portion 52N in the finally obtained stator coil 40 (i.e., after the electric wire 50 is assembled into the stator coil 40) be a, then the curvature during the rolling of the electric wire 50 is 1.21 a. Accordingly, the curvature ratio of the in-slot portion 51L-side half of the turn portion 52K and the half-turn portion 52N is equal to 1.21. On the other hand, let the curvature of the in-slot portion 51A-side half of the turn portion 52A and the half-turn portion 52M in the finally obtained stator coil 40 be b, then the curvature during the rolling of the electric wire 50 is 1.26 b. Accordingly, the curvature ratio of the in-slot portion 51A-side half of the turn portion 52A and the half-turn portion 52M is equal to 1.26.

In addition, the curvature ratios of the circumferentially-extending sections of the turn portions 52A-52K and half-turn portions 52M and 52N of the electric wire 50 can be set according to the material of the electric wires 50 and the dimensions of the stator coil 40. For example, the curvature ratio of the in-slot portion 51L-side half of the turn portion 52K and the half-turn portion 52N may be set in the range of 1.20 to 1.22, whereas that of the in-slot portion 51A-side half of the turn portion 52A and the half-turn portion 52M may be set in the range of 1.25 to 1.27.

In the electric wire rolling step 102, each of the electric wires 50 is rolled using the above-described rolling apparatus 9 in the following manner.

First, the in-slot portion 51L of the electric wire 50, which is to be located most radially inward among the in-slot portions 51A-51L of the electric wire 50 in the finally obtained stator 20, is fitted into the recess formed in the restricting portion 911L of the inner pressing member 91, as shown in FIGS. 26-27. Consequently, both the circumferential movement and radially inward movement of the in-slot portion 51L are restricted by the restricting portion 911L. In addition, the restricting portion 911L also prevents the in-slot portion 51L from being twisted.

Then, referring to FIGS. 27 and 28, the intermediate pressing member segment 92A is placed radially outside the in-slot portion 51L-side half of the turn portion 52K and the half-turn portion 52N of the electric wire 50 and pressed by a press device (not shown) radially inward. Consequently, the half-turn portion 52N is pressed between the deforming portion 9121 of the inner pressing member 91 and the deforming portion 9221 of the intermediate pressing member segment 92A, thereby being deformed to extend along the radially outer surface of the deforming portion 9121. On the other hand, the in-slot portion 51L-side half of the turn portion 52K is pressed between the deforming portion 9122 of the inner pressing member 91 and the deforming portion 9222 of the intermediate pressing member segment 92A, thereby being deformed to extend along the radially outer surface of the deforming portion 9122.

Moreover, during the deformation of the in-slot portion 51L-side half of the turn portion 52K and the half-turn portion 52N, the intermediate pressing member segment 92A also restricts the radially outward movement of the in-slot portion 51L of the electric wire 50. In addition, as described previously, both the circumferential movement and radially inward movement of the in-slot portion 51L are restricted by the restricting portion 911L of the inner pressing member 91. Consequently, both the circumferential and radial positions of the in-slot portion 51L are restricted by the inner and intermediate pressing members 91 and 92 during the rolling of the electric wire 50.

Further, the intermediate pressing member segment 92B is placed radially outside the in-slot portion 51K-side half of the turn portion 52K and the in-slot portion 51K-side half of the turn portion 52J of the electric wire 50 and pressed by the press device radially inward. Consequently, the in-slot portion 51K-side half of the turn portion 52K is pressed between the deforming portion 9122 of the inner pressing member 91 and the deforming portion 9222 of the intermediate pressing member segment 92B, thereby being deformed to extend along the radially outer surface of the deforming portion 9122. On the other hand, the in-slot portion 51K-side half of the turn portion 52J is pressed between the deforming portion 9121 of the inner pressing member 91 and the deforming portion 9221 of the intermediate pressing member segment 92B, thereby being deformed to extend along the radially outer surface of the deforming portion 9121.

Moreover, the radially inner surface of the intermediate pressing member segment 92B is offset radially outward from the radially inner surface of the intermediate pressing member segment 92A, forming one of the restricting portions 94 between the two radially inner surfaces. The formed restricting portion 94 restricts the circumferential movement of the crank-shaped part 54K of the turn portion 52K during the deformation of the in-slot portion 51K-side half of the turn portion 52K and the in-slot portion 51K-side half of the turn portion 52J.

Furthermore, with the deformation of the in-slot portion 51K-side half of the turn portion 52K and the in-slot portion 51K-side half of the turn portion 52J, the in-slot portion 51K of the electric wire 50 is fitted into the recess formed in the restricting portion 911K of the inner pressing member 91. Consequently, both the circumferential movement and radially inward movement of the in-slot portion 51K are restricted by the restricting portion 911K of the inner pressing member 91; the radially outward movement of the in-slot portion 51K is restricted by the intermediate pressing member segment 92B. As a result, both the circumferential and radial positions of the in-slot portion 51K are restricted by the inner and intermediate pressing members 91 and 92 during the rolling of the electric wire 50.

In addition, during the deformation of the in-slot portion 51K-side half of the turn portion 52K and the in-slot portion 51K-side half of the turn portion 52J, the in-slot portion 51L-side half of the turn portion 52K is kept pressed between the deforming portion 9122 of the inner pressing member 91 and the deforming portion 9222 of the intermediate pressing member segment 92A. Consequently, the in-slot portion 51K of the electric wire 50 can be easily fitted into the recess formed in the restricting portion 911K of the inner pressing member 91.

By repeating the above process using the intermediate pressing member segments 92C-92F, the first turn of the electric wire 50 is completed which is rolled around the inner pressing member 91, as shown FIG. 28. Consequently, the in-slot portions 51L-51G in the first turn of the electric wire 50 are sequentially and respectively fitted into the recesses of the restricting portions 911L-911G of the inner pressing member 91; the half-turn portion 52N, the turn portions 52K-52G, and the in-slot portion 51G-side half of the turn portion 52F in the first turn of the electric wire 50 are sequentially deformed to extend along the corresponding radially outer surfaces of the deforming portions 9121 and 9122 of the inner pressing member 91.

Further, referring to FIGS. 28-31, with the intermediate pressing member segments 92A-92F disposed to surround the inner pressing member 91, the outer pressing member segment 93A is placed radially outside the in-slot portion 51F-side half of the turn portion 52F and the in-slot portion 51F-side half of the turn portion 52E of the electric wire 50 and pressed by the press device radially inward. Consequently, the in-slot portion 51F-side half of the turn portion 52F is pressed between the deforming portion 9221 of the intermediate pressing member segment 92A and the outer pressing member segment 93A, thereby being deformed to extend along the radially outer surface of the deforming portion 9221. On the other hand, the in-slot portion 51F-side half of the turn portion 52E is pressed between the deforming portion 9222 of the intermediate pressing member segment 92A and the outer pressing member segment 93A, thereby being deformed to extend along the radially outer surface of the deforming portion 9222.

Moreover, referring to FIG. 24, the radially inner surface of the outer pressing member segment 93A is offset radially outward from the radially inner surface of the intermediate pressing member segment 92F, forming one of the restricting portions 94 between the two radially inner surfaces. The formed restricting portion 94 restricts the circumferential movement of the crank-shaped part 54F of the turn portion 52F during the deformation of the in-slot portion 51F-side half of the turn portion 52F and the in-slot portion 51F-side half of the turn portion 52E.

Furthermore, with the deformation of the in-slot portion 51F-side half of the turn portion 52F and the in-slot portion 51F-side half of the turn portion 52E, the in-slot portion 51F is fitted into the recess formed in the restricting portion 921F of the intermediate pressing member segment 92A. Consequently, both the circumferential movement and radially inward movement of the in-slot portion 51F are restricted by the restricting portion 921F of the intermediate pressing member segment 92A; the radially outward movement of the in-slot portion 51F is restricted by the outer pressing member segment 93A. As a result, both the circumferential and radial positions of the in-slot portion 51F are restricted by the intermediate pressing member segment 92A and the outer pressing member segment 93A.

In addition, during the deformation of the in-slot portion 51F-side half of the turn portion 52F and the in-slot portion 51F-side half of the turn portion 52E, the in-slot portion 51G-side half of the turn portion 52F is kept pressed between the inner pressing member 91 and the intermediate pressing member segment 92F. Consequently, the in-slot portion 51F can be easily fitted into the recess formed in the restricting portion 921F of the intermediate pressing member segment 92A.

Figure 31:
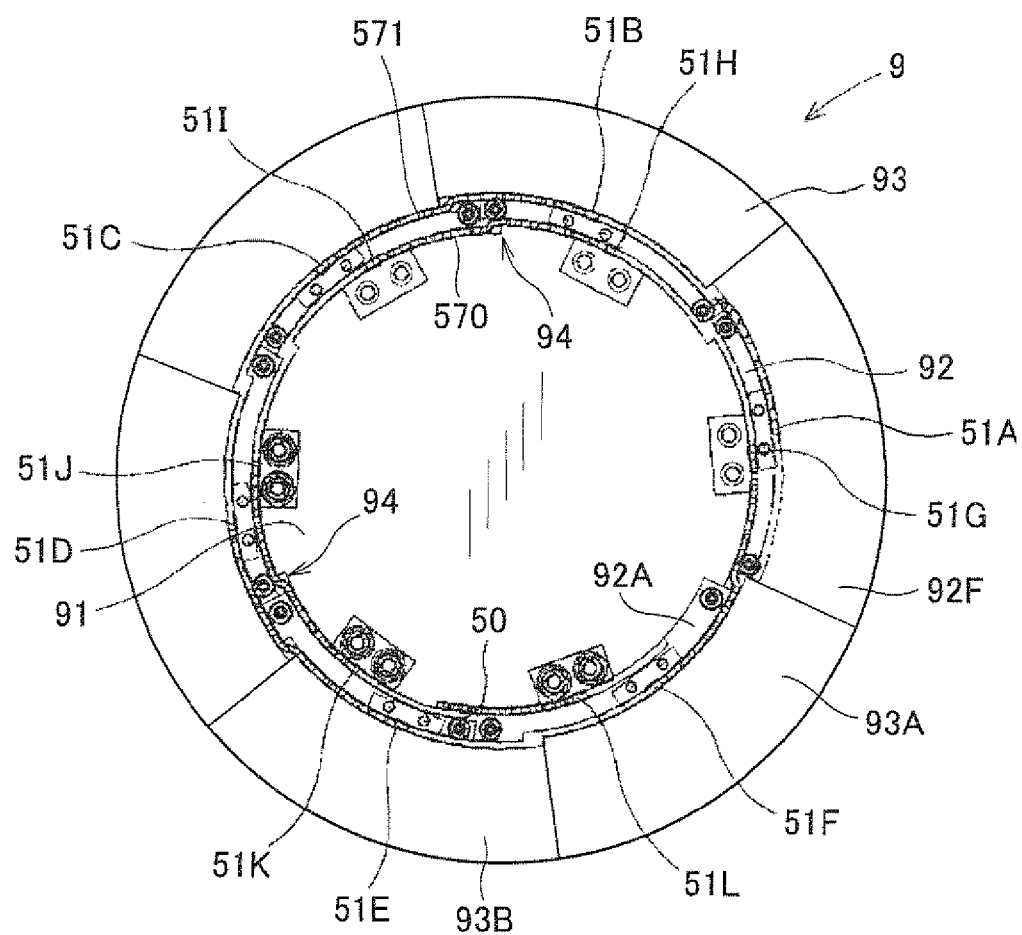
FIG. 31 is an end view illustrating the configuration of an outer pressing member of the rolling apparatus.

By repeating the above process using the outer pressing member segments 93B-93F, the remaining less than one turn of the electric wire 50 is completed which is rolled around the intermediate pressing member 92, as shown in FIG. 31. Consequently, the in-slot portions 51F-51A in the remaining less than one turn of the electric wire 50 are sequentially and respectively fitted into the recesses of the restricting portions 921F-921A of the intermediate pressing member 92; the in-slot portion 51F-side half of the turn portion 52F, the turn portions 52E-52A, and the half-turn portion 52M in the remaining less than one turn of the electric wire 50 are sequentially deformed to extend along the corresponding radially outer surfaces of the deforming portions 9221 and 9222 of the intermediate pressing member 92.

In addition, as shown in FIG. 31, the rolled electric wire 50 includes a radially inner part 570 (i.e., the first turn) and a radially outer part 571 (i.e., the remaining less than one turn) that overlap each other in the radial direction; the radially inner part 570 includes the half-turn portion 52N and the turn portions 52K-52G; the radially outer part 571 includes the turn portions 52F-52A and the half-turn portion 52M.

After the rolling of the electric wire 50 is completed, all of the inner, intermediate, and outer pressing members 91-93 are removed from the electric wire 50, obtaining the spiral shape of the electric wire 50 as shown in FIG. 22.

In the subsequent stator coil forming step 103, the rolled electric wires 50 are assembled together, through operations of creating relative axial movement therebetween, to form the stator coil 40.

Figure 32A:
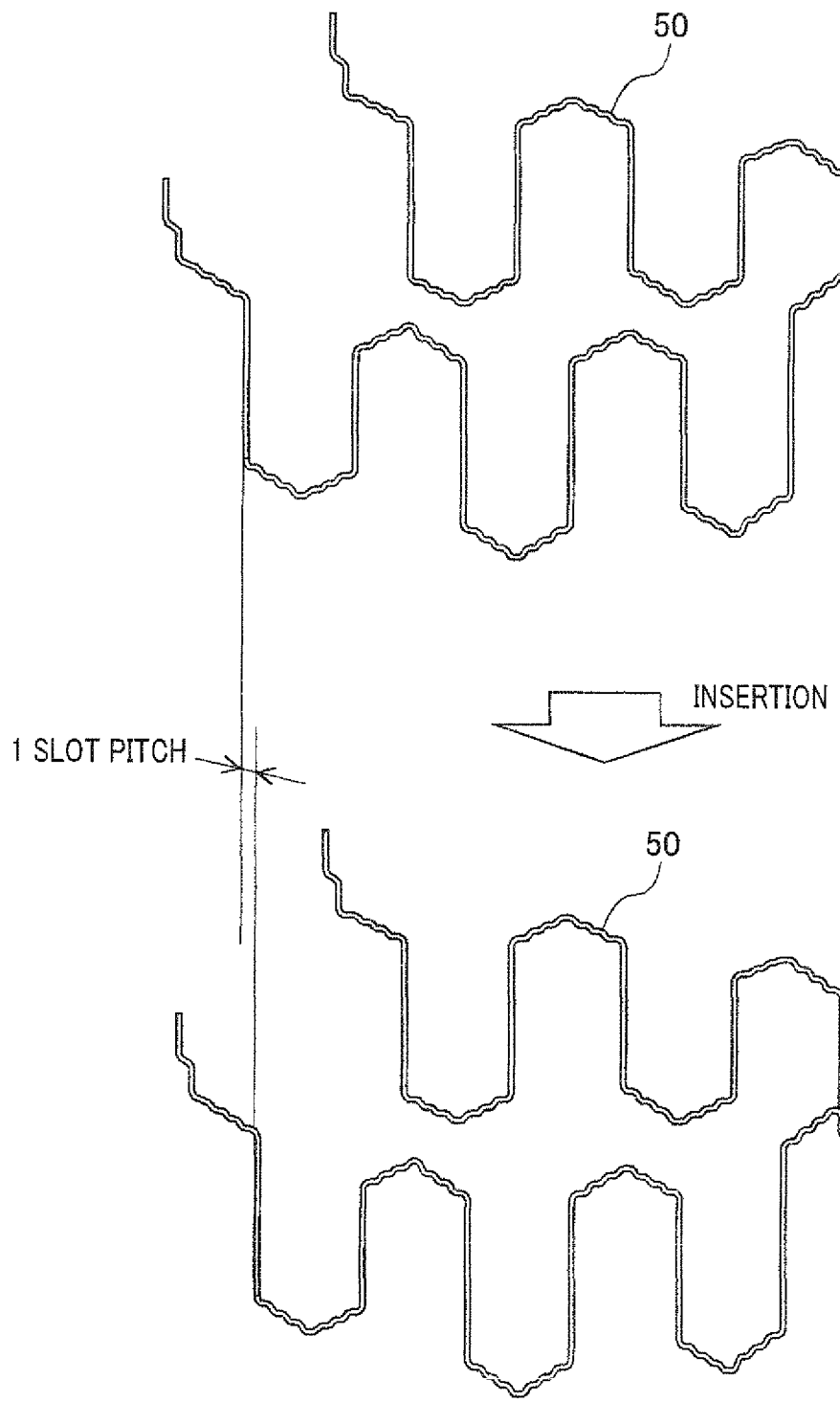
FIG. 32A is a schematic view illustrating the operation of axially moving one of the rolled electric wires toward another one of the same in the stator coil forming step.

Specifically, in this step, as shown in FIG. 32A, a pair of the electric wires 50 are assembled together by: (1) placing them so that they are offset from each other in the circumferential direction (i.e., the horizontal direction in FIG. 32A) by one slot pitch of the stator core 30; and (2) axially (i.e., in the vertical direction in FIG. 32A) moving one of them (i.e., the upper one in FIG. 32A) toward the other (i.e., the lower one in FIG. 32A).

Figure 32B:
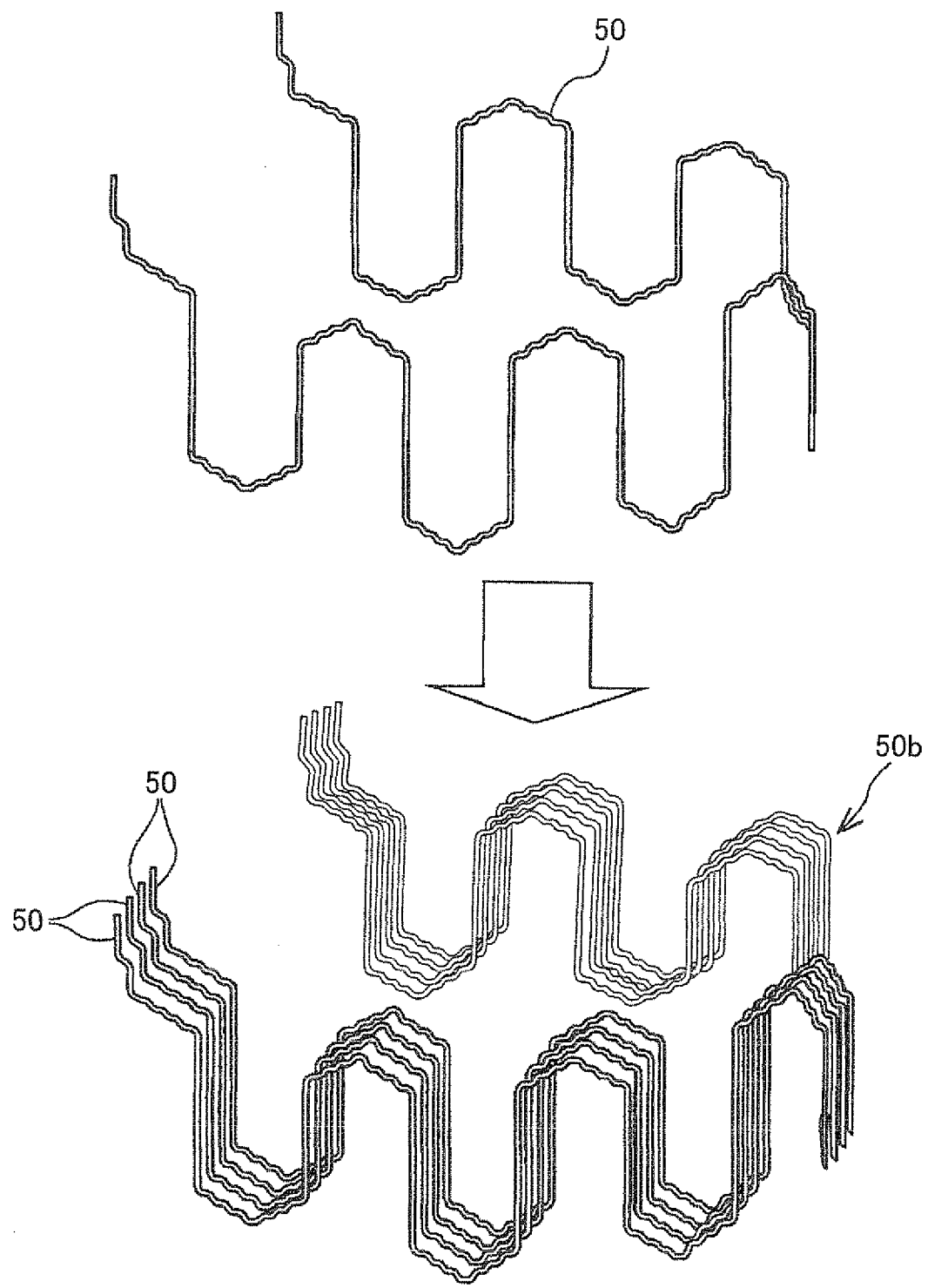
FIG. 32B is a schematic view illustrating the operation of axially moving one of the rolled electric wires toward an electric wire assembly, which is comprised of plural of the rolled electric wires, in the stator coil forming step.

Further, by repeating the above placing and moving operations, an electric wire assembly 50b is obtained which includes a plurality of (e.g., 4 in FIG. 32B) the electric wires 50. Furthermore, by repeating the above placing and moving operations, as shown in FIG. 32B, an electric wire 50 is further assembled to the electric wire assembly 50b, thereby forming a larger electric wire assembly 50b.

In the present embodiment, the stator coil 40 is formed by assembling the electric wires 50 one by one. More specifically, the stator coil 40 is formed by each time assembling only one electric wire 50 to another electric wire 50 in the same manner as illustrated in FIG. 32A or to an electric wire assembly 50b in the same manner as illustrated in FIG. 328.

It should be noted that the stator coil 40 can also be formed by first forming a plurality of electric wire assemblies 50b and then assembling the electric wire assemblies 50b together. In addition, it also should be noted that for the sake of simplicity, the electric wires 50, which are rolled by more than one turn in the present embodiment, are depicted in FIGS. 32A-32B as being rolled only by less than one turn.

Furthermore, in the present embodiment, in assembling the electric wires 50, the electric wires 50 or the electric wire assemblies 50b are elastically deformed in the radial direction, so as to minimize interference between the electric wires 50 and the electric wire assemblies 50b and thereby facilitate relative axial movement therebetween.

Figure 33:
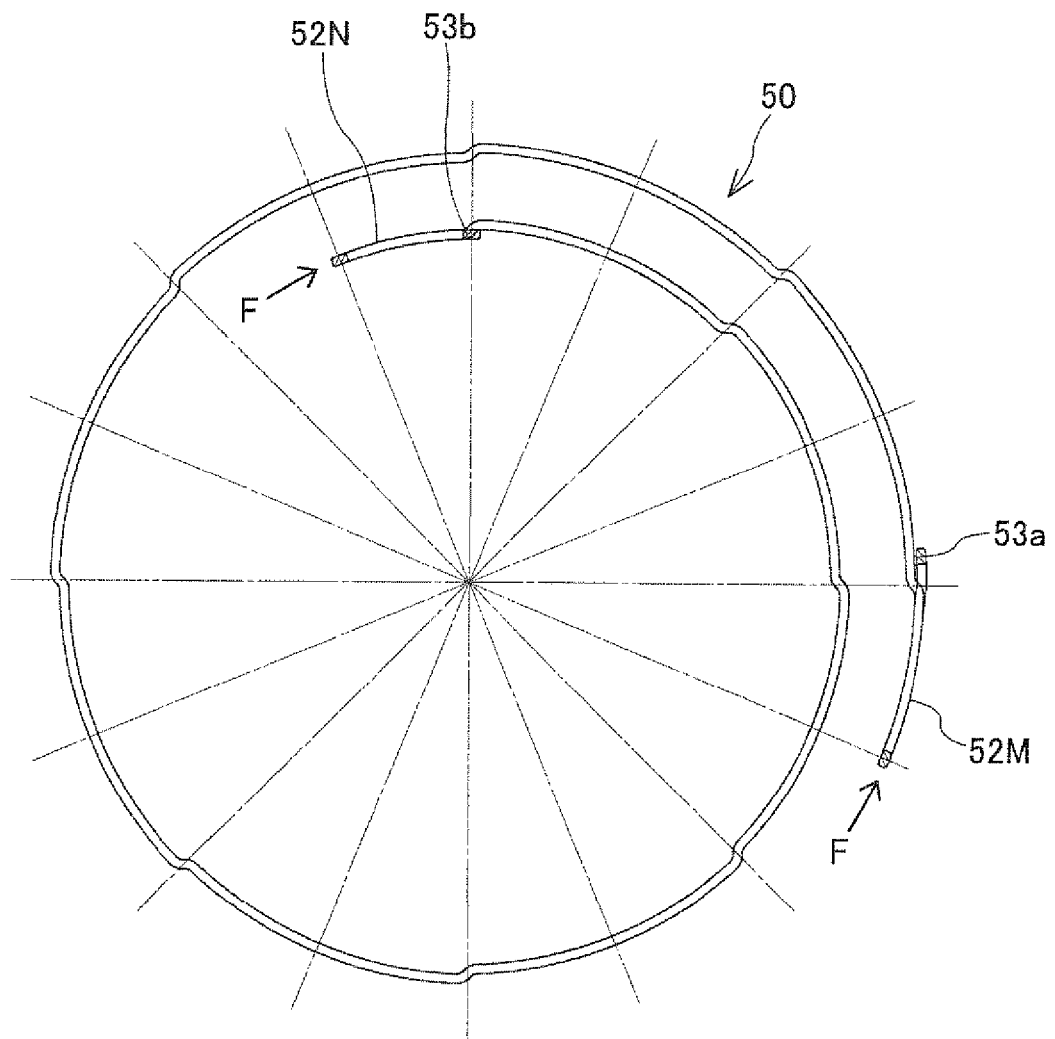
FIG. 33 is a schematic view illustrating the manner of elastically deforming one of the rolled electric wires in the stator coil forming step.

For example, referring to FIG. 33, when a load F is applied to both the ends of an electric wire 50 in a direction to unroll the electric wire 50, the electric wire 50 will be expanded radially outward. Consequently, when another electric wire 50 is axially moved into the space formed radially inside the electric wire 50, interference between the two electric wires 50 will be reduced, thereby facilitating the assembly of the two electric wires 50.

Similarly, though not graphically shown, when a load F is applied to each of the ends of the electric wires 50 included in an electric wire assembly 50b, the electric wires 50 will be expanded radially outward. Consequently, when an electric wire 50 is axially moved into the space formed radially inside the electric wire assembly 50b, interference between the electric wire 50 and the electric wire assembly 50b will be reduced, thereby facilitating the assembly of the electric wire 50 to the electric wire assembly 50b.

After assembling all of the electric wires 50 together as described above, the corresponding pairs of the lead portions 53a and 53b of the electric wires 50 are joined together by, for example, welding. As a result, the stator coil 40 as shown in FIGS. 7-10 is obtained.

In the stator core mounting step 104, the stator core 30 is mounted to the stator coil 40 formed in the stator coil forming step 103.

Specifically, in this step, the tooth portions 33 of the stator core segments 32 are respectively inserted into the spaces formed between the stacks of the in-slot portions 51 of the electric wires 50 from the radially outside of the stator coil 40. Then, the outer rim 37 is fitted onto the radially outer surfaces of the stator core segments 32. As a result, the stator core 30 and the stator coil 40 are assembled together, forming the stator 20 as shown in FIGS. 2-4.

According to the present embodiment, it is possible to achieve the following advantages.

In the present embodiment, each of the substantially planar, wave-shaped electric wires 50 as shown in FIGS. 12A-12B is rolled, using the rolling apparatus 9, by more than one turn into the spiral shape as shown in FIGS. 22-23. Specifically, in the electric wire rolling step 102, for each of the electric wires 50, the first part 570 (i.e., the first turn) of the electric wire 50 is pressed between the outer surface of the inner pressing member 91 and the inner surface of the intermediate pressing member 92, thereby plastically deforming the first part 570 to extend along the outer surface of the inner pressing member 91. Moreover, the second part 571 (i.e., the remaining less than one turn) of the electric wire 50 is pressed between the outer surface of the intermediate pressing member 92 and the inner surface of the outer pressing member 93, thereby plastically deforming the second part 571 to extend along the outer surface of the intermediate pressing member 92.

With the above configuration, it is possible to plastically deform each of the first and second parts 570 and 571, thereby reliably rolling the electric wire 50 into the spiral shape. Moreover, since the intermediate pressing member 92 is used both in plastically deforming the first part 570 and in plastically deforming the second part 571, it is possible to reduce the parts count and simplify the structure of the rolling apparatus 9.

In addition, since each of the electric wires 50 is rolled through plastic deformation thereof, it is possible to easily and accurately manipulate (i.e., place and axially move) the rolled electric wires 50 in the stator coil forming step 103, thereby facilitating the assembling of the electric wires 50. Further, after the step 103, it is possible to reliably prevent misalignment between the corresponding in-slot portions 50 of the electric wires 50 from occurring, thereby reliably keeping the hollow cylindrical shape of the stator coil 40. Consequently, in the stator core mounting step 104, it is possible to easily and accurately mount the stator core 30 to the stator coil 40. As a result, it is possible to improve the productivity of the stator 20 while ensuring both high space factors of the in-slot portions 51 of the electric wires 50 in the slots 31 of the stator core 30 and high magnetic characteristics of the stator 20.

Further, in the present embodiment, the intermediate pressing member 92 is comprised of the intermediate pressing member segments 92A-92F, and the outer pressing member 93 is comprised of the outer pressing member segments 93A-93F. During the rolling of each of the electric wires 50, the intermediate pressing member segments 92A-92F are sequentially placed on and pressed against the first part 570 of the electric wire 50, thereby plastically deforming the turn portions 52 in the first part 570 into the circumferentially-extending sections. Moreover, the outer pressing member 93 are sequentially placed on and pressed against the second part 571 of the electric wire 50, thereby plastically deforming the turn portions 52 in the second part 571 into the circumferentially-extending sections.

With the above configuration, it is possible to sequentially plastically deform the turn portions 52 of the electric wire 50. In addition, since both the intermediate and outer pressing members 92 and 93 are segmented, it is possible to easily manipulate (i.e., place and press) them in the electric wire rolling step 102.

In the present embodiment, for each of the electric wires 50 formed in the electric wire forming step 101, each of the turn portions 52 has, as shown in FIGS. 12A-12B, the crank-shaped part 54 that is bent to offset the adjacent pair of the in-slot portions 51 connected by the turn portion 52 from each other in a radial direction of the stator core 30.

Consequently, with the crank-shaped parts 54 of the turn portions 52, it is possible to arrange each adjacent pair of the turn portions 52 of the electric wires 50 in intimate contact with each other in the finally obtained stator 20, as shown in FIG. 13B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

Further, in the present embodiment, during the rolling of each of the electric wires 50, the intermediate pressing member segments 92A-92F are sequentially placed so that for each of the turn portions 52 in the first part 570 of the electric wire 50, two sections of the turn portion 52 delimited by the crank-shaped part 54 of the turn portion 52 are respectively pressed by an adjacent pair of the intermediate pressing member segments. Moreover, the outer pressing member segments 93A-93F are sequentially placed so that for each of the turn portions 52 in the second part 571 of the electric wire 50, two sections of the turn portion 52 delimited by the crank-shaped part 54 of the turn portion 52 are respectively pressed by an adjacent pair of the outer pressing member segments.

With the above configuration, since the curvature of each of the electric wires 50 is set to be constant between each adjacent pair of the crank-shaped parts 54 of the turn portions 52, it is possible to set the curvature of each of the pressing surfaces of the intermediate pressing member segments 92A-92F and outer pressing member segments 93A-93F to be constant. Consequently, it is possible to simplify the shape of each of the pressing member segments 92A-92F and 93A-93F, thereby reducing the cost of the rolling apparatus 9.

In the present embodiment, the inner pressing member 91 includes the restricting portions 911, and the intermediate pressing member 92 includes the restricting portions 921. During the rolling of each of the electric wires 50, each of the restricting portions 911 restricts movement of a corresponding one of the in-slot portions 51 in the first part 570 of the electric wire 50; each of the restricting portions 921 restricts movement of a corresponding one of the in-slot portions 51 in the second part 571 of the electric wire 50.

With the above configuration, it is possible to ensure the positional accuracy of the in-slot portions 51 in the rolled electric wires 50; it is also possible to prevent the in-slot portions 51 from being twisted during the rolling of the electric wire 50.

In the present embodiment, during the rolling of each of the electric wires 50, the inner and intermediate pressing members 91 and 92 together plastically deform the turn portions 52 in the first part 570 of the electric wire 50 into the circumferentially-extending sections. Moreover, the intermediate and outer pressing members 92 and 93 together plastically deform the turn portions 52 in the second part 571 of the electric wire 50 into the circumferentially-extending sections.

With the above configuration, it is possible to roll each of the electric wires 50 into the spiral shape as shown in FIGS. 22-23.

In the present embodiment, for each of the planar electric wires 50 formed in the electric wire forming step 101, each of the turn portions 52, which connects an adjacent pair of the in-slot portions 51, protrudes from the adjacent pair of the in-slot portions 51 in the extending direction of the in-slot portions 51, as shown in FIGS. 12A-12B.

With the above shape of the turn portions 52, when the turn portions 52 are pressed and thereby plastically deformed in the electric wire rolling step 102, it is generally easy for the in-slot portions 51 to be moved and/or twisted due to their connection with the turn portions 52. However, in the present embodiment, with the restricting portions 911 and 921 of the inner and intermediate pressing members 91 and 92 restricting movement of the in-slot portions 51 during the rolling of the electric wire 50, it is possible to ensure the positional accuracy of the in-slot portions 51 in the rolled electric wire 50.

Further, in the present embodiment, for each of the planar electric wires 50 formed in the electric wire forming step 101, each of the turn portions 52 protrudes from the adjacent pair of the in-slot portions 51 so that the center of the turn portion 52 is furthest from the in-slot portions 51.

With the above shape of the turn portions 52, it is possible to configure each of the turn portions 52 to have a symmetrical shape.

Moreover, in the present embodiment, for each of the planar electric wires 50 formed in the electric wire forming step 101, each of the turn portions 52 is stepped, as shown in FIG. 13A, to include the shoulder parts 55 and 56 that extend substantially perpendicular to the in-slot portions 51.

With the above shape of the turn portions 52, in the finally obtained stator 20, the protruding height of each of the turn portions 52 from the corresponding axial end face 30a of the stator core 30 will be reduced. As a result, the axial length of the coil end parts 42 of the stator coil 40 and thus the axial length of the entire stator 20 will be accordingly reduced.

[Second Embodiment]

Figure 34:
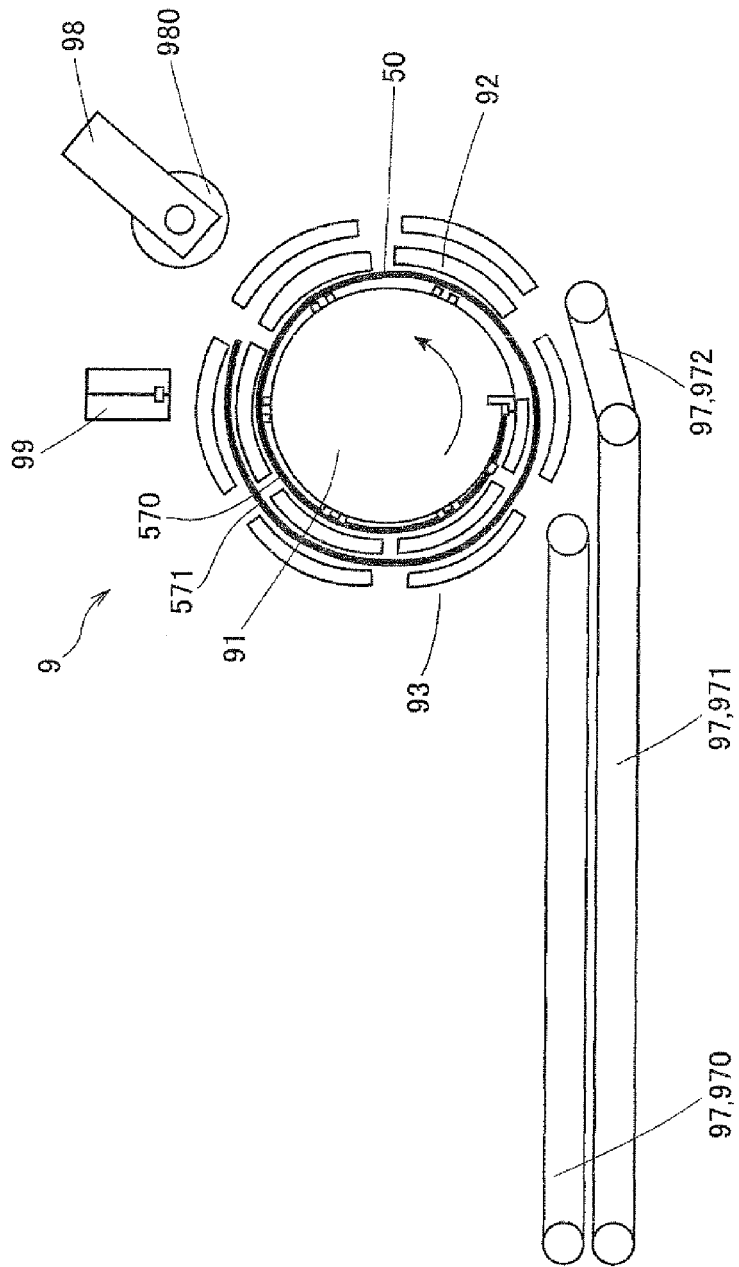
FIG. 34 is a schematic top view of a rolling apparatus according to the second embodiment of the invention, wherein moving devices 95A and 95B of the rolling apparatus are omitted for the sake of simplicity.
Figure 35:
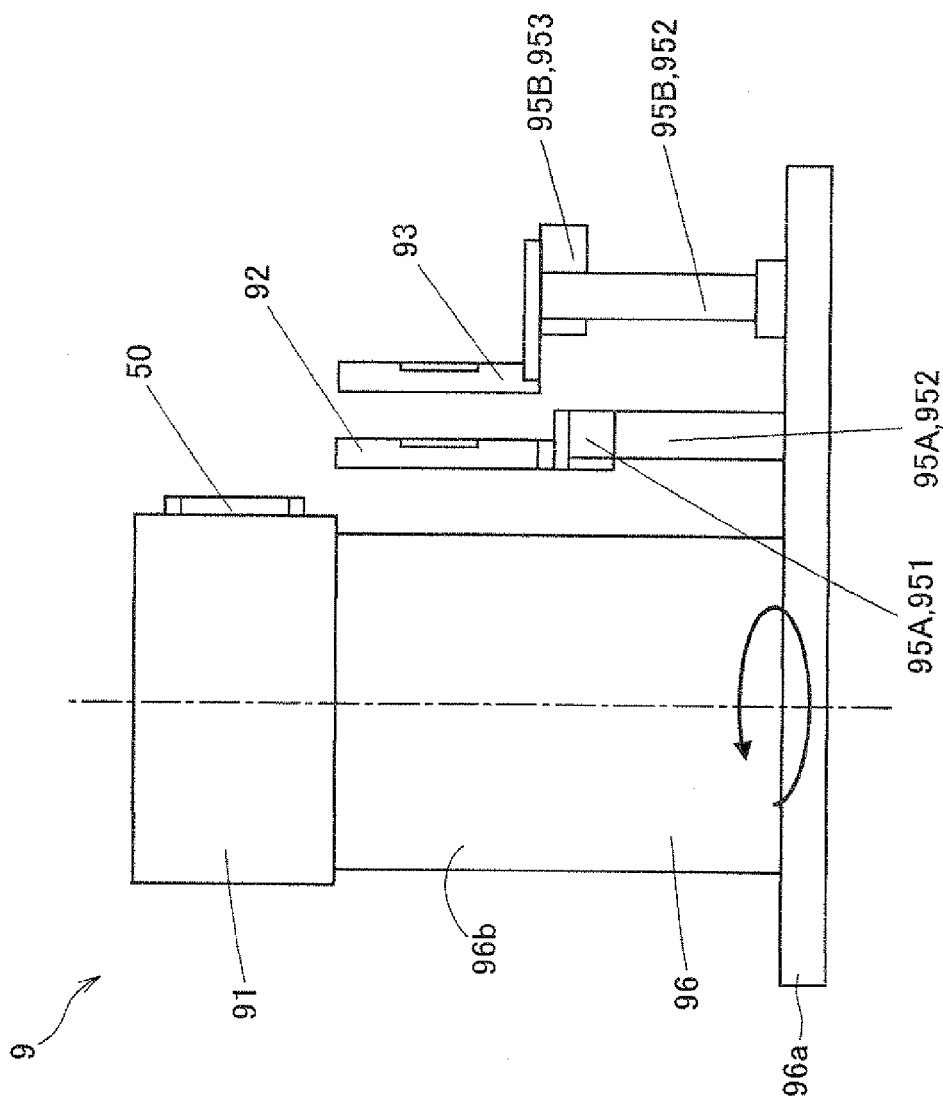
FIG. 35 is a schematic front view of the rolling apparatus according to the second embodiment, wherein a feeding belt set 97, a pressing device 98, and a chuck 99 of the rolling apparatus are omitted for the sake of simplicity.
Figure 36:
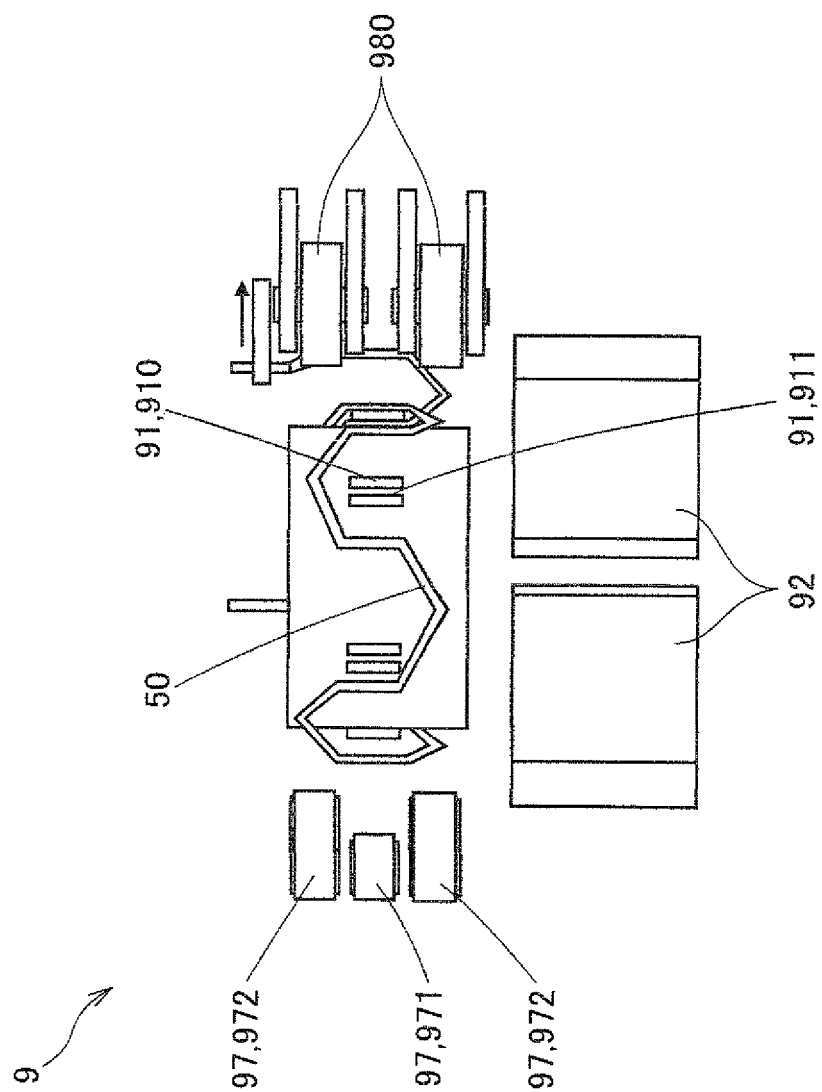
FIG. 36 is a schematic side view showing part of the rolling apparatus according to the second embodiment around a core member 91.

FIGS. 34-36 together show the configuration of a rolling apparatus 9 according to the second embodiment of the invention. As shown in the figures, the rolling apparatus 9 includes a core member 91, a plurality of (e.g., 6 in the present embodiment) intermediate dies 92, a plurality of (e.g., 6 in the present embodiment) outer dies 93, a plurality of moving devices 95A for respectively moving the intermediate dies 92, a plurality of moving devices 95B for respectively moving the outer dies 93, a rotating device 96, a feeding belt set 97, a pressing device 98, and a chuck 99.

It should be noted that for the sake of simplicity, the moving devices 95A and 95B are omitted from FIG. 34 while the feeding belt set 97, the pressing device 98, and the chuck 99 are omitted from FIG. 35. In addition, in the present embodiment, the core member 91 corresponds to the inner pressing member 91 of the first embodiment. The intermediate dies 92 together correspond to the intermediate pressing member 92 of the first embodiment; in other words, each of the intermediate dies 92 corresponds to one of the intermediate pressing member segments 92A-92F of the first embodiment. The outer dies 93 together correspond to the outer pressing member 93 of the first embodiment; in other words, each of the outer dies 93 corresponds to one of the outer pressing member segments 93A-93F of the first embodiment. The moving devices 95A and 95B together make up means for moving the intermediate and outer dies 92 and 93. The feeding belt set 97 makes up means for feeding the electric wires 50. The pressing device 98 makes up means for pressing the intermediate and outer dies 92 and 93 radially inward.

The core member 91 has a substantially cylindrical shape. During the rolling of each of the electric wires 50, the core member 91 makes contact with and presses radially outward the radially inner surface of the first turn (i.e., the first part 570 as shown in FIG. 34) of the electric wire 50, thereby shaping the radially inner surface of the first turn.

Referring to FIG. 36, the core member 91 has formed, on its outer surface, a plurality of restricting portions 911 and a pair of deforming portions 912 (not depicted in FIGS. 34-36).

Each of the restricting portions 911 receives therein a corresponding one of the in-slot portions 51 in the first turn of the electric wire 50, thereby restricting movement of the corresponding in-slot portion 51.

More specifically, in the present embodiment, each of the restricting portions 911 is made up of a pair of bar-shaped protrusions 910 formed on the outer surface of the core member 91. As shown in FIG. 36, the protrusions 910 extend in the axial direction of the core member 91, forming a recess therebetween. The recess has a cross section that is conformed to the substantially rectangular cross section of the in-slot portions 51 of the electric wire 50. Consequently, the restricting portion 911 can have the corresponding in-slot portion 51 of the electric wire 50 fitted in the recess, thereby restricting movement of the corresponding in-slot portion 51 during the rolling of the electric wire 50.

Though not shown in FIGS. 34-36, the deforming portions 912 are respectively located on opposite axial sides of the restricting portions 911. Each of the deforming portions 912 has an outer surface that is comprised of a plurality of sections having different centers of curvature and different radii of curvature. The deforming portions 912 make contact with and press radially outward the half-turn portion 52N and turn portions 52 in the first turn of the electric wire 50, thereby plastically deforming them to extend along the outer surfaces of the deforming portions 912. In addition, the centers of curvature and radii of curvature of the outer surfaces of the deforming portions 912 are set based on the desired positions of the half-turn portion 52N and turn portions 52 in the first turn of the electric wire 50 in the finally obtained stator coil 40.

The core member 91 is mounted to the rotating device 96. More specifically, as shown in FIG. 35, the rotating device 96 includes a base plate 96a and a cylindrical mount 96b fixed on the base plate 96a. The core member 91 is coaxially fixed on the mount 96b. On the other hand, the moving devices 95A and 95B, which respectively hold the intermediate and outer dies 92 and 93, are fixed on the base plate 96a. The rotating device 96 is configured to rotate about the axis of the mount 96b, thereby causing the core member 91 to rotate about its own axis and causing the moving devices 95A and 95B along with the intermediate and outer dies 92 and 93 to rotate around the axis of the core member 91 (or the axis of the mount 96b). In addition, the operating condition of the rotating device 96 can be set as desired; the operating condition includes the rotational direction (i.e., either clockwise or counterclockwise direction), the rotational speed, and the amount of rotation of the rotating device 96. That is to say, the rotating device 96 is capable of rotating at a given speed by a given angle.

The intermediate dies 92 are arranged, as shown in FIG. 34, so as to have the first turn (i.e., the first part 570) of the electric wire 50 radially interposed between the core member 91 and the intermediate dies 92. The intermediate dies 92 make contact with and press radially inward the radially outer surface of the first turn of the electric wire 50, thereby shaping the radially outer surface of the first turn.

More specifically, in the present embodiment, the intermediate dies 92 are so shaped as to together make up a substantially cylindrical tube surrounding the core member 91. In other words, each of the intermediate dies 92 is in the form of an arc-shaped tube segment.

Moreover, though not shown in FIGS. 34-36, each of the intermediate dies 92 has formed, on its radially outer surface, a restricting portion 921 and a pair of deforming portions 922. The restricting portion 921 has the same configuration as the restricting portions 911 of the core member 91. The restricting portion 921 receives therein a corresponding one of the in-slot portions 51 in the remaining less than one turn (i.e., the second part 571 as shown in FIG. 34) of the electric wire 50, thereby restricting movement of the corresponding in-slot portion 51. The deforming portions 922 are respectively located on opposite axial sides of the restricting portion 921. Each of the deforming portions 922 has radially inner and outer surfaces each of which has a given center of curvature and a given radius of curvature.

The radially inner surfaces of the deforming portions 922 of the intermediate dies 92 make contact with and press radially inward the half-turn portion 52N and turn-portions 52 in the first turn of the electric wire 50, thereby shaping them in cooperation with the deforming portions 912 of the core member 91. On the other hand, the radially outer surfaces of the deforming portions 922 of the intermediate dies 92 make contact with and press radially outward the half-turn portion 52M and turn portions 52 in the remaining less than one turn of the electric wire 50, thereby plastically deforming them to extend along the radially outer surfaces of the deforming portion 922.

In addition, the centers of curvature and radii of curvature of the radially inner surfaces of the deforming portions 922 of the intermediate dies 92 are set based on the desired positions of the half-turn portion 52N and turn portions 52 in the first turn of the electric wire 50 in the finally obtained stator coil 40. On the other hand, the centers of curvature and radii of curvature of the radially outer surfaces of the deforming portions 922 are set based on the desired positions of the half-turn portion 52M and turn portions 52 in the remaining less than one turn of the electric wire 50 in the finally obtained stator coil 40.

In the present embodiment, each of the intermediate dies 92 is held by a corresponding one of the moving devices 95A so that it can rotate together with the corresponding moving device 95A around the axis of the core member 91. Consequently, the relative position of each of the intermediate dies 92 to the core member 91 is kept constant in the circumferential direction of the core member 91. However, each of the intermediate dies 92 is movable relative to the core member 91 both in the axial and radial directions of the core member 91. More specifically, as shown in FIG. 35, each of the intermediate dies 92 can be axially moved by a reciprocator 950 of the corresponding moving device 95A; it can also be radially moved by a reciprocator 951 of the corresponding moving device 95A.

Referring again to FIG. 34, the outer dies 93 are arranged so as to have the remaining less than one turn (i.e., the second part 571) of the electric wire 50 radially interposed between the intermediate dies 92 and the outer dies 93. The outer dies 93 make contact with and press radially inward the radially outer surface of the remaining less than one turn of the electric wire 50, thereby shaping the radially outer surface.

More specifically, in the present embodiment, the outer dies 93 are so shaped as to together make up a substantially cylindrical tube surrounding the intermediate dies 92. In other words, each of the outer dies 93 is in the form of an arc-shaped tube segment.

Each of the outer dies 93 has a radially inner surface that has a given center of curvature and a given radius of curvature. The radially inner surfaces of the outer dies 93 make contact with and press radially inward the half-turn portion 52M and turn portions 52 in the remaining less than one turn of the electric wire 50, thereby shaping them in cooperation with the deforming portions 922 of the intermediate dies 92. In addition, the centers of curvature and radii of curvature of the radially inner surfaces of the outer dies 93 are set based on the desired positions of the half-turn portion 52M and turn portions 52 in the remaining less than one turn of the electric wire 50 in the finally obtained stator coil 40.

In the present embodiment, each of the outer dies 93 is held by a corresponding one of the moving devices 95B so that it can rotate together with the corresponding moving device 95B around the axis of the core member 91. Consequently, the relative position of each of the outer dies 93 to the core member 91 is kept constant in the circumferential direction of the core member 91. However, each of the outer dies 93 is movable relative to the core member 91 both in the axial and radial directions of the core member 91. More specifically, as shown in FIG. 35, each of the outer dies 93 can be axially moved by a reciprocator 952 of the corresponding moving device 95B; it can also be radially moved by a reciprocator 953 of the corresponding moving device 95B.

Figure 37:
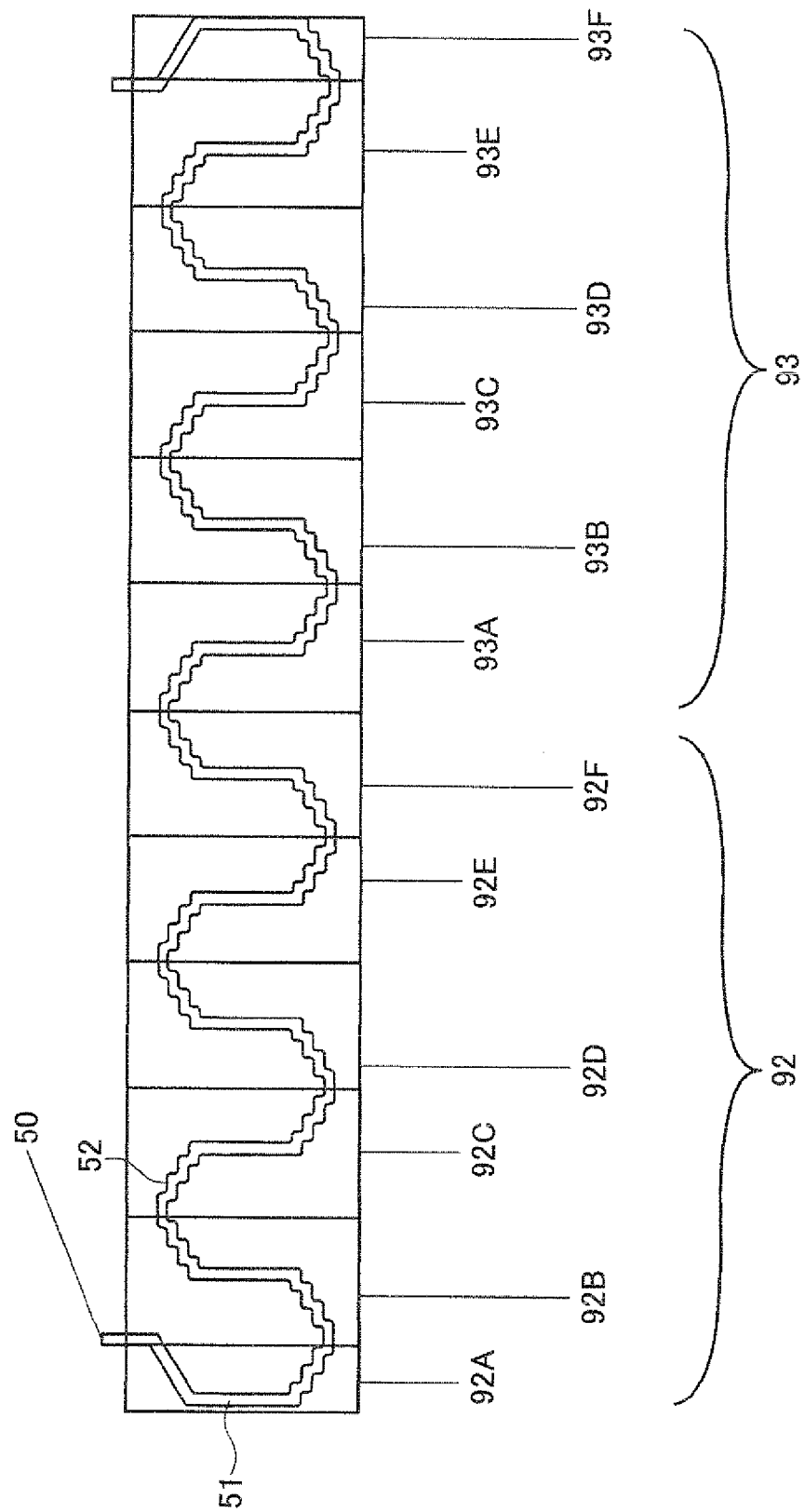
FIG. 37 is a development view illustrating the arrangement of intermediate dies 92 and outer dies 93 of the rolling apparatus according to the second embodiment.

Moreover, referring to FIG. 37, in the present embodiment, the intermediate and outer dies 92 and 93 are so arranged that each of the in-slot portions 51 of the electric wire 50 is pressed radially inward only by a corresponding one of the intermediate and outer dies 92 and 93.

The feeding belt set 97 is provided to feed (or convey) the electric wire 50 to a given position radially outside the core member 91. More specifically, the feeding belt set 97 feeds the electric wire 50 along a substantially tangential direction to the radially outer periphery of the core member 91 during the shaping of the first turn of the electric wire 50 and along a substantially tangential direction to the radially outer periphery of the intermediate dies 92 during the shaping of the remaining less than one turn of the electric wire 50.

Referring to FIGS. 34, 36, and 38-40, in the present embodiment, the feeding belt set 97 is comprised of a pair of inner and outer belts 970 and 971 and a pair of urging belts 972.

The inner and outer belts 970 and 971 are respectively located on the radially inner and outer sides of the electric wire 50 and together convey the electric wire 50 toward the core member 91 by sandwiching the in-slot portions 51 of the electric wire 50 therebetween. More specifically, the outer belt 971 has its front end located in the vicinity of the core member 91 and extends parallel to a tangential direction to the core member 91. The inner belt 970 has its rear end aligned with the rear end of the outer belt 971 in a direction perpendicular to the feeding direction and extends parallel to the outer belt 971. The inner belt 970 has a shorter length than the outer belt 971 so that the front end of the inner belt 970 is not in alignment with that of the outer belt 971 in the direction perpendicular to the feeding direction. However, as seen from FIG. 40, the inner and outer belts 970 and 971 have the same width in the axial direction of the core member 91 which is substantially equal to the length of the in-slot portions 51 of the electric wire 50.

Figure 40:
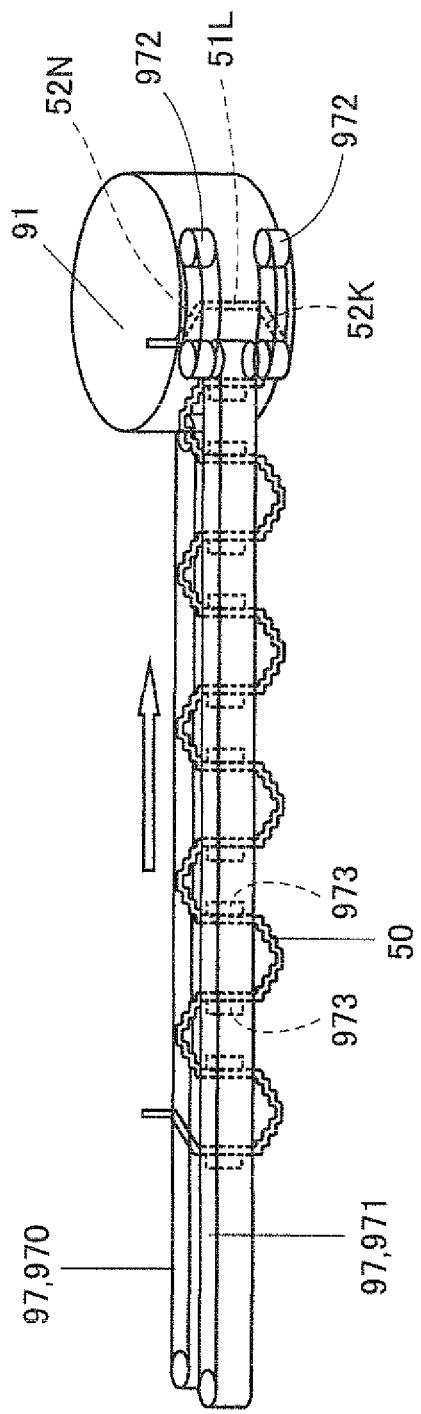

Each of the urging belts 972 has, as shown in FIG. 40, its rear end mounted on the same shaft as the front end of the outer belt 971 and its front end located on the opposite side to the rear end of the outer belt 971. The urging belts 972 extend respectively on opposite axial sides of the outer belt 971 to urge the turn portions 52 of the electric wire 50 toward the outer surface of the core member 91 or toward the outer surfaces of the intermediate dies 92.

In addition, in the present embodiment, the inner and outer belts 970 and 971 drive the electric wire 50 to move along therewith by means only of friction between the in-slot portions 51 of the electric wire 50 and the inner and outer belts 970 and 971. Consequently, upon the turn portions 52 of the electric wire 50 being urged by the urging belts 972, the in-slot portions 51 can be easily detached from the outer belt 971 to rest on the outer surface of the core member 91 or on the outer surfaces of the intermediate dies 92. Moreover, as shown in FIG. 40, a plurality of protrusions 973 are formed on at least one of the surfaces of the inner and outer belts 970 and 971 which abut the in-slot portions 51 of the electric wire 50, so as to engage with the in-slot portions 51.

The pressing device 98 are provided to press the intermediate and outer dies 92 and 93 radially inward, thereby shaping the electric wire 50 between the core member 91 and the intermediate dies 92 and between the intermediate dies 92 and the outer dies 93. In the present embodiment, as shown in FIGS. 34 and 36, the pressing device 98 includes two pressing rollers 980 that are located apart from each other in the axial direction of the core member 91 so as to be at the same axial positions as the turn portions 52 of the electric wire 50. The pressing rollers 980 are configured to roll on the outer surfaces of the intermediate and outer dies 92 and 93 while pressing the outer surfaces.

The chuck 99 is provided to hold the electric wire 50 when the intermediate and outer dies 92 and 93 are returned to their respective initial positions after the electric wire 50 is rolled into the spiral shape.

After having described the configuration of the rolling apparatus 9 according to the present embodiment, the manner of rolling each of the electric wires 50 using the rolling apparatus 9 will be described hereinafter.

First, as shown in FIG. 35, the intermediate and outer dies 92 and 93 are respectively held by the moving devices 95A and 95B to rest at their respective initial positions. More specifically, at the initial positions, all of the intermediate and outer dies 92 and 93 are axially offset from the core member 91; the intermediate dies 92 are located radially away from the core member 91; and the outer dies 93 are located radially away from the intermediate dies 92.

Then, the in-slot portions 51 of the electric wire 50 are inserted between the inner and outer belts 970 and 971 so that the extending direction of the in-slot portions 51 is perpendicular to the feeding direction of the belts 970 and 971. In addition, the electric wire 50 is formed in the electric wire forming step 101 described in the first embodiment.

Figure 38A:
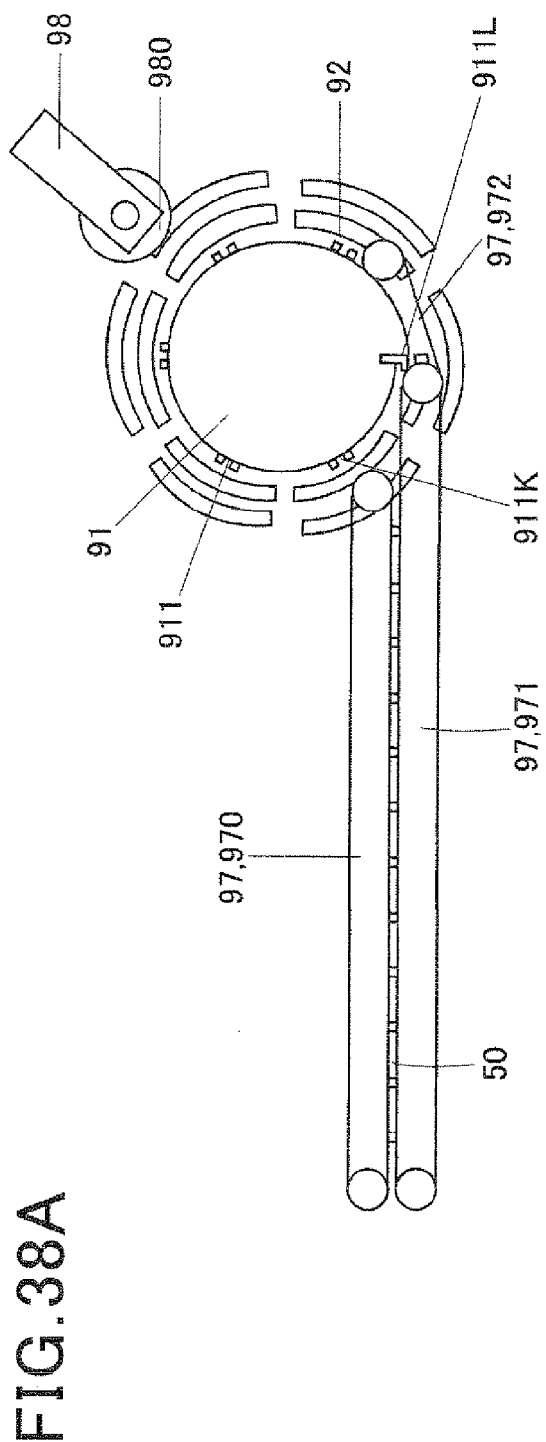
FIGS. 38A and 38B are respectively schematic top and side views illustrating the electric wire rolling step according to the second embodiment, wherein the intermediate dies 92 and outer dies 93 of the rolling apparatus rest at initial positions thereof.
Figure 38B:
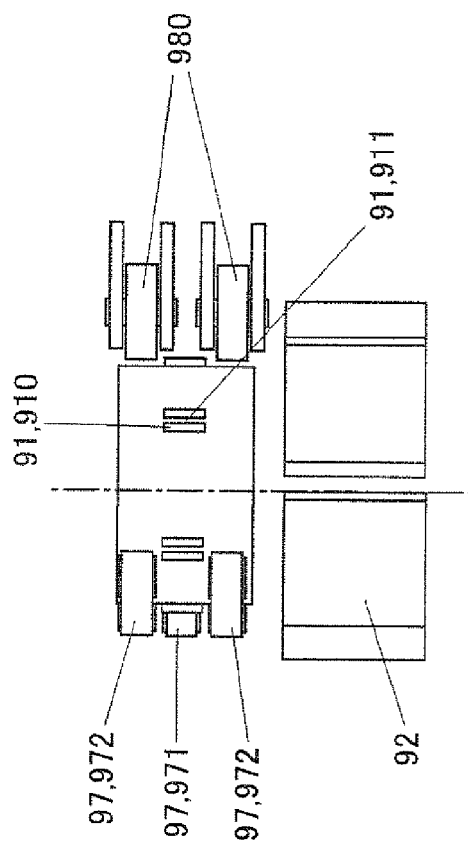

Thereafter, referring to FIGS. 38A-38B, the inner and outer belts 970 and 971 are moved so that the surfaces of the belts 970 and 971, which abut the in-slot portions 51 of the electric wire 50, flow toward the core member 91. Consequently, the electric wire 50 is moved, by means of friction between the in-slot portions 51 and the surfaces of the inner and outer belts 970 and 971, toward the core member 91.

In addition, the in-slot portions 51 of the electric wire 50 are successively inserted between the surfaces of the inner and outer belts 970 and 971, held by the belts 970 and 971 by means of friction between the in-slot portions 51 and the surfaces of the belts 970 and 971, and restricted from moving relative to the belts 970 and 971 by the protrusions 973 (see FIG. 40) formed on the at least one of the surfaces of the belts 970 and 971. Consequently, the electric wire 50 can be fed (or conveyed) toward the core member 91 without deformation of the in-slot portions 51. As a result, the extending direction of the in-slot portions 51 can be kept perpendicular to the feeding direction.

Figure 39:
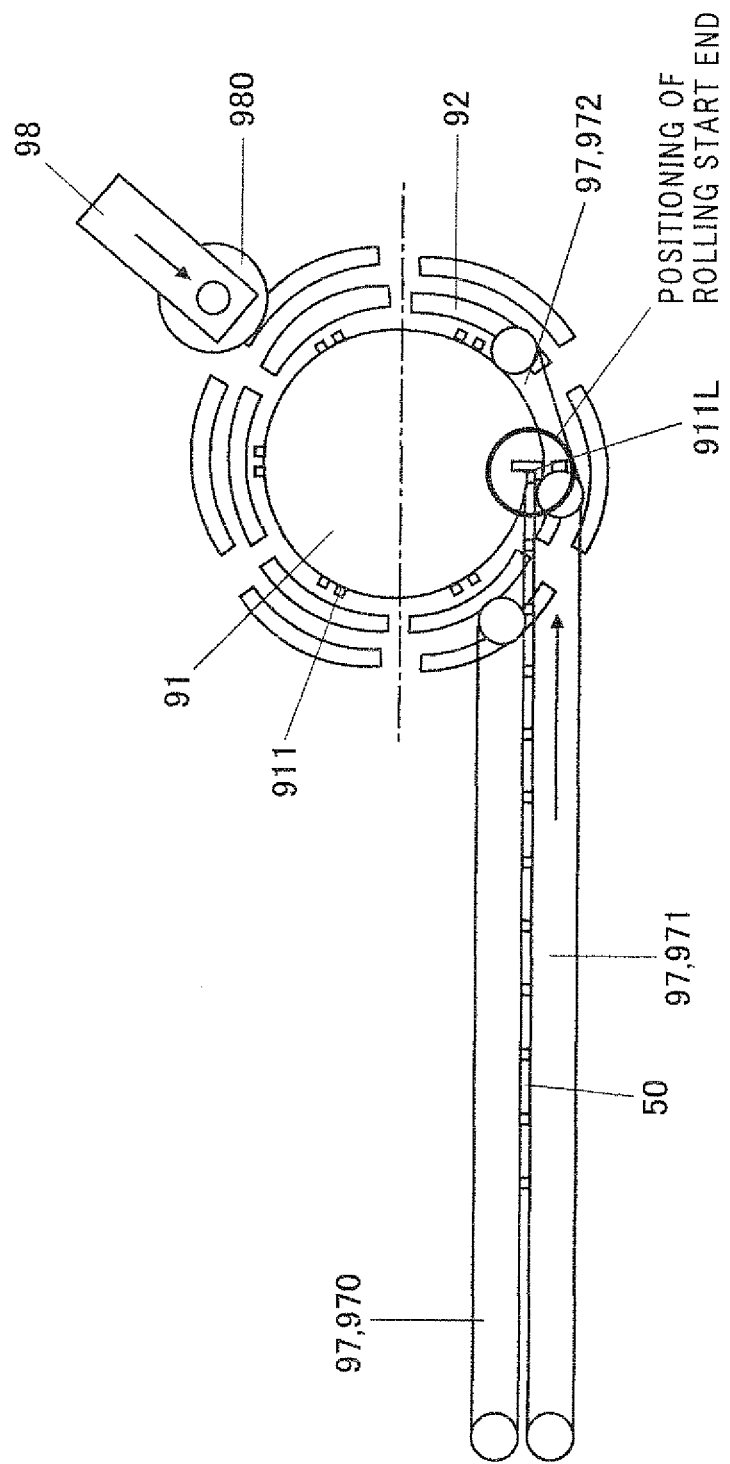
FIGS. 39 and 40 are respectively schematic top and front views illustrating the positioning of the rolling start end of an electric wire with respect to the core member 91 of the rolling apparatus.

Further, referring to FIGS. 39-40, when the electric wire 50 has conveyed to reach the outer surface of the core member 91, the urging belts 972 come to urge the half-turn portion 52N and turn portion 52K of the electric wire 50 radially inward, thereby causing the in-slot portion 51L to be fitted into the recess of the restricting portion 911L of the core member 91. Consequently, the rolling start end of the electric wire 50 is positioned with respect to the core member 91.

Then, the core member 91 is rotated by the rotating device 96 by a predetermined angle. Consequently, the in-slot portion 51L of the electric wire 50, which is fitted in the recess of the restricting portion 911L of the core member 91, is exposed together with the half-turn portion 52N and the in-slot portion 51L-side half of the turn portion 52K from the urging belts 972.

Thereafter, the intermediate die 92A is moved by the corresponding moving device 95A to come to press the exposed portions of the electric wire 50 radially inward, thereby shaping them between the outer surface of the core member 91 and the inner surface of the intermediate die 92A.

Figure 41:
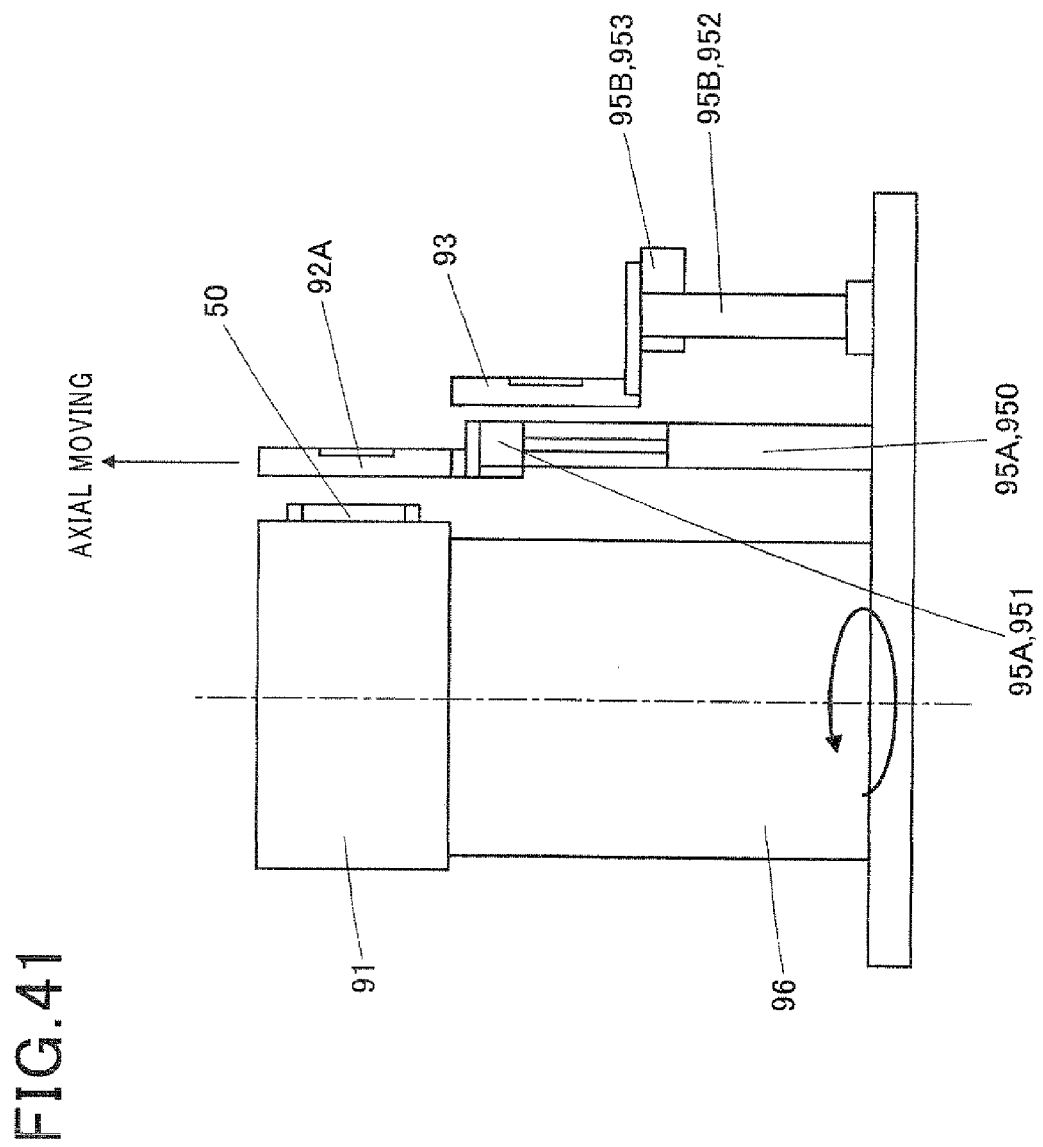
FIG. 41 is a schematic front view illustrating the axial moving of each of the intermediate dies 92 by a corresponding one of the moving devices 95A.
Figure 42:
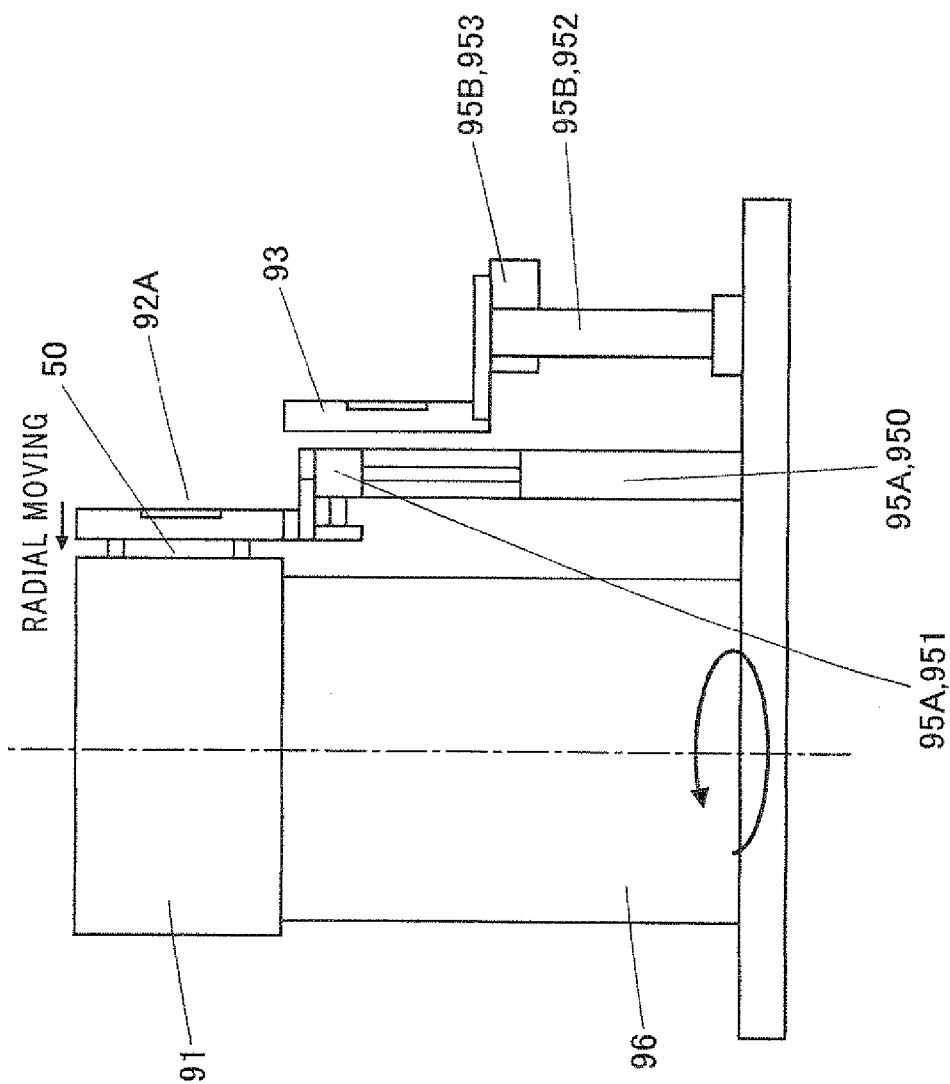
FIG. 42 is a schematic front view illustrating the radial moving of each of the intermediate dies 92 by the corresponding moving device 95A.
Figure 43A:
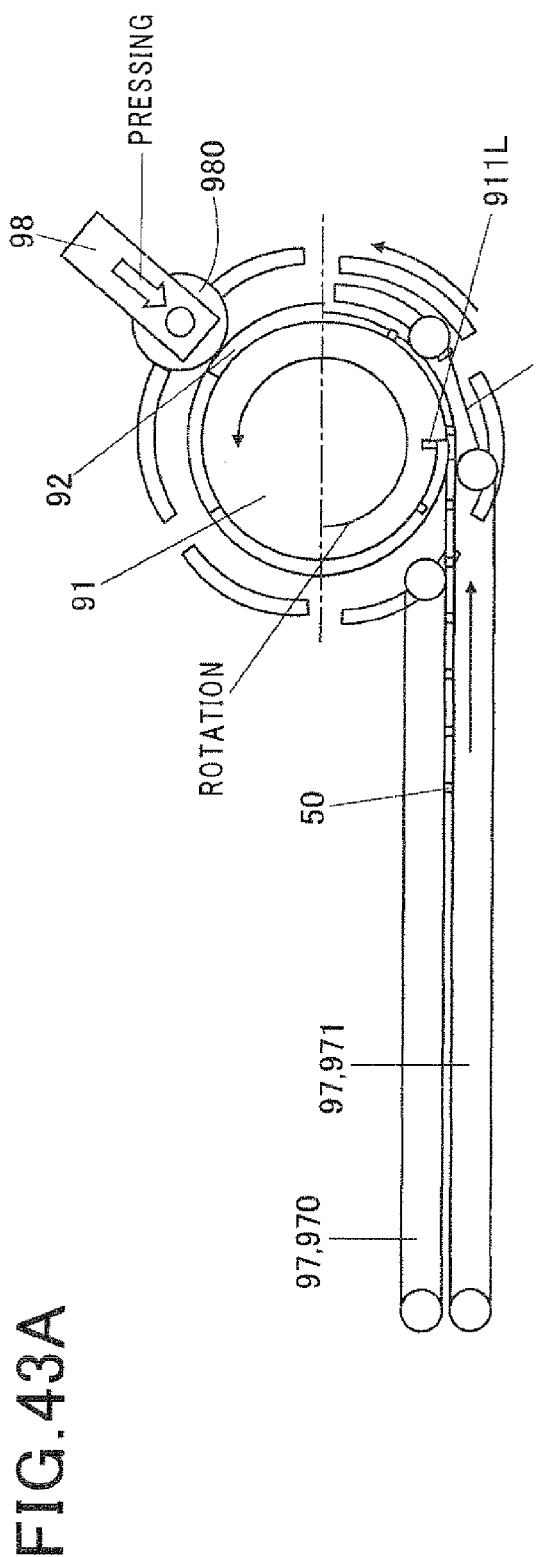
FIGS. 43A and 43B are respectively schematic top and side views illustrating the operation of the pressing device 98.
Figure 43B:
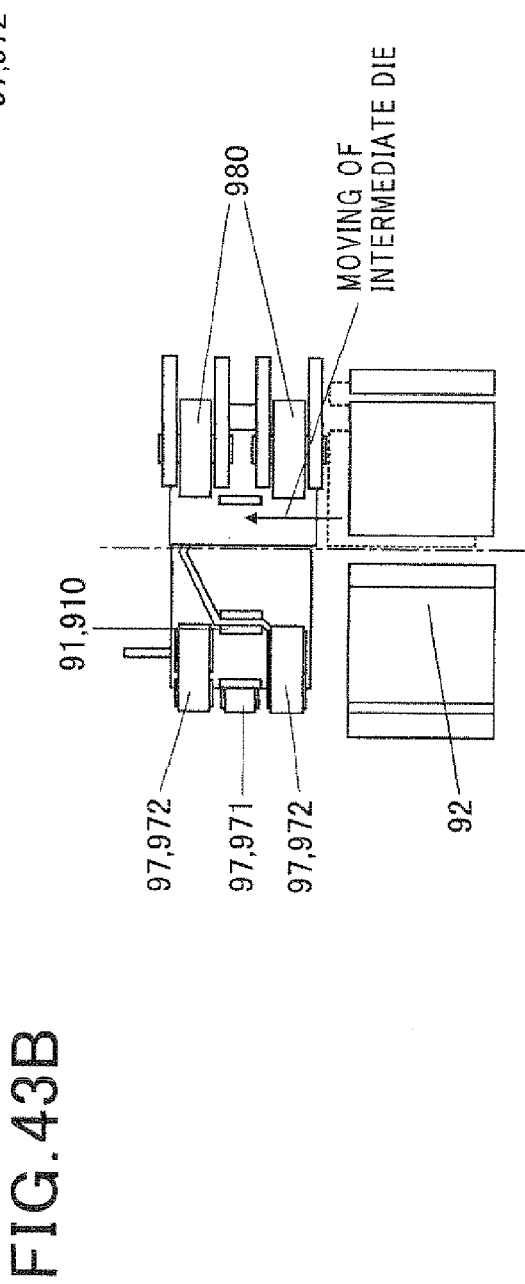

More specifically, as shown in FIG. 41, the reciprocator 950 of the corresponding moving device 95A axially moves the intermediate die 92A to brining the axial position of the intermediate die 92A into agreement with that of the core member 91. Then, as shown in FIG. 42, the reciprocator 951 of the corresponding moving device 95A moves the intermediate die 92A radially inward to sandwich the in-slot portion 51L, the half-turn portion 52N, and the in-slot portion 51L-side half of the turn portion 52K of the electric wire 50 between the outer surface of the core member 91 and the inner surface of the intermediate die 92A. Thereafter, referring to FIGS. 43A-43B, the pressing rollers 980 of the pressing device 98 are moved radially inward to come to press the intermediate die 92A radially inward, thereby plastically deforming those portions of the electric wire 50 which are sandwiched between the outer surface of the core member 91 and the inner surface of the intermediate die 92A. In addition, when the core member 91 and the intermediate die 92A are rotated by the rotating device 96, the pressing rollers 980 roll on the outer surface of the intermediate die 92A while pressing the intermediate die 92A, thereby allowing rotation of them together with those portions of the electric wire 50 sandwiched therebetween. Consequently, it is possible for the pressing rollers 980 to continuously press the intermediate die 92A during rotation thereof.

Moreover, during the shaping of those portions of the electric wire 50 which are sandwiched between the core member 91 and the intermediate die 92A, the rotating device 96 keeps its rotating operation and the inner and outer belts 970 and 971 together keep the feeding of the electric wire 50. Consequently, the urging belts 972 come to urge the in-slot portion 51K-side half of the turn portion 52K and the in-slot portion 51K-side half of the turn portion 52J of the electric wire 50 radially inward, thereby causing the in-slot portion 51K to be fitted into the recess of the restricting portion 911K of the core member 91.

Thereafter, with further rotation of the core member 91, the in-slot portion 51K is exposed, together with the in-slot portion 51K-side half of the turn portion 52K and the in-slot portion 51K-side half of the turn portion 52J, from the urging belts 972.

Then, in the same manner as the intermediate die 92A, the intermediate die 92B is moved by the corresponding moving device 95A and pressed by the pressing device 98 radially inward, thereby plastically deforming those portions of the electric wire 50 which are sandwiched between the outer surface of the core member 91 and the inner surface of the intermediate die 92B; those portions include the in-slot portion 51K, the in-slot portion 51K-side half of the turn portion 52K, and the in-slot portion 51K-side half of the turn portion 52J.

Further, by repeating the above process using the intermediate dies 92C-92F, the first turn (i.e., the first part 570) of the electric wire 50 is completed which is rolled around the core member 91 as illustrated in FIG. 34. In addition, after completion of the first turn, the intermediate dies 92A-92F are held by the corresponding moving devices 95A to keep the first turn of the electric wire 50 sandwiched between the outer surface of the core member 91 and the inner surfaces of the intermediate dies 92A-92F.

Figure 46:
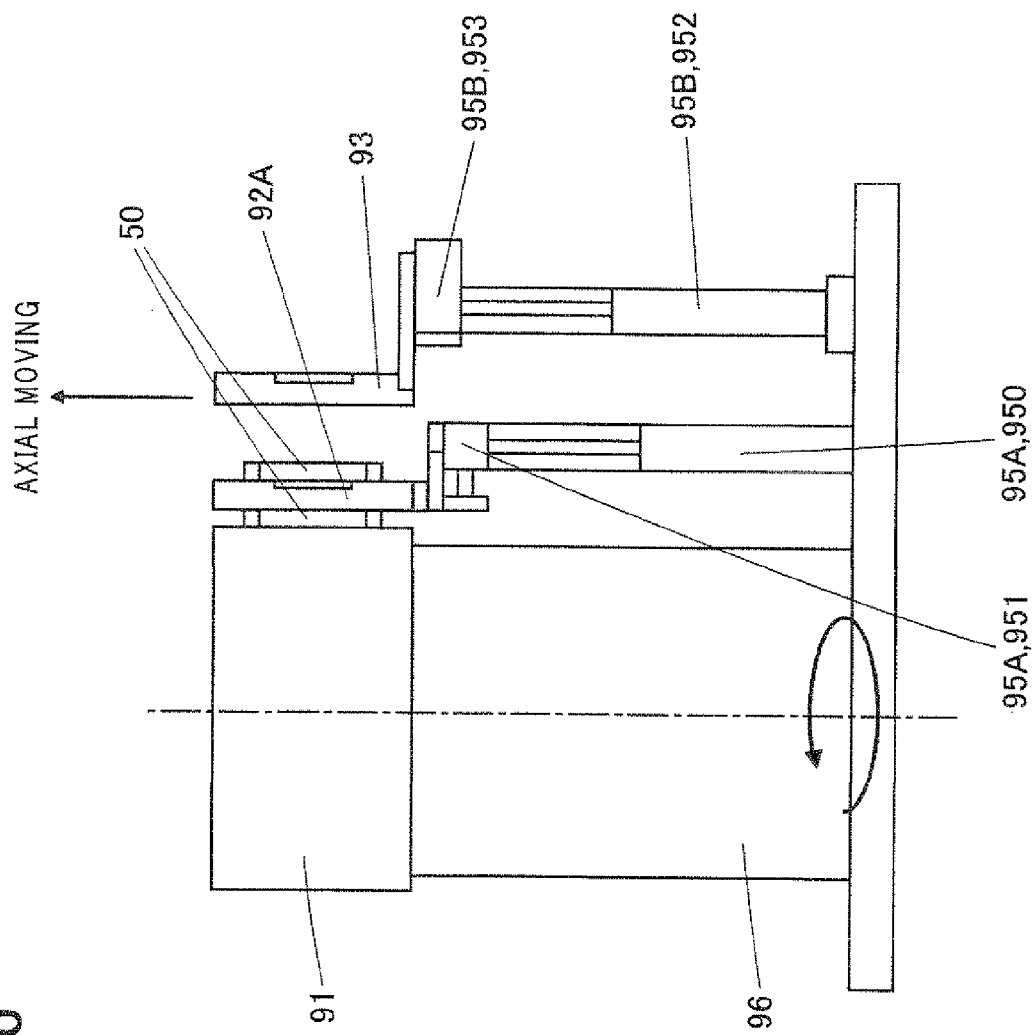
FIG. 46 is a schematic front view illustrating the axial moving of each of the outer dies 93 by a corresponding one of the moving devices 95B.
Figure 47:
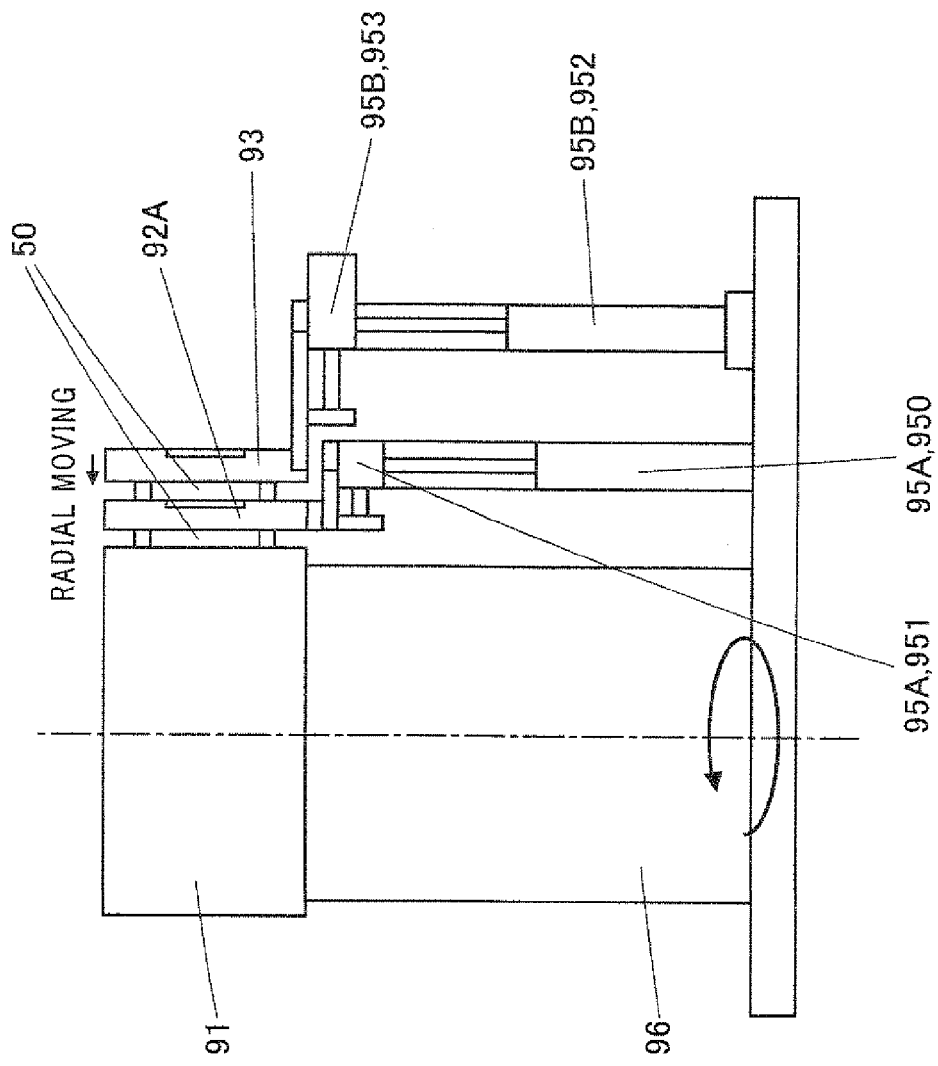
FIG. 47 is a schematic front view illustrating the radial moving of each of the outer dies 93 by the corresponding moving device 95B.

Furthermore, referring to FIGS. 44A-44B and 45A-45B, in the same manner as the shaping of the first turn, the remaining less than one turn (i.e., the second part 571) of the electric wire 50 is shaped between the outer surfaces of the intermediate dies 92A-92F and the inner surfaces of the outer dies 93A-93F. In addition, for the shaping of the remaining less than one turn of the electric wire 50, each of the outer dies 93A-93F is axially moved by the reciprocator 952 of the corresponding moving device 95B as shown in FIG. 46, and radially moved by the reciprocator 953 of the corresponding moving device 95B as shown in FIG. 47.

Figure 48:
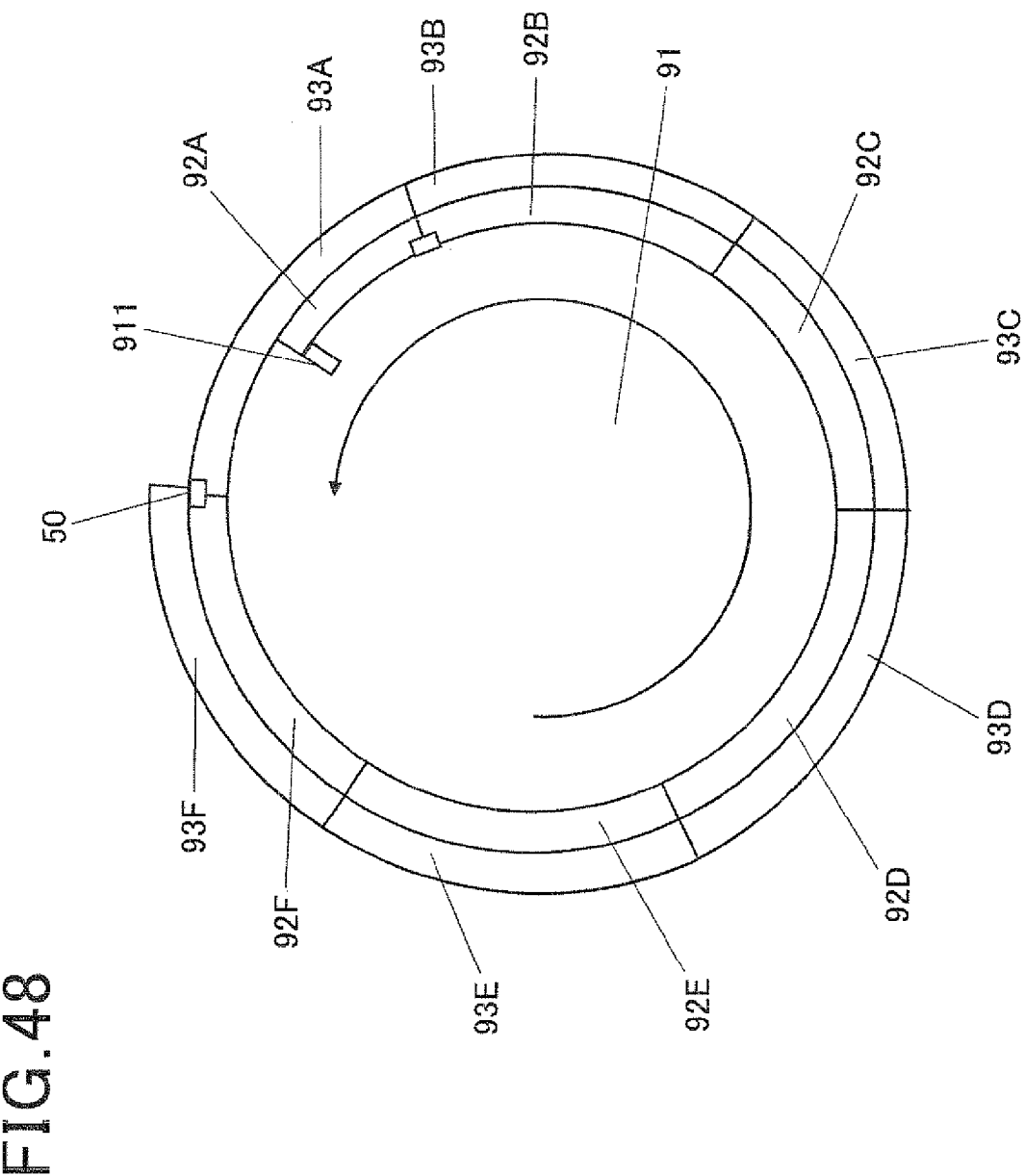
FIG. 48 is a schematic top view illustrating the shaping positions of the intermediate dies 92 and outer dies 93 of the rolling apparatus according to the second embodiment.

As a result, the electric wire 50 is rolled into the spiral shape with the intermediate dies 92A-92F and outer dies 93A-93F moved to their respective shaping positions as shown in FIG. 48.

Figure 49:
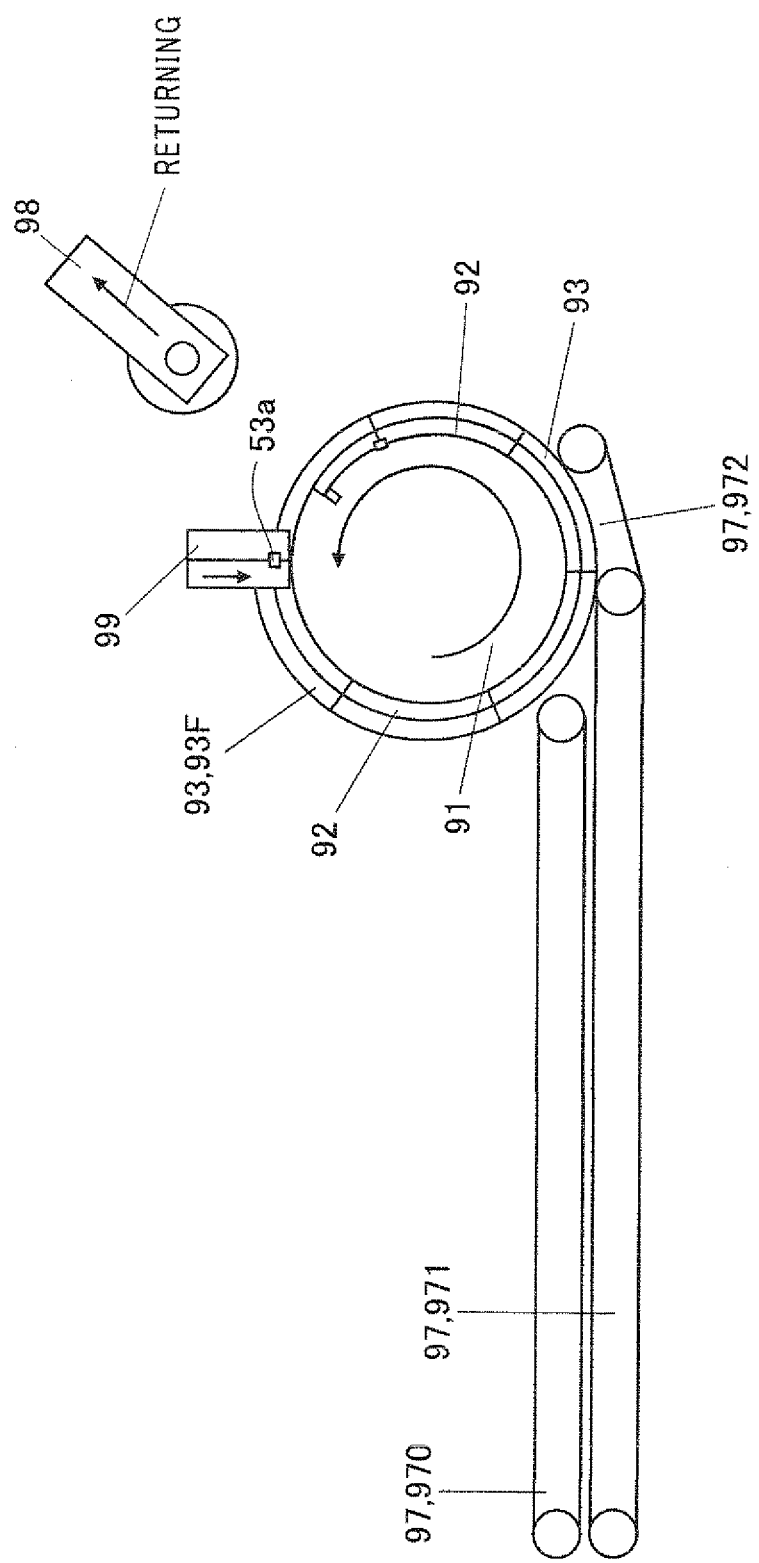
FIG. 49 is a schematic top view illustrating the radially inward movement of the chuck 99 to catch and hold a lead portion of the electric wire.

After the shaping of the electric wire 50, the pressing rollers 980 of the pressing device 98 are moved radially outward to return to their respective initial positions, and the chuck 99 is moved radially inward to catch and hold the lead portion 53a of the electric wire 50, as shown in FIG. 49.

Then, referring to FIGS. 50A-50B, with the chuck 99 holding the lead portion 53a of the electric wire 50, the outer dies 93 are moved by the corresponding moving devices 95B to return to their respective initial positions in the sequence of 93F, 93E, 93D, 93C, 93B, and 93A. Moreover, the feeding belt set 97 is shifted radially outward so as to be away from the core member 91. Consequently, the remaining less than one turn (i.e., the second part 571) of the electric wire 50 is completely exposed.

In addition, as can be seen from FIGS. 50A-50B, since the chuck 99 holds only the lead portion 53a of the electric wire 50, no interference occurs between the outer dies 93 and the chuck 99 during the returning of the outer dies 93 to their respective initial positions.

Next, holding the lead portion 53a of the electric wire 50, the chuck 99 is moved radially outward to its initial position. Then, the rotating device 96 is driven to reversely rotate the core member 91 and the intermediate dies 92, causing the remaining less than one turn (i.e., the second part 571) of the electric wire 50 to be detached from the intermediate dies 92.

Figure 51A:
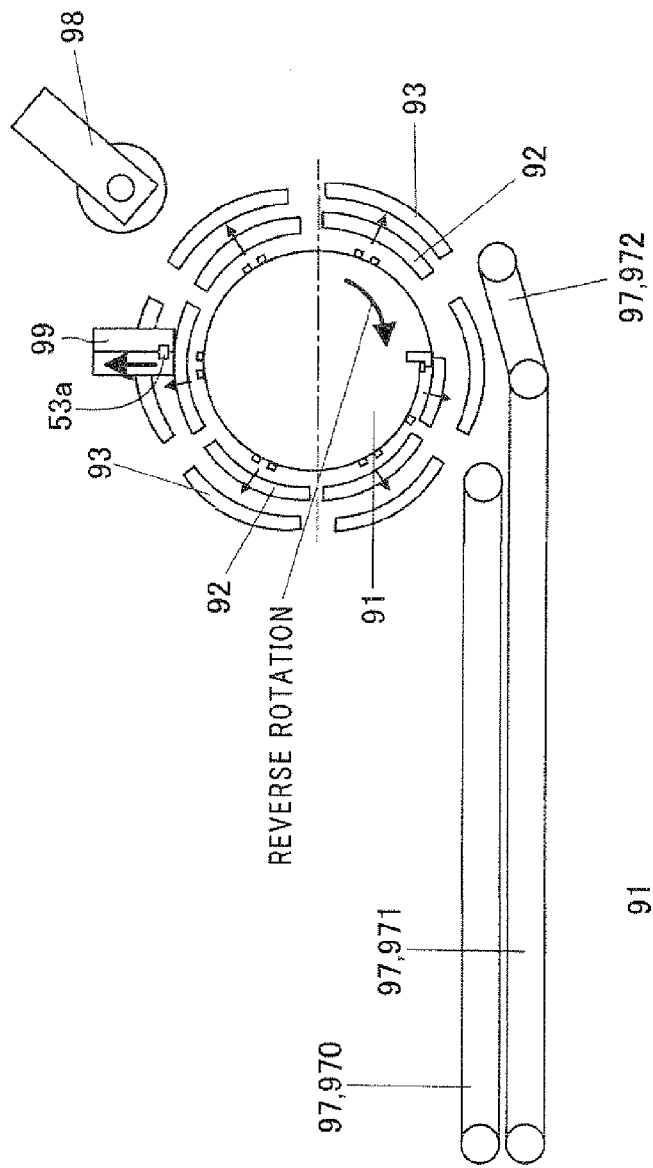
FIGS. 51A and 51B are respectively schematic top and side views illustrating the returning of the intermediate dies 93 to their respective initial positions.
Figure 51B:
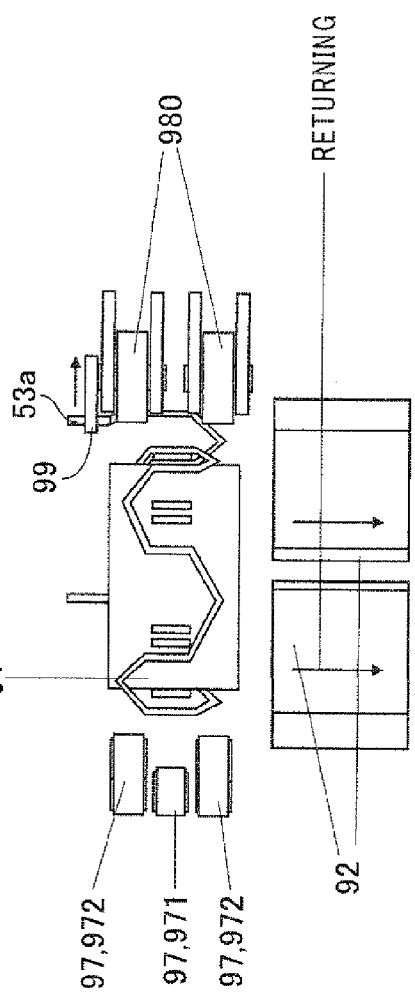

Further, referring to FIGS. 51A-51B, with the chuck 99 holding the lead portion 53a of the electric wire 50, the intermediate dies 92 are moved by the corresponding moving devices 95A to return to their respective initial positions in the sequence of 92F, 92E, 92D, 92C, 92B, and 92A.

Thereafter, the chuck 99 releases the lead portion 53a of the electric wire 50, and the entire electric wire 50 is then removed from the core member 91.

As a result, the rolled electric wire 50 is finally obtained.

In addition, after rolling each of the electric wires 50 in the above-described manner, the resultant rolled electric wires 50 are assembled together to form the stator coil 40 in the subsequent stator coil forming step 103.

The rolling apparatus 9 according to the present embodiment has the same advantages as that according to the first embodiment. In addition, the rolling apparatus 9 according to the present embodiment further has the following advantages.

In the present embodiment, the rolling apparatus 9 includes means for moving each of the intermediate and outer dies 92 and 93 between the initial and shaping positions thereof and means for feeding the electric wire 50 to a given position radially outside the core member 91. In addition, each of the intermediate dies 92 is away from the first part 570 (i.e., the first turn) of the electric wire 50 at its initial position and in contact with the first part 570 at its shaping position; each of the outer dies 93 is away from the second part 571 (i.e., the second turn) of the electric wire 50 at its initial position and in contact with the second part 571 at its shaping position.

Consequently, with the moving means and the feeding means, it is possible for the rolling apparatus 9 to automatically roll the electric wire 50 into the spiral shape.

In the present embodiment, the intermediate dies 92 together correspond to the intermediate pressing member 92 of the first embodiment, and the outer dies 93 together correspond to the outer pressing member 93 of the first embodiment. In other words, in the present embodiment, the intermediate pressing member is segmented into the intermediate dies 92, and the outer pressing member is segmented into the outer dies 93.

With the segmented structure of the intermediate and outer pressing members, it is possible to easily manipulate (i.e., place and press) them during the rolling of the electric wire 50.

Further, in the present embodiment, as shown in FIG. 37, the intermediate and outer dies 92 and 93 are so arranged that during the rolling of the electric wire 50, each of the in-slot portions 51 of the electric wire 50 is pressed radially inward only by a corresponding one of the intermediate and outer dies 92 and 93.

Consequently, with the above arrangement, each of the in-slot portions 51 of the electric wire 50 can be reliably restricted from moving during the rolling of the electric wire 50.

In the present embodiment, the moving means is comprised of the moving devices 95A and 95B each of which moves a corresponding one of the intermediate and outer dies 92 and 93.

With the above configuration, it is possible to severally move the intermediate and outer dies 92 and 93 as desired without interference therebetween.

Further, in the present embodiment, each of the moving devices 95A and 95B includes the pair of reciprocators (950/951 or 952/953) that move the corresponding one of the intermediate and outer dies 92 and 93 in the axial and radial directions of the core member 91, respectively.

With the above configuration, it is possible for each of the moving devices 95A and 95B to severally control the axial and radial positions of the corresponding one of the intermediate and outer dies 92 and 93.

In the present embodiment, the feeding means (i.e., the feeding belt set 97) includes the inner and outer belts 970 and 971 that convey the electric wire 50 by sandwiching the electric wire 50 therebetween.

With the above configuration, it is possible to prevent deformation of the electric wire 50 during the feeding.

Further, in the present embodiment, as shown in FIG. 40, there are formed the protrusions 973 on at least one of the surfaces of the inner and outer belts 970 and 971 which abut the in-slot portions 51 of the electric wire 50, so as to engage with the in-slot portions 51.

Consequently, with the protrusions 973, it is possible to restrict movement of the in-slot portions 51 of the electric wire 50 relative to the inner and outer belts 970 and 971, thereby more reliably preventing deformation of the electric wire 50 during the feeding.

Moreover, in the present embodiment, the inner and outer belts 970 and 971 convey the electric wire 50 by means only of friction between the electric wire 50 and the surfaces of the belts 970 and 971 without fixing the electric wire 50 to the belts 970 and 971.

Consequently, upon arriving at the given position, the electric wire 50 can be easily detached from the inner and outer belts 970 and 971.

In the present embodiment, the rolling apparatus 9 further includes the pressing device 98 for pressing the intermediate dies 92 against the first part 570 of the electric wire 50 and the outer dies 93 against the second part 571 of the electric wire 50.

With the pressing device 98, it is possible to more reliably plastically deform the electric wire 50 into the spiral shape.

Further, in the present embodiment, the pressing device 98 includes the pair of the pressing rollers 980 that are configured to roll on the outer surfaces of the intermediate and outer dies 92 and 93 while pressing the outer surfaces.

With the above configuration, it is possible for the pressing rollers 980 to continuously press the intermediate and outer dies 92 and 93.

Further, in the present embodiment, the pressing rollers 980 are located apart from each other in the axial direction of the core member 91 so as to respectively press opposite axial end portions of each of the intermediate and outer dies 92 and 93.

With the above configuration, it is possible to more reliably plastically deform the turn portions 52 of the electric wire 50.

[Modification 1]

Figure 52:
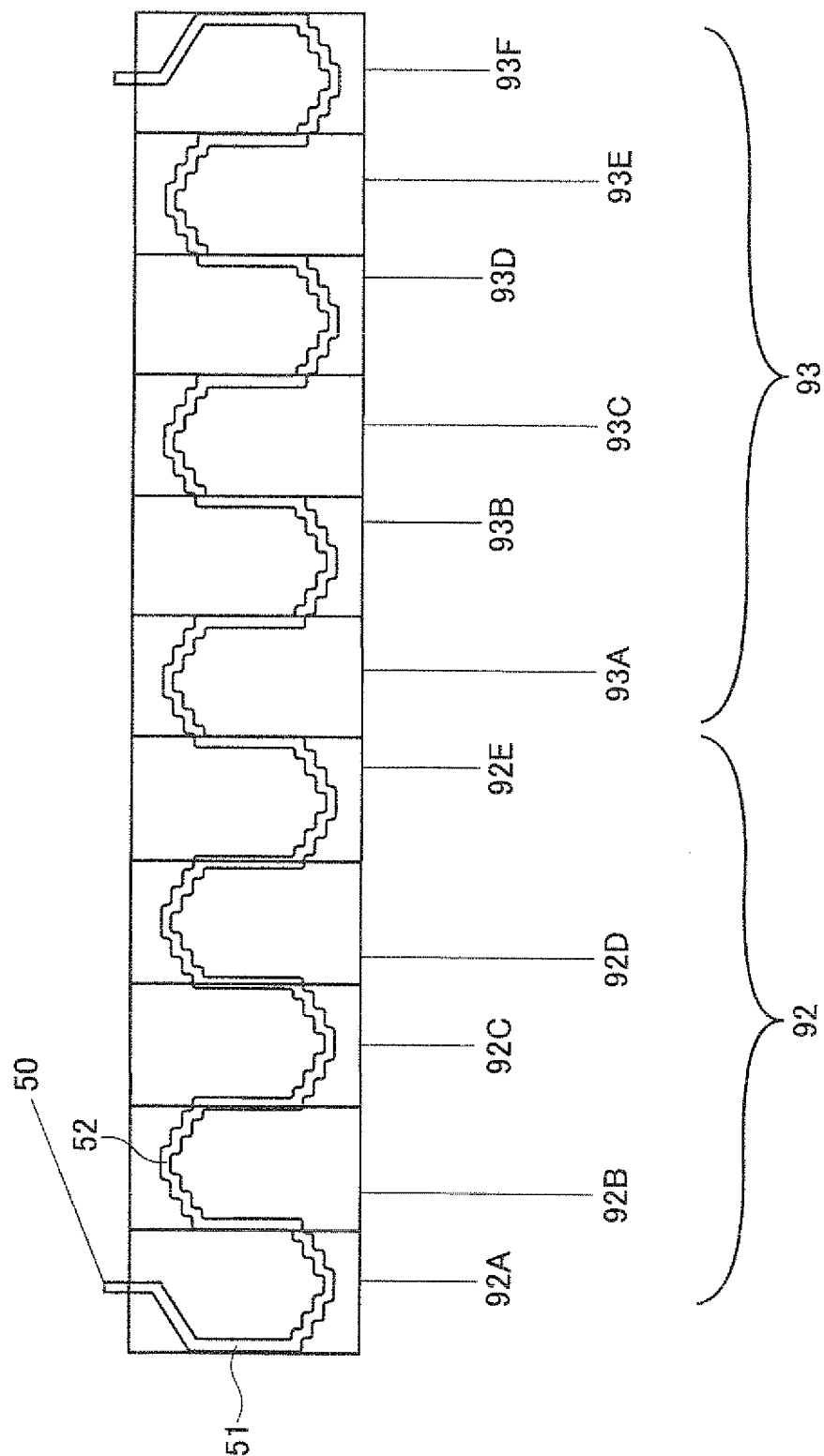
FIG. 52 is a development view illustrating the arrangement of the intermediate dies 92 and outer dies 93 according to the first modification of the second embodiment.

In this modification, as shown in FIG. 52, the intermediate and outer dies 92 and 93 are so arranged that during the rolling of the electric wire 50, each of the turn-portions 52 of the electric wire 50 is pressed radially inward only by a corresponding one of the intermediate and outer dies 92 and 93.

Consequently, with the above arrangement, it is possible to more reliably plastically deform each of the turn-portions 52 of the electric wire 50.

[Modification 2]

Figure 53:
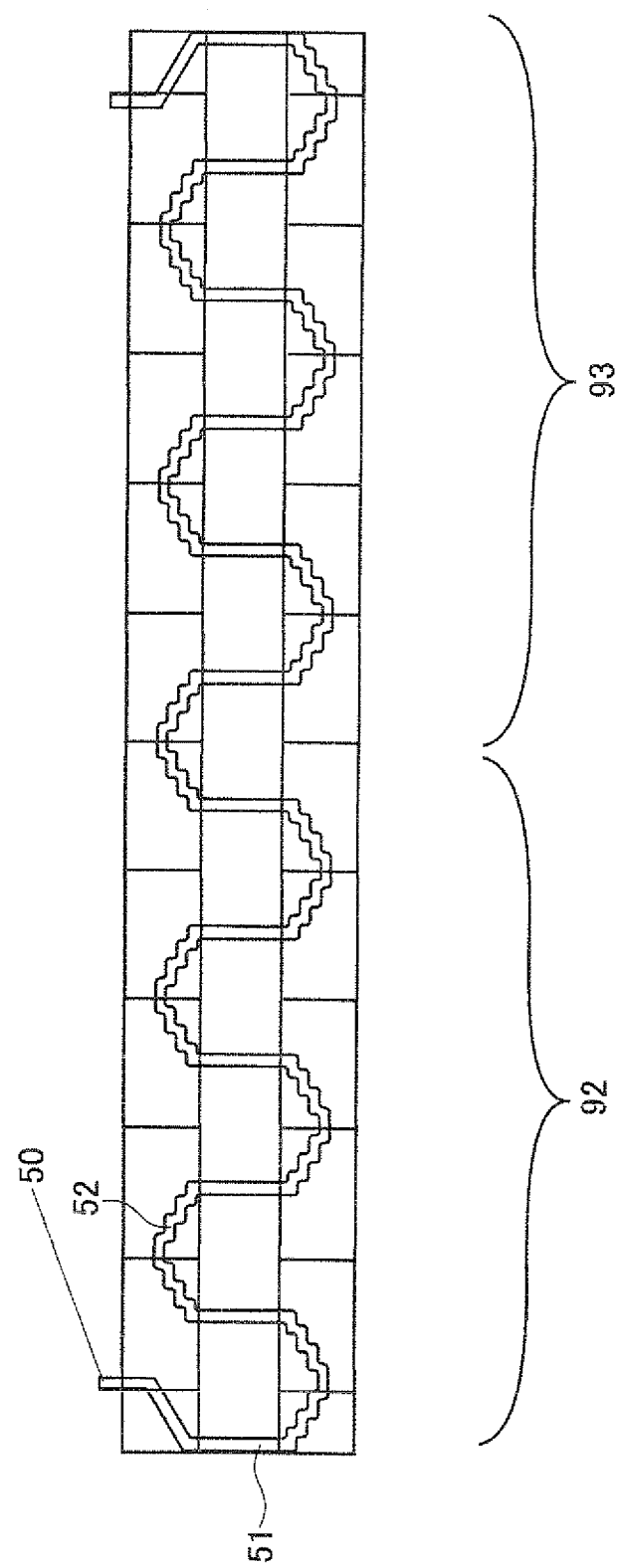
FIG. 53 is a development view illustrating the arrangement of the intermediate dies 92 and outer dies 93 according to the second modification of the second embodiment.

In this modification, as shown in FIG. 53, each of the intermediate and outer dies 92 and 93 is divided into two pieces that are respectively located on opposite axial sides of the in-slot portions 51 of the electric wire 50. Further, the pieces of the intermediate and outer dies 92 and 93 are so arranged that during the rolling of the electric wire 50, each of the turn-portions 52 of the electric wire 50 is pressed radially inward by two of the pieces of the intermediate and outer dies 92 and 93.

With the above arrangement, it is possible to more accurately shape each of the turn-portions 52 of the electric wire 50.

[Modification 3]

Figure 54:
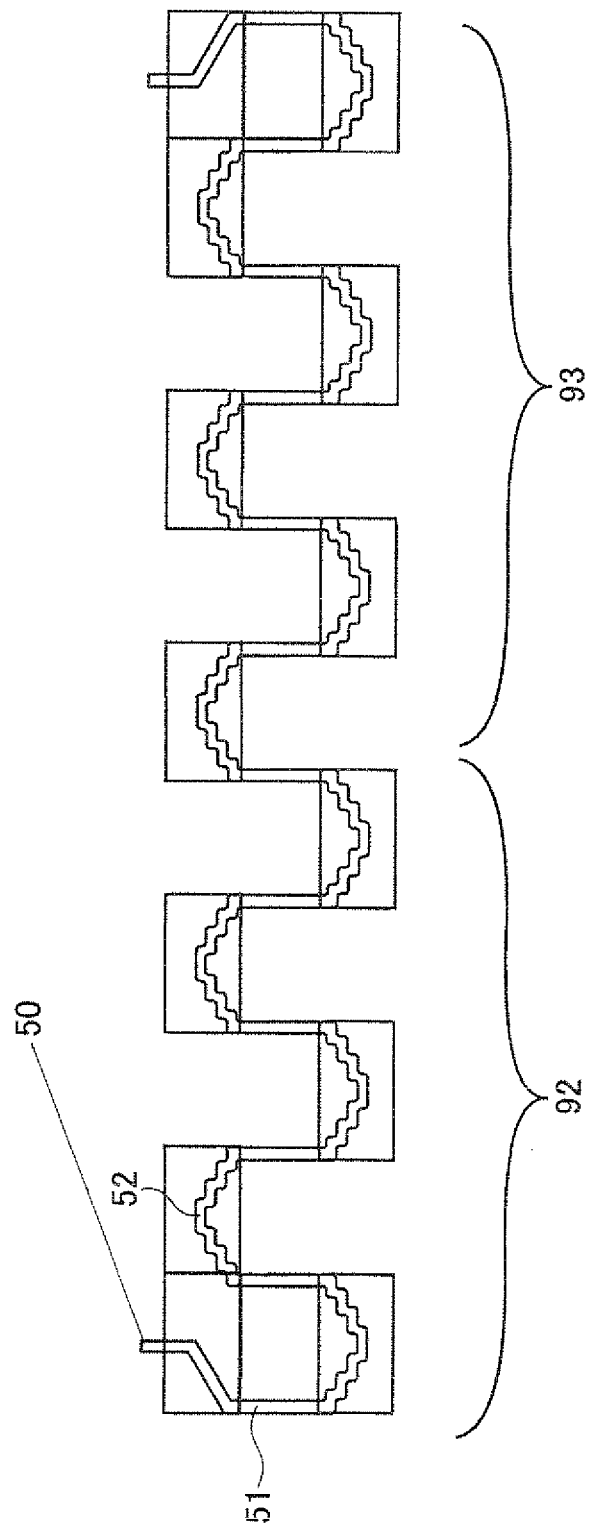
FIG. 54 is a development view illustrating the arrangement of the intermediate dies 92 and outer dies 93 according to the third modification of the second embodiment.

In this modification, as shown in FIG. 54, each of the intermediate and outer dies 92 and 93 is configured to cover and press radially inward only a corresponding one of the half-turn portions and turn portions of the electric wire 50.

With the above configuration, it is possible to reduce the size and weight of each of the intermediate and outer dies 92 and 93.

[Modification 4]

Figure 55:
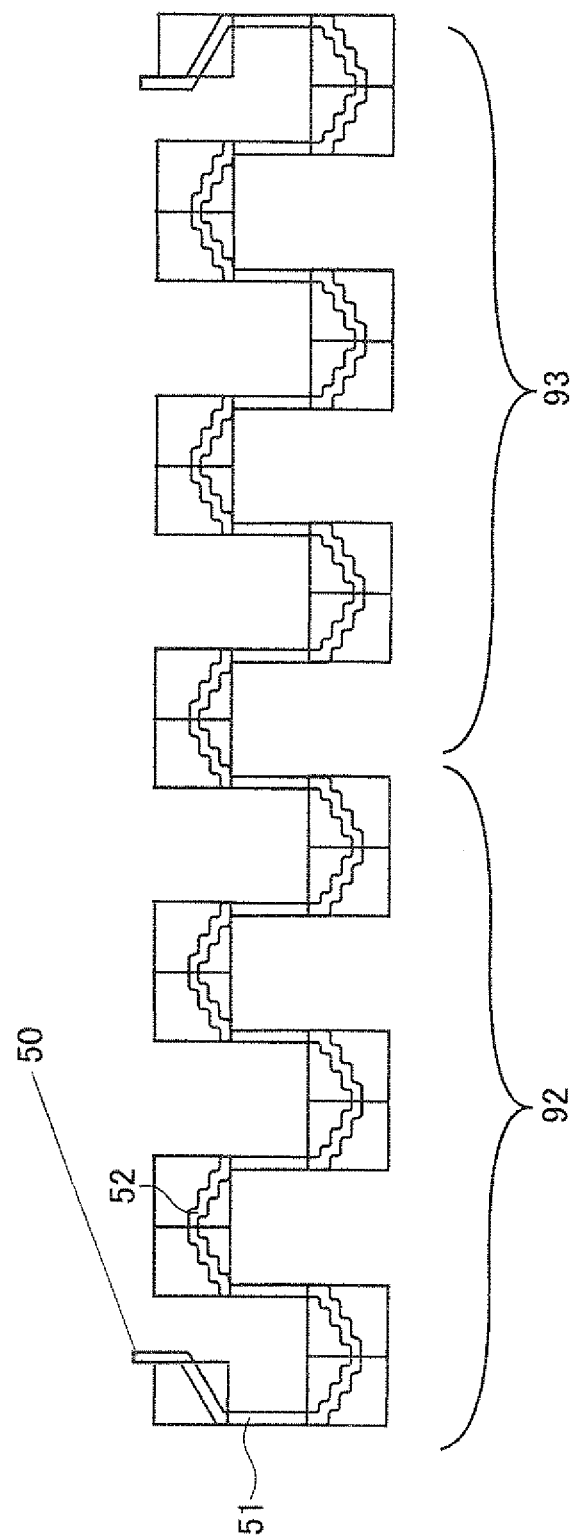
FIG. 55 is a development view illustrating the arrangement of the intermediate dies 92 and outer dies 93 according to the fourth modification of the second embodiment.
Figure 56:
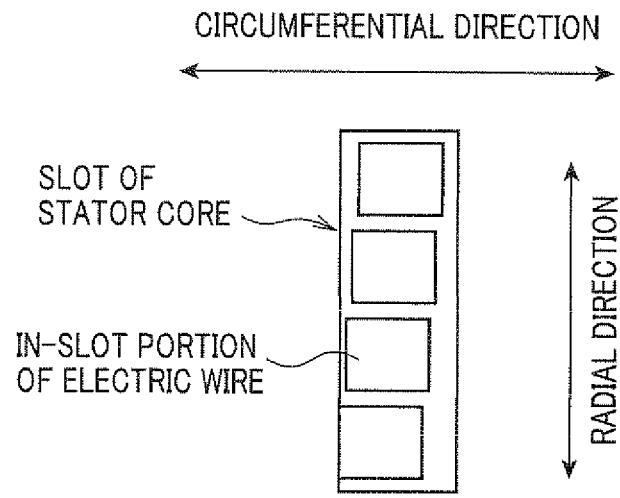
FIG. 56 is a schematic view illustrating one problem in the prior art.
Figure 57:
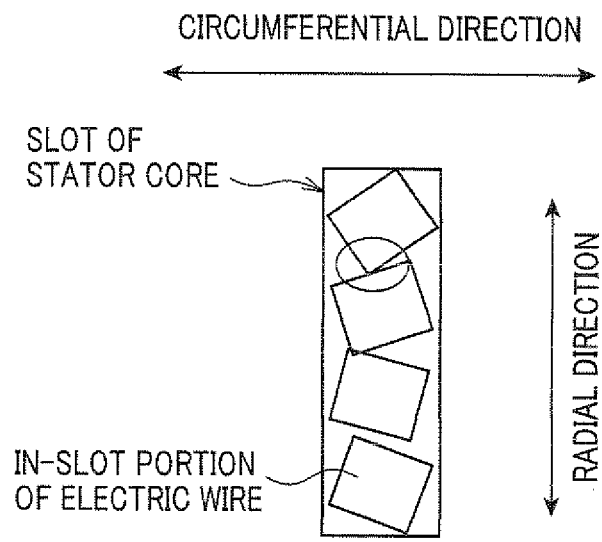
FIG. 57 is a schematic view illustrating another problem in the prior art.

In this modification, as shown in FIG. 55, the intermediate and outer dies 92 and 93 are configured to cover and press radially inward only the half-turn portions and turn portions of the electric wire 50. Further, during the rolling of the electric wire 50, each of the turn portions 52 of the electric wire 50 is pressed by two of the intermediate and outer dies 92 and 93.

With the above configuration, it is possible to further reduce the size and weight of each of the intermediate and outer dies 92 and 93.

While the above particular embodiments and modifications of the invention have been shown and described, it will be understood by those skilled in the art that various further modifications, changes, and improvements may be made without departing from the spirit of the invention.

For example, in the second embodiment, each of the moving devices 95A and 95B are configured with a pair of reciprocators. However, each of the moving devices 95A and 95B may also be configured with other devices, for example, a pair of servomotors. In this case, it is still possible for each of the moving devices 95A and 95B to move the corresponding one of the intermediate and outer dies between its initial and shaping positions.

What is claimed is:

1. A method of rolling a substantially planar electric wire, which is for use in forming a stator coil of a stator of an electric rotating machine, by more than one turn into a spiral shape,
   wherein
   the stator comprises a hollow cylindrical stator core having a plurality of slots that are formed in a radially inner surface of the stator core and spaced in a circumferential direction of the stator core, and
   the planar electric wire includes a plurality of in-slot portions, each of which is to be received in a corresponding one of the slots of the stator core, and a plurality of turn portions each of which connects an adjacent pair of the in-slot portions and is to be located outside the slots of the stator core,
   the method comprising the steps of:
   preparing a radially inner pressing member having an outer surface, a radially intermediate pressing member having radially inner and outer surfaces, and a radially outer pressing member having an inner surface;
   pressing a first part of the electric wire between the outer surface of the inner pressing member and the inner surface of the intermediate pressing member, thereby plastically deforming the first part to extend along the outer surface of the inner pressing member; and
   pressing a second part of the electric wire between the outer surface of the intermediate pressing member and the inner surface of the outer pressing member, thereby plastically deforming the second part to extend along the outer surface of the intermediate pressing member.

2. The method as set forth in claim 1, wherein the intermediate pressing member is comprised of a plurality of intermediate pressing member segments, and
   in the step of pressing the first part of the electric wire, the intermediate pressing member segments are sequentially placed on and pressed against the first part, thereby plastically deforming the turn portions in the first part of the electric wire into a plurality of circumferentially-extending sections.

3. The method as set forth in claim 2, wherein each of the turn portions of the electric wire has a crank-shaped part that is bent to offset the adjacent pair of the in-slot portions connected by the turn portion from each other in a radial direction of the stator core, and
   in the step of pressing the first part of the electric wire, the intermediate pressing member segments are sequentially placed so that for each of the turn portions in the first part of the electric wire, two sections of the turn portion delimited by the crank-shaped part of the turn portion are respectively pressed by an adjacent pair of the intermediate pressing member segments.

4. The method as set forth in claim 1, wherein the outer pressing member is comprised of a plurality of outer pressing member segments, and
   in the step of pressing the second part of the electric wire, the outer pressing member segments are sequentially placed on and pressed against the second part, thereby plastically deforming the turn portions in the second part of the electric wire into a plurality of circumferentially-extending sections.

5. The method as set forth in claim 4, wherein each of the turn portions of the electric wire has a crank-shaped part that is bent to offset the adjacent pair of the in-slot portions connected by the turn portion from each other in a radial direction of the stator core, and in the step of pressing the second part of the electric wire, the outer pressing member segments are sequentially placed so that for each of the turn portions in the second part of the electric wire, two sections of the turn portion delimited by the crank-shaped part of the turn portion are respectively pressed by an adjacent pair of the outer pressing member segments.

6. An apparatus for rolling a substantially planar electric wire, which is for use in forming a stator coil of a stator of an electric rotating machine, by more than one turn into a spiral shape, wherein the stator comprises a hollow cylindrical stator core having a plurality of slots that are formed in a radially inner surface of the stator core and spaced in a circumferential direction of the stator core, and the planar electric wire includes a plurality of in-slot portions, each of which is to be received in a corresponding one of the slots of the stator core, and a plurality of turn portions each of which connects an adjacent pair of the in-slot portions and is to be located outside the slots of the stator core, the apparatus comprising:

a radially inner pressing member having an outer surface;

a radially intermediate pressing member having radially inner and outer surfaces; and a radially outer pressing member having an inner surface, wherein the apparatus is so configured that:

the inner and intermediate pressing members together press a first part of the electric wire between the outer surface of the inner pressing member and the inner surface of the intermediate pressing member, thereby plastically deforming the first part to extend along the outer surface of the inner pressing member; and the intermediate and outer pressing members together press a second part of the electric wire between the outer surface of the intermediate pressing member and the inner surface of the outer pressing member, thereby plastically deforming the second part to extend along the outer surface of the intermediate pressing member.

7. The apparatus as set forth in claim 6, wherein the intermediate pressing member is comprised of a plurality of intermediate pressing member segments, and the intermediate pressing member is so configured that the intermediate pressing member segments are sequentially placed on and pressed against the first part of the electric wire, there by plastically deforming the turn portions in the first part into a plurality of circumferentially-extending sections.

8. The apparatus as set forth in claim 7, wherein each of the turn portions of the electric wire has a crank-shaped part that is bent to offset the adjacent pair of the in-slot portions connected by the turn portion from each other in a radial direction of the stator core, and the intermediate pressing member segments are sequentially placed so that for each of the turn portions in the first part of the electric wire, two sections of the turn portion delimited by the crank-shaped part of the turn portion are respectively pressed by an adjacent pair of the intermediate pressing member segments.

9. The apparatus as set forth in claim 6, wherein the outer pressing member is comprised of a plurality of outer pressing member segments, and the outer pressing member is so configured that the outer pressing member segments are sequentially placed on and pressed against the second part of the electric wire, thereby plastically deforming the turn portions in the second part into a plurality of circumferentially-extending sections.

10. The apparatus as set forth in claim 9, wherein each of the turn portions of the electric wire has a crank-shaped part that is bent to offset the adjacent pair of the in-slot portions connected by the turn portion from each other in a radial direction of the stator core, and the outer pressing member segments are sequentially placed so that for each of the turn portions in the second part of the electric wire, two sections of the turn portion delimited by the crank-shaped part of the turn portion are respectively pressed by an adjacent pair of the outer pressing member segments.

11. The apparatus as set forth in claim 6, wherein the inner pressing member includes a plurality of first restricting portions each of which restricts movement of a corresponding one of the in-slot portions in the first part of the electric wire during the rolling of the electric wire, and the intermediate pressing member includes a plurality of second restricting portions each of which restricts movement of a corresponding one of the in-slot portions in the second part of the electric wire during the rolling of the electric wire.

12. The apparatus as set forth in claim 6, wherein the inner and intermediate pressing members together plastically deform the turn portions in the first part of the electric wire into a plurality of circumferentially-extending sections, and the intermediate and outer pressing members together plastically deform the turn portions in the second part of the electric wire into a plurality of circumferentially-extending sections.

13. The apparatus as set forth in claim 6, wherein each of the turn portions of the electric wire protrudes from the adjacent pair of the in-slot portions connected by the turn portion in a direction in which the in-slot portions extend.

14. The apparatus as set forth in claim 13, wherein each of the turn portions of the electric wire protrudes from the adjacent pair of the in-slot portions connected by the turn portion so that the center of the turn portion is furthest from the in-slot portions.

15. The apparatus as set forth in claim 6, wherein each of the turn portions of the electric wire is stepped to include a plurality of shoulder parts that extend substantially perpendicular to the in-slot portions.

16. The apparatus as set forth in claim 6, wherein each of the turn portions of the electric wire has a crank-shaped part that is bent to offset the adjacent pair of the in-slot portions connected by the turn portion from each other in a radial direction of the stator core.

17. The apparatus as set forth in claim 6, further comprising:

means for moving each of the intermediate and outer pressing members between first and second positions thereof, wherein the intermediate pressing member is away from the first part of the electric wire at its first position and in contact with the first part at its second position, and the outer pressing member is away from the second part of the electric wire at its first position and in contact with the second part at its second position; and means for feeding the electric wire to a given position radially outside the inner pressing member.

18. The apparatus as set forth in claim 17, wherein the intermediate pressing member is comprised of a plurality of intermediate pressing member segments and the outer pressing member is comprised of a plurality of outer pressing member segments.

19. The apparatus as set forth in claim 18, wherein the intermediate and outer pressing member segments are so arranged that during the rolling of the electric wire, each of the in-slot portions of the electric wire is pressed radially inward only by a corresponding one of the intermediate and outer pressing member segments.

20. The apparatus as set forth in claim 18, wherein the intermediate and outer pressing member segments are so arranged that during the rolling of the electric wire, each of the turn portions of the electric wire is pressed radially inward only by a corresponding one of the intermediate and outer pressing member segments.

21. The apparatus as set forth in claim 18, wherein the moving means is comprised of a plurality of moving devices each of which moves a corresponding one of the intermediate and outer pressing member segments.

22. The apparatus as set forth in claim 21, wherein each of the moving devices comprises a pair of reciprocators that move the corresponding one of the intermediate and outer pressing member segments in axial and radial directions of the inner pressing member, respectively.

23. The apparatus as set forth in claim 17, wherein the feeding means comprises at least one belt that conveys the electric wire to the given position.

24. The apparatus as set forth in claim 23, wherein the at least one belt conveys the electric wire by means of friction between the electric wire and a surface of the at least one belt.

25. The apparatus as set forth in claim 23, wherein the at least one belt has a plurality of protrusions that are formed on a surface of the at least one belt to engage with the electric wire and thereby restrict movement of the electric wire.

26. The apparatus as set forth in claim 23, wherein the at least one belt comprises a pair of inner and outer belts that are respectively located on radially inner and outer sides of the electric wire and convey the electric wire by sandwiching the electric wire therebetween.

27. The apparatus as set forth in claim 17, further comprising means for pressing the intermediate pressing member against the first part of the electric wire and the outer pressing member against the second part of the electric wire.

28. The apparatus as set forth in claim 27, wherein the pressing means comprises at least one pressing roller that is configured to roll on the outer surfaces of the intermediate and outer pressing members while pressing the outer surfaces.

29. The apparatus as set forth in claim 28, wherein the at least one pressing roller comprises a pair of pressing rollers that are located apart from each other in an axial direction of the inner pressing member so as to respectively press opposite axial end portions of each of the intermediate and outer pressing members.

30. The apparatus as set forth in claim 6, wherein the radially inner and outer surfaces of the radially intermediate pressing member face inward and outward, respectively.

31. The apparatus as set forth in claim 6, wherein the radially intermediate pressing member has an overall shape that is substantially cylindrical.

\* \* \* \* \*